United States Patent [19]

Moody et al.

[11] Patent Number: 5,290,921
[45] Date of Patent: Mar. 1, 1994

[54] INTERMEDIATES AND COLORANTS HAVING PRIMARY HYDROXYL ENRICHED POLY (OXYALKYLENE) MOIETIES AND THEIR PREPARATION

[75] Inventors: David J. Moody, Spartanburg; Edward W. Kluger, Pauline; John W. Rekers, Spartanburg, all of S.C.

[73] Assignee: Milliken Research Corporation, Spartanburg, S.C.

[21] Appl. No.: 461,852

[22] Filed: Jan. 8, 1990

[51] Int. Cl.$^5$ .................. C09B 29/033; C09B 29/09; D06P 3/24
[52] U.S. Cl. ..................... 534/607; 534/573; 534/610; 534/611; 534/729
[58] Field of Search .................. 534/573 P, 729, 607, 534/610, 611

[56] References Cited

U.S. PATENT DOCUMENTS

| | | | |
|---|---|---|---|
| 3,154,535 | 10/1964 | Graham, Jr. | 534/729 |
| 3,157,633 | 11/1964 | Kuhn | 534/729 |
| 3,446,757 | 5/1969 | Wandenberg | 528/421 |
| 3,535,382 | 10/1970 | Brown et al. | 564/418 |
| 3,945,894 | 3/1976 | Martin et al. | 205/311 |
| 4,086,151 | 4/1978 | Stevens et al. | 528/103 |
| 4,298,764 | 11/1981 | Berkowitz | 568/618 |
| 4,659,774 | 4/1987 | Webb et al. | 525/54.2 |
| 4,751,254 | 6/1988 | Kluger et al. | 521/153 |
| 4,761,502 | 8/1988 | Kluger et al. | 564/442 |
| 4,812,141 | 3/1989 | Baumgartner et al. | 8/506 |
| 4,877,411 | 10/1989 | Hines et al. | 8/403 |

OTHER PUBLICATIONS

Vandenberg, E. J., "Polymerization of Glycidol and Its Derivatives: A New Rearrangement Polymerization"; Journal of Polymer Science: Polymer Chemistry Edition, vol. 23, 915-949 (1985).
Venkataraman, "The Chemistry of Synthetic Dyes" Academic Press, New York, 1952, pp. 240-247.

Primary Examiner—Mary C. Lee
Assistant Examiner—Fiona T. Powers
Attorney, Agent, or Firm—Timothy J. Monahan; Terry T. Moyer

[57] ABSTRACT

The present invention provides primary hydroxyl enhanced colorants having markedly improved reactivities in e.g., polyurethane foams for imparting permanent coloring thereto, the colorants having the formula $$C-(Z)_{1-4}$$

are provided wherein C is an azo, methine, or azamethine chromogen and Z is a poly(oxyalkylene) moiety comprised of (1) at least two (A) units independently selected from those of the formulae $$-CH_2CH(O-T)CH_2O- \text{ or}$$
$$-CH_2CH(O-T)CH_2O-T$$

and (2) from none to about 200 (B) units of the formula (—RO—) wherein R is straight or branched chain hydrocarbon of 2-4 carbons, T is a moiety of the formula $$-CH_2CH(R_1)-O-(RO)_{0-40}-CH_2CH_2OH$$

wherein $R_1$ is selected from unsubstituted or substituted alkyl, aryl, alkenyloxyalkyl, alkoxyalkyl or aryloxyalkyl, and wherein the A units comprise at least 0.5 percent of the total A+B units.

12 Claims, No Drawings

INTERMEDIATES AND COLORANTS HAVING PRIMARY HYDROXYL ENRICHED POLY (OXYALKYLENE) MOIETIES AND THEIR PREPARATION

FIELD OF THE INVENTION

This invention concerns organic intermediates and colorant materials or chromogens therefrom containing at least one poly(oxyalkylene) moiety having primary hydroxyl site enhancement or enrichment which contributes to improved reactivity and/or compatibility of the intermediates or colorants in polymeric substrates, as well as improvements in other properties. In this regard, the chemical structures of the present colorants are readily tailorable to meet, in exceptional manner, the physical and chemical requirements of the specific industrial application, particularly in the coloring of formed thermosetting or thermoplastic resins and articles formed therefrom.

Some of the desired physical and chemical characteristics of such colorants for coloring polymers per se or compositions containing polymer, in addition to having at least substantial tinctorial power, include one or more of excellent clarity and light fastness, high heat stability, crystal structure and shade immutability, availability as liquids or at least good resin compatibility at processing temperatures for easy blending with the polymer or compositions, easy clean-up from processing, homogeneity of dispersal in the polymer or composition, non-nucleating propensity of the colorant, and resistance to migration, settling, streaking, plating, subliming, blooming, solvent or water extractibility or the like of the colorant from the polymer or composition or article formed therefrom.

DESCRIPTION OF RELATED ART

Multi-functional reactants such as compounds containing poly(oxyalkylene) moieties having a plurality of hydroxyls, primary and/or secondary, are described, for example, in U.S. Pat. Nos. 3,535,382; 4,761,502; 3,154,535; 4,298,764; 4,659,774; 3,446,757; 4,751,254; 4,086,151; and 3,945,894. Note, the production of primary and secondary hydroxyls through the base catalyzed polymerization of glycidol is described in the *Journal of Polymer Science*, Vol. 23, pages 915–949 (1985), E. J. Vandenberg. The utility disclosures and process disclosures of these patents and literature reference concerning entry of the reactants into polymeric or resinous materials or substrates are incorporated herein by reference. The primary hydroxyl enriched materials of the present invention find enhanced utility, e.g., as reactive colorants or as colorant intermediates, for permanent incorporation into polymeric materials or substrates such as polyurethanes as described for certain poly(oxyalklene) materials in the aforesaid U.S. Pat. Nos. 4,751,254 and 3,446,757.

In the use of poly(oxyalkylene) containing materials, particularly as reactive colorants, the positions of the hydroxyl sites in the poly(oxyalkylene) chain, their molar concentrations, and the ratio of their primary/secondary character can become quite important, particularly in regard to the permanancy with which the colorants are affixed to polymeric substrates.

In two particularly important utilities for the present colorants (1) the reactive, primary hydroxyls of the poly(oxyalkylene) moiety or moieties which are associated with one or more colorant moieties or chromogens are reacted into isocyanate based glues for carpet underlays, and in (2) the colorants are reacted into polyurethanes which are formed into slab foam configuration for the production of shoe soles or the like.

The carpet underlay application (1) employs an isocyanate based glue which is often colored with pigments to give a desired underlay color. Such pigments are insoluble in the glue, and therefore must be admixed just prior to formulation of the underlay. In this application, should the carpet underlay become flooded, for example, with soapy water, as in steam cleaning thereof, conventional poly(oxyalkylene) reactive colorants would extract from the underlay and migrate into the carpet, leaving the carpet unacceptably colored upon drying.

In the second application (2) in the coloration of polyurethane shoe soles, pigment dispersions customarily have been employed, however, pigments tend to fall out of solution over time, making timely shipment of these color formulations to manufacturing sites difficult. The benefits of soluble colorants, therefore, particularly when storing pre-formulations of polyol and colorant for extended periods of time prior to reaction with isocyanates and sole formation are well recognized in the field. Soluble, highly reactive colorants would seem to find obvious application here, however, the problem of their insufficient reactivity, resulting in excessive migration of the colorant is highly evident from their trial uses. The colored polyol system in this application is reacted with an isocyanate solution to effect polyurethane formation, as is the case for slab stock foam production. The difference here however, is that a much lower ratio of isocyanate is used, making it more difficult for conventional hydroxy reactants to react in. Consequently the soles, although quite pleasing in appearance, tend to leave colored marks on the floor when worn due to the migration of unreacted colorant out of the system.

SUMMARY OF THE INVENTION

The present invention provides marked improvements in reactivity of the intermediates or colorants therefrom and allows their successful use in the above and many other applications.

In its broad aspect, the present colorants are defined as having the formula

wherein C is an azo, methine or azamethine chromogen and Z is a poly(oxyalkylene) moiety comprised of (1) at least two (A) units independently selected from those of the formulae

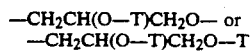

and (2) from none to about 200 (B) units of the formula (—RO—) wherein R is straight or branched chain hydrocarbon of 2–4 carbons, T is a moiety of the formula

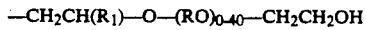

wherein $R_1$ is selected from substituted or unsubstituted alkenyloxyalkyl, alkoxyalkyl, aryloxyalkyl, alkyl, or aryl, and said A units comprise at least about 0.5 percent of the total A+B units.

Another aspect of this invention is its intermediates embodiment defined as a primary hydroxyl enhanced compound of the formula $$Y-(Z)_{1-4}$$

wherein Y is the residue of a nucleophile devoid of conjugated divalent linking moieties and Z is as defined above.

The process embodiment of the present invention is defined as the process for enhancing the primary hydroxyl content of an organic compound of the formula $$Y_1-(Z_1)_{1-4}$$

wherein $Y_1$ is a nucleophilic residue and $Z_1$ is a poly(oxyalkylene) moiety comprised of (1) at least two ($A_1$) units independently selected from those of the formulae:

—CH$_2$CH(OH)CH$_2$O— or —CH$_2$CH(OH)CH$_2$OH and (2) from none to about 200 (B) units of the formula, (—RO—) wherein R is straight or branched chain hydrocarbon of 2–4 carbons, wherein the sum of $A_1+B$ is from about 3 to about 200, said process comprising the steps of (a) reacting at least about 75 percent of all hydroxyls of said ($A_1$) units with an organic epoxide which gives a secondary hydroxyl, and then (b) reacting at least about 50 percent of all hydroxyls present in the resulting product of (a) each with from 1 to about 40 alkyleneoxide units of 2–4 carbons, with the provision that the terminating unit residue thereof is hydroxyethyl.

It is noted that substantial difficulty is encountered in reacting any secondary hydroxyls of a colorant with e.g., toluene diisocyanate for incorporation thereof into a polyurethane substrate. For such purpose, the present invention provides a means for converting the secondary hydroxyls to primary and thus markedly enhancing the reactivity of the intermediate or colorant with toluene diisocyanate or other such reactant to greatly increase the permanency of the colorant in the substrate. While this conversion of secondary to primary would appear to be straightforward through reaction with ethylene oxide, it has been found that with this reactant an unacceptably high proportion of secondary hydroxyls remain in the intermediate or colorant and result in diminished permanency of the colorant moiety in the substrate. As aforesaid, this diminished permanency is especially noticeable in the case of higher concentrations of colorant which can migrate from the substrate polymer and transfer to rugs, furniture, or the like.

The preferable colorants have the following general formulae:

| Q—N=N—Ar | M=CH—Ar | M=N—Ar |
|---|---|---|
| Azo | Methine | Azamethine | wherein Q is the residue of a carbocyclic or heterocyclic aromatic, diazotizable amine reactant selected from unsubstituted or substituted: phenyl; naphthyl; thiazol-2-yl; benzothiazol-2-yl; 1,3,4-thiadiazol-2-yl; 1,2,4,-thiadiazol-5-yl; isothiazol-5-yl; isoxazol-5-yl; 2,1-benzisothiazol-3-yl; 2-thienyl; 3- and 4-pyridyl; pyrazol-5-yl; 3- and 4-phthalimidyl; 1,2,4-triazol-3-yl or 4,5 (3,3-dimethyl-1-oxotetramethylene)thiazol-2-yl; M is an active methylene residue and Ar is the residue of a reactant selected from substituted or unsubstituted: anilines; naphthylamines; 1,2,3,4-tetrahydroquinolines; 3,4-dihydro-2H-1,4-benzoxazines; 2-aminothiazoles; 2,3-dihydroindoles; carbazoles; phenoxazines; phenothiazines; 2-aminothiophenes; aminopyridines or julolidines;

and wherein at least one —Z moiety is present on either Q— or —Ar.

A more preferred group of colorants of the invention are those with the specific formulae for the Q—, —Ar, and M— moieties as given below. These preferred colorants are those wherein the aromatic residue Q— is selected from those of the formulae:

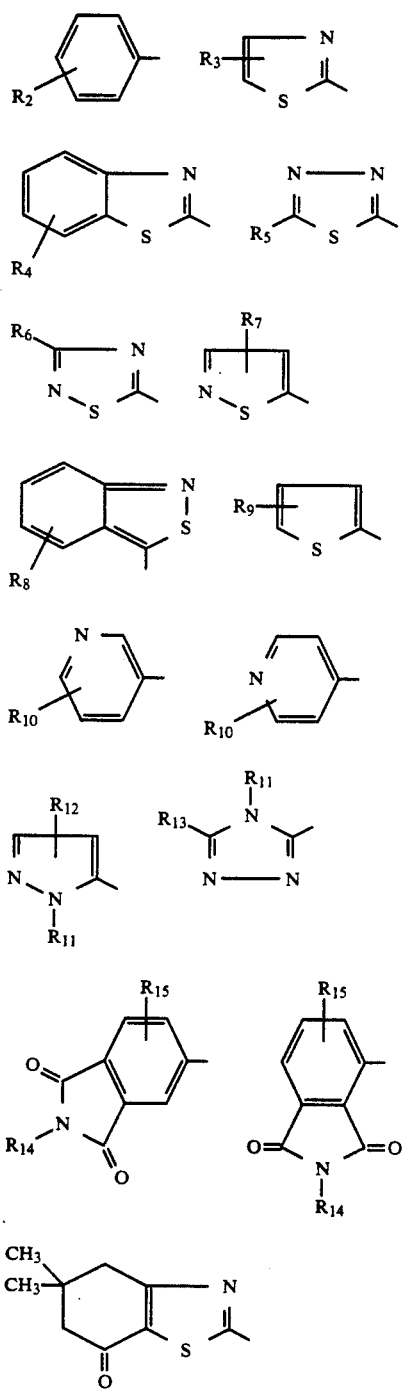

wherein:

$R_2$ is hydrogen or 1–3 substituents selected from lower alkyl, lower alkoxy, halogen, cyano, nitro, formyl, alkanoyl, aroyl, thiocyano, lower alkylthio, arylthio, lower alkylsulfonyl, arylsulfonyl, carbalkoxy, unsubstituted or substituted sulfamoyl, unsubstituted or substituted carbamoyl, nitro, trifluoromethyl or arylazo;

$R_3$ is hydrogen or 1–2 substituents selected from lower alkyl, aryl, halogen, cyano, formyl, carbalkoxy, nitro, arylazo, thiocyano, lower alkylsulfonyl, arylsulfonyl, trifluoromethyl, alkanoyl, aroyl, unsubstituted or substituted sulfamoyl or unsubstituted or substituted carbamoyl;

$R_4$ is hydrogen or 1–3 substituents selected from lower alkyl, lower alkoxy, halogen, cyano, carbalkoxy, alkanoyl, aroyl, arylazo, —$SO_3$-aryl, alkylsulfonyl, arylsulfonyl, unsubstituted or substituted carbamoyl, unsubstituted or substituted sulfamoyl, alkylthio, thiocyano, 2-cyanoethylthio, 2-cyanoethylsulfonyl, or alkanoylamino;

$R_5$ is hydrogen or a group selected from lower alkyl, cycloalkyl, aryl, alkylthio, arylthio, cyanomethylthio, halogen, alkysulfonyl, arylsulfonyl, lower alkoxy, benzylthio, allylthio, unsubstituted or substituted sulfamoyl, thiocyano or alkanoylamino;

$R_6$ is hydrogen or a group selected from lower alkyl, aryl, alkylthio, alkylsulfonyl, halogen, cyano, 2-carbalkoxyethylthio or benzylthio;

$R_7$ is hydrogen or 1–2 substituents selected from lower alkyl, halogen, nitro, cyano, alkylthio, 2-hydroxyethylthio, arylthio, alkylsulfonyl or arylsulfonyl;

$R_8$ is hydrogen or a group selected from lower alkyl, lower alkoxy, nitro, halogen or unsubstituted or substituted sulfamoyl;

$R_9$ is hydrogen or 1–3 substituents selected from lower alkyl, aryl, cyano, lower carbalkoxy, alkanoyl, aroyl, halogen, formyl, unsubstituted or substituted carbamoyl, thiocyano, alkysulfonyl, arylsulfonyl, unsubstituted or substituted sulfamoyl, nitro, arylazo or cinnamoyl;

$R_{10}$ is hydrogen or 1–3 substituents selected from lower alkyl, halogen, lower alkoxy, lower alkylsulfonyl, arylsulfonyl, carbalkoxy, aryl, unsubstituted or substituted carbamoyl; unsubstituted or substituted sulfamoyl, formyl, or thiocyano;

$R_{11}$ is hydrogen, lower alkyl, aryl, alkylsulfonyl, or arylsulfonyl;

$R_{12}$ is hydrogen or 1–2 substituents selected from lower alkyl, aryl, unsubstituted or substituted carbamoyl, arylthio, lower alkylthio, cyanomethyl, cyano, nitro, carbalkoxy;

$R_{13}$ is hydrogen, lower alkyl, lower thioalkyl, arylthio, carbalkoxy, halogen, lower alkylsulfonyl, or arylsulfonyl;

$R_{14}$ is selected from hydrogen or unsubstituted or substituted: alkyl; aryl; cycloalkyl; or allyl; and $R_{15}$ is hydrogen or 1–2 substituents selected from lower alkyl, lower alkoxy, halogen, nitro, cyano, alkylthio, arylthio, alkylsulfonyl, arylsulfonyl or aryloxy; and wherein Ar is an aromatic residue selected from those formulae:

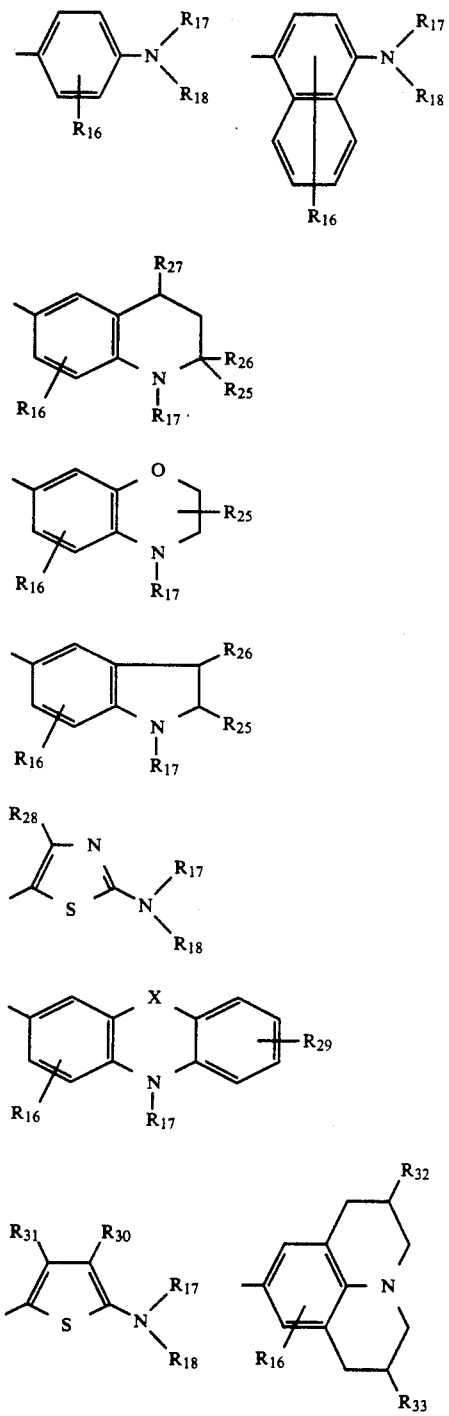

wherein:

$R_{16}$ is hydrogen or 1–2 substituents selected from lower alkyl, trifluoromethyl, lower alkoxy, arylthio, aryloxy, halogen, —$CH_2$—O—Z or —O-alkylene-O—Z;

$R_{17}$ and $R_{18}$ are each independently selected from: —Z; straight or branched lower alkenyl; cycloalkyl; cycloalkyl substituted with hydroxy, alkoxy, alkyl, halogen or alkanoyloxy; phenyl; phenyl substituted with one or more groups selected from lower alkyl, lower alkoxy, cyano, alkanoyloxy or —L—Z; straight or branched chain alkyl of 1-12 carbons and such alkyl substituted with one or more moieties of the formula

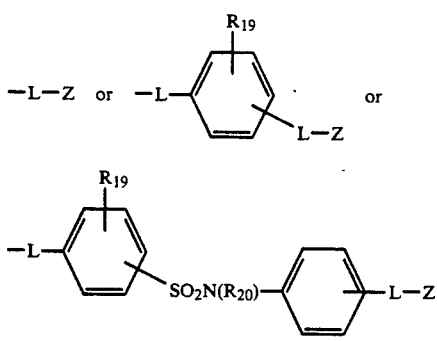

cyano, halogen, 2-pyrrolidino, phthalimidino, vinylsulfonyl, acrylamido, o-benzoic sulfonimide, a group of the formula

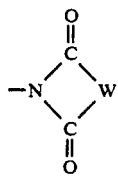

phenyl, and phenyl substituted with lower alkyl, lower alkoxy, halogen, carbalkoxy, cyano, carboxy or acyloxy; wherein Z as defined above;

$R_{19}$ is selected from hydrogen, lower alkyl, or lower alkanoylamino, lower alkoxy, halogen;

$R_{20}$ is selected from hydrogen; lower alkyl; lower alkyl substituted with hydroxy, acyloxy, phenyl, cycloalkyl, halogen or alkoxy; cycloalkyl; phenyl; phenyl substituted with lower alkyl, lower alkoxy, halogen, hydroxy, alkanoylamino, carbalkoxy, carboxy, cyano, or alkanoyloxy;

wherein the alkyl group represented by $R_{17}$ and $R_{18}$ can be further substituted with a group selected from those of the formulae: $-O-R_{21}$; $-SO_2-R_{22}$; $-CON(R_{21})R_{23}$; $-SO_2N(R_{21})R_{23}$; $-N(R_{21})SO_2R_{22}$; $-OCO-R_{23}$; $-OCO_2R_{23}$; $-OCON(R_{21})R_{23}$; $-SR_{24}$ or $-SO_2CH_2CH_2SR_{24}$;

wherein $R_{21}$ and $R_{23}$ are selected from hydrogen; lower alkyl; lower alkyl substituted with hydroxy, aryloxy, halogen, cycloalkyl or phenyl; cycloalkyl; phenyl; phenyl substituted with lower alkyl, lower alkoxy, halogen, hydroxy, alkanoylamino, carbalkoxy, carboxy, cyano or alkanoyloxy;

$R_{22}$ represents the same substituents listed for $R_{21}$ and $R_{23}$ excepting hydrogen;

$R_{24}$ is selected from a group listed above for $R_{21}$ and $R_{23}$ plus benzothiazol-2-yl, benoxazol-2-yl, benzimidazol-2-yl, pyridyl, pyrimidinyl, 1,3,4-thiadiazolyl, 1,3,4-oxadiazolyl, naphthyl or triazolyl;

W is selected from: lower alkylene of 1-3 carbons; lower alkylene substituted with hydroxy, halogen, alkoxy or acyloxy; vinyl; 1,2-phenylene; 1,2-phenylene substituted with lower alkyl, lower alkoxy halogen, carboxy or carbalkoxy; 1,2-cyclohexylene; $-O-CH_2-$; $-CH_2OCH_2-$; $-SCH_2-$; $-N(R_{21})CH_2-$; $-N(R_{21})CH_2CH_2-$; or $-CH_2N(R_{21})CH_2-$;

L is selected from a covalent bond, oxygen, sulfur, $-SO_2-$, $-SO_2N(R_{21})-$, $-N(SO_2R_{22})-$, $-N(R_{21})-$, $-COO-$, or $-CON(R_{21})-$;

$R_{25}$, $R_{26}$, and $R_{27}$ are independently selected from hydrogen or lower alkyl;

$R_{28}$ is hydrogen, cycloalkyl, alkyl, 2-thienyl, phenyl, phenyl substituted with halogen, lower alkyl, or lower alkoxy;

$R_{29}$ is hydrogen or 1-2 substituents selected from lower alkyl, lower alkoxy or halogen;

$R_{30}$ is selected from cyano, carbalkoxy, alkylsulfonyl, arylsulfonyl or unsubstituted or substituted carbamoyl;

$R_{31}$ is hydrogen, lower alkyl or aryl;

$R_{32}$ and $R_{33}$ are independently selected from hydrogen, lower alkyl, lower alkoxy, halogen or $-O-Z$;

wherein X is a covalent bond, oxygen or sulfur;

wherein M is an active methylene residue selected from those of the formulae:

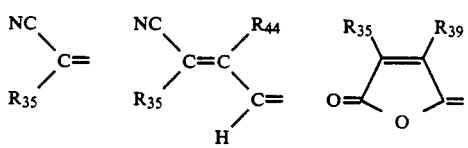

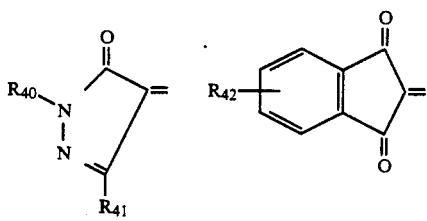

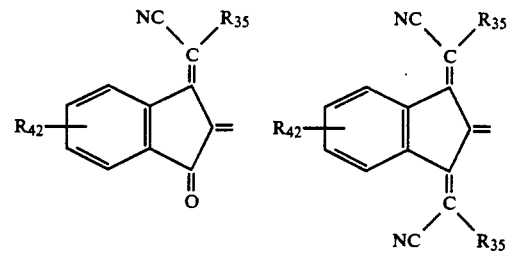

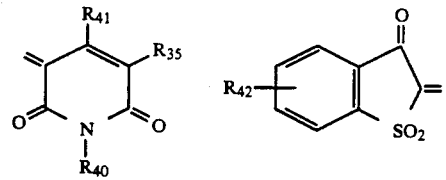

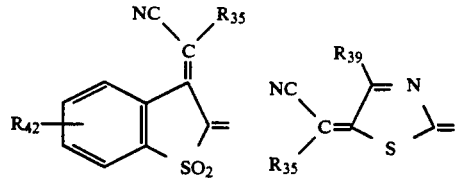

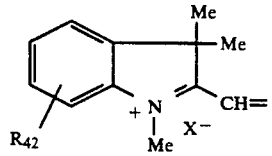

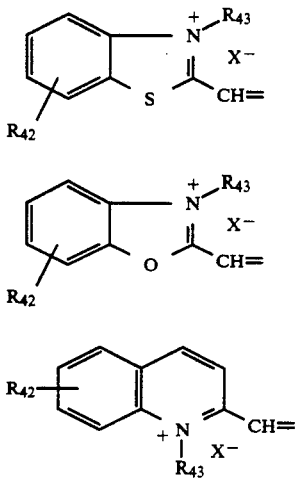

wherein:

$R_{35}$ is selected from cyano, $-CON(R_{36})R_{37}$, $-CO_2R_{36}$, $-COR_{38}$, or $-SO_2R_{38}$;

$R_{36}$ and $R_{37}$ are selected from hydrogen, cycloalkyl, unsubstituted or substituted alkyl, phenyl, phenyl substituted with lower alkyl, lower alkoxy or halogen;

$R_{38}$ is selected from substituents represented by $R_{36}$ and $R_{37}$ excepting hydrogen;

$R_{39}$ is selected from lower alkyl, cycloalkyl or aryl;

$R_{40}$ is selected from hydrogen, alkyl or aryl;

$R_{41}$ is selected from hydrogen, lower alkyl, aryl or carbalkoxy;

$R_{42}$ is hydrogen or 1-2 substituents selected from lower alkyl, lower alkoxy or halogen;

$R_{43}$ is selected from lower alkenyl, lower alkyl, benzyl, substituted benzyl, hydroxyalkyl, carbamoylalkyl, -alkylene-$CO_2^-M^+$ or -alkylene-$SO_3^-M^+$ wherein $M^+$ is $H^+$, $Na^+$, $K^+$, $Li^+$ or $NH_4^+$ and wherein $X^-$ is a counter anion selected from $Cl^-$, $Br^-$, $CH_3SO_4^-$, $C_2H_5SO_4^-$, or $ZnCl_4^{-2}/2$; and $R_{44}$ is aryl or substituted aryl;

with the proviso that the colorant contain at least one poly(oxyalkylene) moiety $-Z$.

In certain other preferred embodiments:

said A or $A_1$ units comprise from about 5.0 percent to about 50 percent of the total A or $A_1+B$ units, and conversely the ($-RO-$) units comprise from about 50 percent to about 95 percent of the total A or $A_1+B$ units;

at least about 50 percent of the ($-RO-$) units in T are derived from propylene or butylene oxide or mixtures thereof; and Y or $Y_1$ is a nucleophilic residue derived from primary or secondary amines; hydroxyl compounds, mercapto compounds, sulfinic acids, sulfonamides, imides or sulfoic imides; and in particular substituted or unsubstituted anilines; 1,2,3,4-tetrahydroquinolines; 3,4-dihydro-2H-1,4-benzoxazines; 2-aminothiazoles; indoles; 2,3-dihydroindoles; carbazoles; naphthylamines; phenoxazines; phenothiazines; diphenylamines; 2-aminothiophenes or aminopyridines.

In all of the above alkyl, alkylene, alkyoxy, and the like groups or moieties which are or which contain aliphatic hydrocarbon components, said groups or moieties contain 1-12 carbons which are unsubstituted or substituted unless otherwise specified. Also, the term cycloalkyl includes 5-7 membered cycloaliphatic groups and the term aryl includes unsubstituted or substituted carbocyclic and heterocyclic aromatic groups containing 2-14 carbons.

Preferred polymeric compositions or substrates incorporating the present invention are polyurethanes and thermoplastics containing a total of from about 0.001 to about 10.0 weight percent of one or a mixture of any of the colorants defined above, and particularly preferred compositions are polyurethanes containing a total of from about 0.01 to about 3.0 weight percent of one or more colorants defined above.

According to the present process, the colorant may be incorporated into the resins during their preparation by simply adding the colorant to the reaction mixture or to one of the components of the reaction mixture before or during the polyaddition reaction. For example the colorant may be admixed with chain extending diols, e.g., ethylene glycol, diethylene glycol and butane diol in the case of polyester preparation. In general, it is desirable not to use more than about 20 percent by weight of colorant based on the weight of polyol. In most cases very strong colorations are produced with a small proportion of the colorant, for example, from about 0.1 to about 2 percent, preferably 0.5 to 1 percent by weight colorant based on the weight of polyol. For instance, when the thermosetting resin to be colored is a polyurethane resin the process may be carried out by adding the coloring agent in the form of a solid, solution, diespersion or liquid to the polyol or even in some instances to the polyisocyanate component of the reaction mixture either before or during polyurethane formation. The subsequent reaction may be carried out in the usual manner, i.e., in the same way as for polyurethane resins which are not colored.

It is particularly noted that the present coloring agents in one embodiment of the present invention are polymeric, liquid, reactive coloring materials. As such, they may be added to the reaction mixture or to one of the components thereof in solvent-free form rather than as a of solution or dispersion in solvent or dispersing medium. Obviously, such liquids have significant processing advantages over solids in solvent systems in eliminating the need for extraneous nonreactive or reactive solvent or dispersing agent and thus the need for removing such from product.

The thermosetting resins to which the process of the present invention may be applied may be made by the reaction of a nucleophile with an electrophile. Examples of such resins include alkyds, allylics, the amines, e.g., melamine and urea, epoxies, phenolics, polyesters, silicones and urethanes. These resins colored according to the present invention can be used in a variety of end uses, including moldings, sealants, elastomers, films, fibers, lacquers, coatings and foamed materials. It has been found in particular that the present colorants may be quite advantageously employed for the production of foams, such as polyurethane foams which may be soft, semi-rigid or rigid, or the so-called polyurethane integral skin and microcellular foams. Such foams are useful for producing shaped products by injection molding, extrusion or the like. The polyols may be hydroxy terminated polyesters which contain hydroxyl groups, in particular, reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols.

The present colorants are, in themselves, polymeric compounds, thus they may be soluble, for instance, in most polyols which would be used in polyurethane manufacture, in most epoxy formulations, in polyester formulations, as well as in colorant admixtures. This property may be particularly valuable in that this solubility permits rapid mixing and homogeneous distribution throughout the resin, thus eliminating shading differences and streaks when properly mixed. The colorants also have greatly reduced no tendency to settle as compared to pigment dispersions. The intersolubilities of the colorants makes it possible to prepare a blend of two or more colorants to provide a wide range of colors or shades.

In the use of the present primary hydroxyl enhanced compounds, which contain hydroxyls, in the production of polyurethane foams, several reactions generally take place. First an isocyanate such as toluene diisocyanate is reacted with a polyol such as polypropylene glycol in the presence of heat and suitable catalyst. If both the isocyanate and the polyol are difunctional, a linear polyurethane results, whereas should either have functionalities greater than two, a cross linked polymer will result. If the hydroxylic compound available to react with the —NCO group is water, the initial reaction product is a carbamic acid which is unstable and breaks down into a primary amine and carbon dioxide. Since excess isocyanate is typically present, the reaction of the isocyanate with the amine generated by decarboxylation of the carbamic acids occurs, and if controlled, the liberated carbon dioxide becomes the blowing agent for the production of the foam. Further, the primary amine produced also reacts with isocyanate to yield a substituted urea which affords strength and increased firmness characteristics to the polymer.

In general, amine and tin catalysts are used to delicately balance the reaction of isocyanate with water, the blowing reaction, and the reaction of isocyanate with polymer building substituents. If the carbon dioxide is released too early, the polymer has no strength and the foam collapses. If polymer formation advances to rapidly a closed cell foam results which will collapse on cooling. If the colorant or another component reacts to upset the catalyst balance, poorly formed foam will result. It is particularly noted, that the present colorants are especially stable to the tin catalysts and to excess isocyanate materials employed.

The present liquid reactive coloring agents may also be of considerable value in reaction injection molding (RIM) applications. The RIM process is a method of producing molded polyurethanes and other polymers wherein the two reactive streams are mixed while being poured into a mold. Upon reaction, the polymer is "blown" by chemicals to produce a foam structure. This process may be hindered by the presence of solid particles, such as conventional pigments. By comparison, the present colorants do not effect this hinderance since there are no solid particles in the system and the colorant becomes part of the polymer through chemical reaction.

Thermoplastic resins which may be used according to the present invention include a wide range of resins and synthetic resin compositions which are known in the art as being essentially thermoplastic in nature. The term "thermoplastic" is used herein in its conventional sense to mean a resin having the property of softening or fusing when heated and of hardening again when cooled" (see Webster's Seventh Collegiate Dictionary, G & C Merriam Co., 1965). Thermoplastic resins are to be clearly distinguished both in terms of their essential physical and chemical characteristics from thermosetting resins. The term "thermosetting" used herein is also used in its conventional sense to means a resin "having the property of becoming permanently rigid when heated or cured.

Examples of thermoplastic resin systems which may be employed include a wide range of polyolefin polymers, e.g., polyethylene, linear low density polyethylene, polypropylene, polybutylene and copolymers made from ethylene, propylene and/or butylene. Other thermoplastic polymers which may be employed according to the present invention include polyvinyl chloride, polyvinylidene chloride, cellulosic resins such as cellulose acetate, cellulose acetate butyrate and cellulose acetate propionate, acrylic resins such as poly(methyl methacrylate), styrene-acrylonitrile copolymer, polystyrene, polycarbonate and acrylonitrile-butadiene-styrene terpolymer (herein ABS), polyamides such as nylon 6 and nylon 66 and polyesters such as poly(ethylene terephthalate), especially glycol modified poly(ethylene terephthalate) and poly(butylene terephthalate).

As mentioned above, the colorants may be employed in the thermoplastic resins in a minor amount sufficient to provide the desired degree of coloration therein. The actual amount used will, in addition to the desired depth of shade, depend upon the tinctorial strength of the chromophore used and the overall molecular weight of the colorant, e.g., chromophore plus poly(oxyalkylene) chain length. Typically the amount of colorant employed may be from about 0.001 percent to about 10 percent, preferably from about 0.01 percent to about 3 percent, and most preferably from about 0.01 to about 1.0 percent by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives as will be readily recognized by those skilled in the art. In general, the present colorants have been observed to have little or no adverse interactions with these conventional additives.

The colorants if used properly ordinarily do not detract from the clarity of the resin, and it has been found that additives which improve the clarity may be used in combination with colorants as described herein to provide resin products that are both colored and which also have excellent clarity. One particular class of additives which have been found to be useful in this regard are the benzylidene sorbitols including substituted benzylidene sorbitols such as those described in: U.S. Pat. No. 4,016,118 to Hamada, et al. (E.C. Chemical); U.S. Pat. No. 4,371,645 to Mahaffey (Milliken Research Corporation); and Japanese Pat. No. SHO [1977] 53-117044 to Kobsyashi, et al. (New Japan Chemical); all of these patents being hereby incorporated herein by reference.

The particular shade of the colorant will depend primarily upon substituents present on the basic chromophore. A large variety of colors and shades may be obtained by blending two or more colorants. Blending the colorants of the present invention can be readily accomplished as the colorants are polymeric materials which may have substantially identical solubility characteristics dictated by the nature of the polymeric chain. Therefore, the colorants are in general soluble in one another, and are also, in general, completely compatible with each other.

According to the process of the invention, the colorant may be incorporated into the thermoplastic resin using conventional techniques such as those employed to incorporate other additives in such resins. For instance, the colorant may be incorporated into the resin by simply adding it to the resin while the resin is in a plasticized or molten state, typically prior to formation of the polymer into its final shape, e.g., by molding, extrusion, blow-molding and the like. For instance, when the thermoplastic resin to be colored is a polyolefin resin the process may be carried out by adding a colorant comprised of a poly(oxyalkylene) substituted chromophore group directly to the molten polymer, by tumbling it onto a pre-extruded pelletized resin, or by mixing it into the resin powder prior to extrusion. The polymer may then be molded or extruded in the usual manner, i.e., in the same way as for polyolefin resins which are not colored.

Alternatively, a concentrate of the colorant in an appropriate resin or vehicle may first be prepared. Such concentrate may contain an appropriately high percentage of colorant. The concentrates may be in the form of liquids, solids, e.g., powders, pellets, or the like, as may be desired. These may then be incorporated into the thermoplastic resin. Obviously, liquids may have certain processing advantages over solids, and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of or solvent or dispersing agent which is compatible with the resin, thus providing certain processing advantages.

The hydroxyl enriched aromatic amine intermediates of one embodiment of the invention are prepared in three steps. In the first step, the aromatic amine, is hydroxyalkylated by the reaction with glycidol at about 80°-150° C. to give an aromatic amine intermediate having both primary and secondary hydroxyls. The glycidol is added in the presence of an inert gas such as nitrogen until the desired amount of glycidol is reacted. This reaction is carried out with or without solvents. If solvents are desired, toluene, xylenes, nitrobenzene, dioxane are representative solvents that may be used. Exemplary of the useful base catalysts are potassium hydroxide, lithium hydroxide, calcium hydroxide, and barium hydroxide. The amount of basic catalyst can vary but is usually in the range of from about 0.05% to about 2% by weight. In addition, certain tertiary organic amines are useful catalysts, such as dimethylaminocyclohexane, triethylamine, and benzyldimethylamine.

In the second step, the aromatic amine intermediate from step one is converted into a substantially soley secondary hydroxyl containing aromatic amine intermediate by further hydroxyalkylation with one or more alkylene oxides containing more than two carbon atoms at about 80°-150° C. This reaction is carried out as in step one.

In the third step, the aromatic amine intermediate from step two is converted into the final aromatic amine intermediate containing substantially solely primary hydroxyls by hydroxyethylation with ethylene oxide at about 80°-150° C. The ethylene oxide is added in the presence of an inert gas such as nitrogen until the desired amount of ethylene oxide is absorbed. This reaction is carried out as in step one.

The primary hydroxyl enriched aromatic colorants of the present invention can be prepared by many different methods depending, e.g., on the chromophoric group desired in the polymer. Some of these routes are illustrated in (I) through (IX) below. These routes are given as illustrations and are not intended to limit the scope of the present invention.

ROUTE I

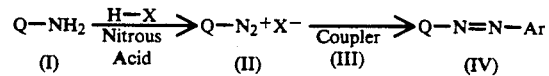

In Route I the azo colorants of the invention are prepared by diazotizing carbocylic or heterocyclic amines (I) to give diazonium salts (II) which are coupled with intermediate aromatic coupling components (III) to give the azo colorants (IV) wherein Q— and —Ar are as defined above, and wherein either one or both of Q— and —Ar contain at least one —Z moiety. Various methods for diazotizing aromatic amines are known in the chemistry of azo dyes. The couplings are usually carried out in dilute mineral acids or organic acids such as acetic or propionic acid, with coupling being facilitated by addition of some base to raise the pH to a least 3-4.

The methine colorants of the invention are prepared in according to Route II, wherein Route II comprises three steps.

In the first step, primary hydroxyl enriched aromatic amine intermediate, H—Ar, is reacted with an organic acid anhydride to form the diester intermediate. Most generally, the aromatic amine intermediate, H—Ar, is reacted with acetic anhydride at a temperature within the range of about 60°-130° C. Certain tertiary organic amines are useful catalysts, such as triethylamine, dimethylaminocyclohexane and benzyldimethylamine.

In the second step, the aromatic diester intermediate, from step one is reacted with the Vilsmeier reagent to get the corresponding aldehydes, [Bull. Societe Chim. de France, No. 10:1989-99 (October 1962); Angewandte Chemie 72, No. 22, 836-845, (November 1960)] generally using N,N-dimethylformamide (DMF) and phosphorous oxychloride. After base hydrolysis, the corresponding aromatic aldehyde intermediate, Ar—COH is isolated.

ROUTE II-STEP-THREE

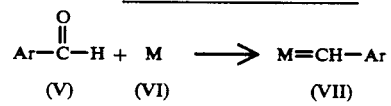

Finally, in the third step, the aromatic aldehyde intermediate Ar—COH (V) is reacted under Knoeveneagel conditions with an active methylene compound (VI) to give the methine compound (VII).

The azamethine colorants of the invention are prepared in two steps according to Route III.

ROUTE III STEP-ONE

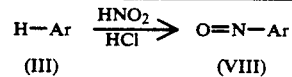

In step one, the aromatic amine intermediate (III) is nitrosated using nitrous acid to give nitroso aromatic amine intermediates (VIII).

ROUTE III STEP-TWO

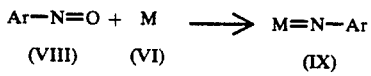

| Ar—N=O + | M | ⟶ | M=N—Ar |
|---|---|---|---|
| (VIII) | (VI) | | (IX) |

In the second step, the nitroso aromatic amine intermediate (VIII) is reacted with an active methylene compound (VI) to give the azamethine compound (IX).

The cationic azo or methine colorants of the invention can be prepared by many different methods. Some of these methods are illustrated in Routes (IV) through (VI) below. These routes are given as illustrations and are not intended to limit the scope of the present invention.

ROUTE IV

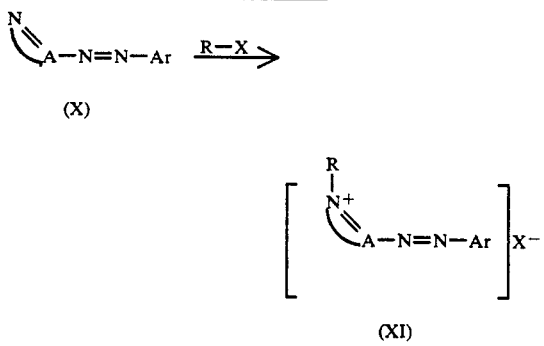

The azo colorants (X), where A is the residue of a heterocyclic ring, are converted to the corresponding cationic colorants (XI), by reacting with an alkylating agent at elevated temperature with or without an inert solvent. Suitable alkylating agents that can be used are dialkyl sulfates, alkyl halides, aralkyl halides, alkyl esters of sulfonic acids, activated vinyl compounds, haloacetic acids, etc. Examples of such alkylating agents include dimethyl sulfate, diethyl sulfate, dipropyl sulfate, ethyl bromide, butyl bromide, methyl iodide, ethyl iodide, benzyl chloride, benzyl bromide, methyl-p-toluene sulfonate, butyl-p-toluene sulfonate, ethyl benzenesulfonate, acrylamide, and bromoacetic acid.

The cationic methine colorants of the invention are prepared in several ways as illustrated in Routes V and VI.

ROUTE V

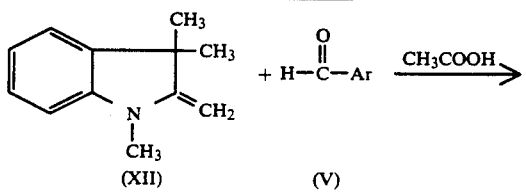

-continued
ROUTE V

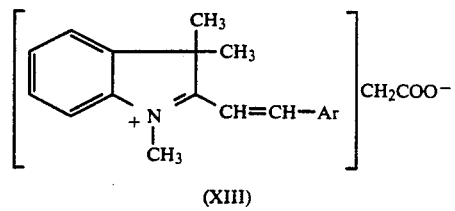

In Route V, methine cationic colorants (XIII) of the invention are prepared by condensing substituted 2-methylene-1,3,3-trimethylindoline (Fischer's Base) (XII) with the aromatic aldehyde (V) described above at elevated temperature in the presence of a catalyst with or without an inert solvent. The base (XII), is commercially available and the condensation procedures are well known.

ROUTE VI

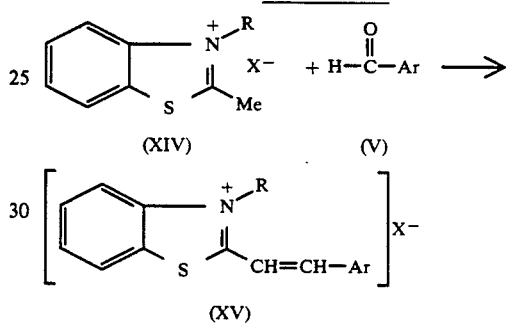

Alternatively, cationic methines (XV) are prepared by condensing substituted quaternary bases salts (XIV) with a the aromatic aldehyde (V) described above at elevated temperature in the presence of a catalyst with or without an inert solvent. The quaternary base salts of formula (XIV) and the condensation procedures are well known. Examples of useful quaternary bases include quaternized quinolines, benzothiazoles, benzoxazoles, indolenines, and benzimidazoles. Examples of the above anion $X^-$ include $Cl^-$, $Br^-$, $I^-$, $CH_3SO_4^-$, $C_2H_5SO_4^-$, or the like. The anion used depends upon the method of isolation utilized and the particular quaterizing agent employed.

The following examples and tables illustrate specific compounds of the present invention and their preparation, various parts or percentages, unless otherwise stated, being by weight. The abbreviations EO, PO, and BO refer to —$CH_2CH_2$—, —$CH(CH_3)CH_2$—, and —$CH(C_2H_5)CH_2$—, respectively. In the following examples, $GL_1$ signifies an $A_1$ glycidol unit as defined above, and GL signifies the reacted residue of an $A_1$ unit. Further, the numerical designation preceding the $GL_1$ or GL units represent the average number of such units per reactive site of the nucleophile. For example, in Example 1 wherein the numerical designation is 1.5, in actuality one reactive site will have a single $GL_1$ unit and the other will have two such units. Also, referring to Example 1A, the terminology "1.5GL/5PO/5EO-H" means that each hydroxyl of the $GL_1$ unit has been reacted with at least one propylene oxide moiety PO, the PO being in the reaction system in stoichiometric excess, and that each terminal PO has been reacted with an ethylene oxide moiety EO also being in stoichiometric excess in the reaction system. It is noted that numerical valves assigned to the GL, PO, and EO units of Example 1A, represent the average of these units per reactive site of the nucleophile.

EXAMPLE 1

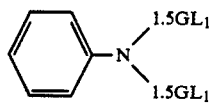

In a dry 1000 ml three-neck flask equipped with nitrogen purge, heating mantle, mechanical stirrer, temperature controller and addition funnel are charged 125 grams of aniline (1.34 moles) and 0.6 gram of potassium hydroxide. The mixture is heated to 110° C. with stirring with by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°-125° C. by the addition rate.

After all of the glycidol is charged the reaction mixture is to post-heated for one hour. At this time the hydroxyl number is run for the aniline-3 glycidol intermediate and is found to be 905 (theory is 890).

EXAMPLE 1A

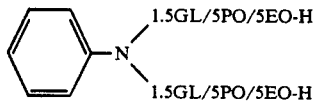

In a two liter autoclave are charged 315 grams (1 mole) of aniline 3 glycidol intermediate of Example 1 and 2 grams of potassium hydroxide catalyst. The reactor is purged three times to 60 psi with nitrogen and is then heated to 250° F. under 5 psi nitrogen pressure. Next, 580 grams (10 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 325 (theory is 313).

Next, 440 grams (10 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 208 (theory is 210).

After vacuum stripping at 200° F. for 15 minutes the aniline 3GL/10PO/10EO-H intermediate has an average gram molecular weight of 1349 and is ready for use.

EXAMPLE 1B

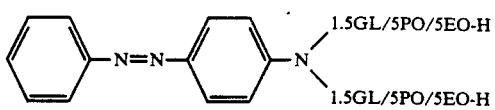

One hundred eighty grams acetic acid, 41 grams propionic acid, and 4 drops of 2-ethyl hexanol defoamer are added to a 500 milliliter three necked flask equipped with a thermometer, cooling bath, and mechanical stirrer. The mixture is cooled and 9.3 grams (0.1 mole) of aniline are added to the flask. The mixture is further cooled to below 5° C. after which 33 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 146.9 grams (0.11 mole) of the Example 1A aniline 3GL/10PO/10EO-H intermediate, 200 grams of water, 200 grams of ice and 8 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 268 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellow liquid with a maximum absorbance at 416 nm.

EXAMPLE 2

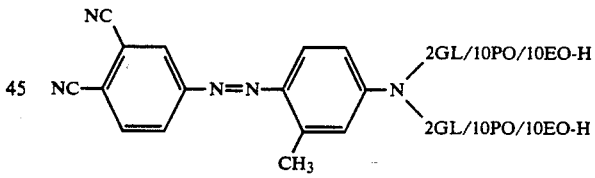

A 2000 milliliter beaker is charged with 268.7 grams of the m-toluidine 4GL/20PO/20EO-H intermediate (0.11 mole), 300 grams of water, 300 grams of ice and 4 grams of urea. This mixture is cooled to below 0° C. The diazo solution (as prepared in Example 1) from 3,4-dicyanoaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid with a maximum absorbance at 500 nm.

EXAMPLE 3

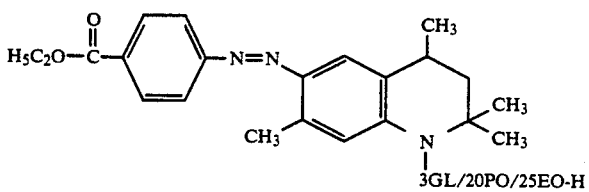

A 2000 milliliter beaker is charged with 287.5 grams of tetrahydroquinoline 3GL/20PO/25EO-H intermediate (0.11 mole), 300 grams of water, 300 grams of ice and 4 grams of urea. This mixture is cooled to below 0° C. The diazo solution (as prepared in Example 1) from 4-carboethoxyaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid.

EXAMPLE 4

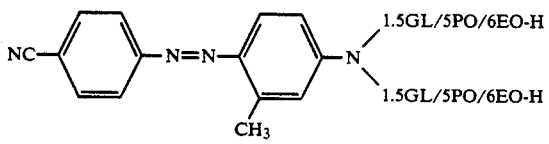

A 2000 milliliter beaker is charged with 158.1 grams of m-toluidine 3GL/10PO/12EO-H intermediate (0.11 mole), 200 grams of water, 200 grams of ice and 4 grams of urea. This mixture is cooled to below 0° C. The diazo solution (as prepared in Example 1) from 4-cyanoaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid.

EXAMPLE 5

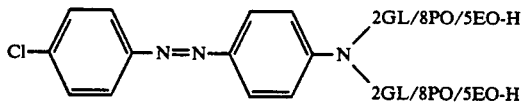

A 2000 milliliter beaker is charged with 193.3 grams of aniline 4GL/16PO/10EO-H intermediate (0.11 mole), 300 grams of water, 300 grams of ice and 4 grams of urea. This mixture is cooled to below 0° C. The diazo solution (as prepared in Example 1) from 4-chloroaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellow liquid.

EXAMPLE 6

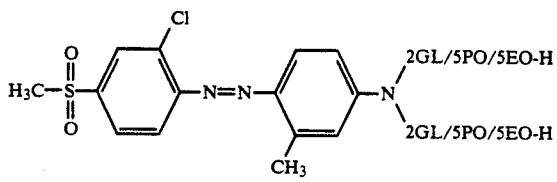

A 2000 milliliter beaker is charged with 156.8 grams of m-toluidine 4GL/10PO/10EO-H intermediate (0.11 mole), 200 grams of water, 200 grams of ice and 4 grams of urea. This mixture is cooled to below 0° C. The diazo solution (as prepared in Example 1) from 2-chloro-4-methylsulfonylaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid with a maximum absorbance at 472 nm.

EXAMPLE 7

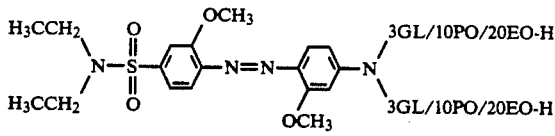

A 2000 milliliter beaker is charged with 386.6 grams of m-anisidine intermediate (0.11 mole), 400 grams of water, 400 grams of ice and 4 grams of urea. This mixture is cooled to below 0° C. The diazo solution (as prepared in Example 1) from 2-methoxy-4-N,N-diethylsulfamoylaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orangish-yellow liquid with a maximum absorbance at 435 nm.

EXAMPLE 8

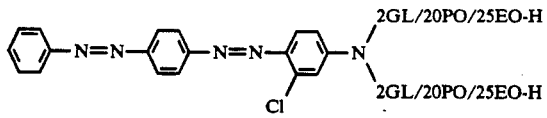

A 4000 milliliter beaker is charged with 543.8 grams of m-chloroaniline 4GL/40PO/50EO-H intermediate (0.11 mole), 600 grams of water, 600 grams of ice and 4 grams of urea. This mixture is cooled to below 0° C. The diazo solution (as prepared in Example 1) from 4-phenylazoaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid.

EXAMPLE 9

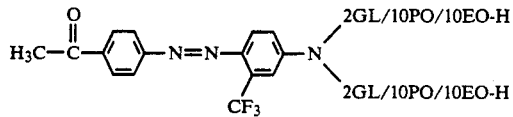

A 2000 milliliter beaker is charged with 287.2 grams of m-trifluoromethylaniline 4GL/20PO/20EO-H intermediate (0.11 mole), 300 grams of water, 300 grams of ice and 4 grams of urea. This mixture is cooled to below 0° C. The diazo solution (as prepared in Example 1) from 4-aminoacetophenone is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange.

EXAMPLE 10

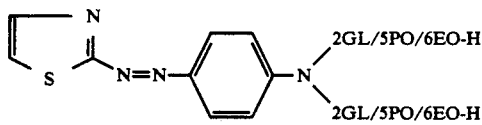

Five hundred and forty-nine grams of 85% phosphoric acid, 75 grams of 98% sulfuric acid, and 9 drops of 2-ethyl hexanol defoamer are added to a 1000 milliliter three necked flask equipped with a thermometer, cooling bath, and mechanical stirrer. The mixture is cooled and 30.9 grams (0.3 mole) of 2-aminothiazole are added to the flask. The mixture is further cooled to below 0° C. after which 105 grams of 40% nitrosyl sulfuric acid are added while maintaining the temperature below 5° C. After three hours the mixture gives a positive nitrite test and 2.5 grams of sulfamic acid are added slowly keeping the temperature below 5° C. A negative nitrite test is evident after one further hour.

A 4000 milliliter beaker is charged with 493.7 grams of aniline 4GL/10PO/10EO-H intermediate (0.33 mole), 500 grams of water, 500 grams of ice and 12 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 780 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange oil with a maximum absorbance at 493 nm.

EXAMPLE 11

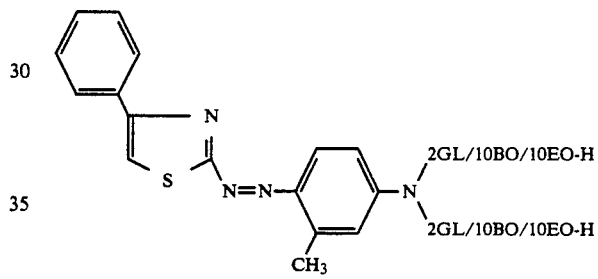

A 2000 milliliter beaker is charged with 299.5 grams of m-toluidine 4GL/20BO/20EO-H intermediate (0.11 mole), 400 grams of water, 400 grams of ice and 4 grams of urea. This mixture is cooled to below 0° C. The diazo solution (as prepared in Example 10) from 2-amino-4-phenylthiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an red liquid.

EXAMPLE 12

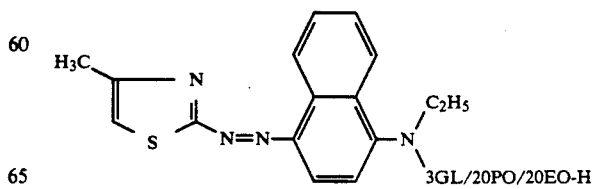

A 2000 milliliter beaker is charged with 267.5 grams of N-ethylnaphthylamine 3GL/20PO/20EO-H intermediate (0.11 mole), 300 grams of water, 300 grams of ice and 4 grams of urea. This mixture is cooled to below 0° C. The diazo solution (as prepared in Example 10) from 2-amino-4-methylthiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an red liquid.

EXAMPLE 13

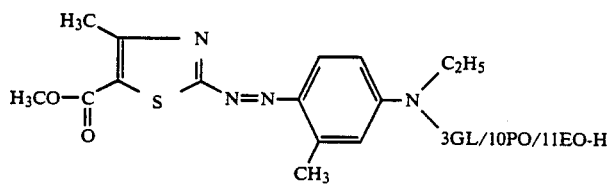

A milliliter beaker is charged with 156.3 grams of N-ethyl-m-toluidine 3GL/10PO/11EO-H intermediate (0.11 mole), 200 grams of water, 200 grams of ice and 4 grams of urea. This mixture is cooled to below 0° C. The diazo solution (as prepared in Example 10) from 2-amino-4-methyl-5-carboethoxythiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid with a maximum absorbance at 513 nm.

EXAMPLE 14

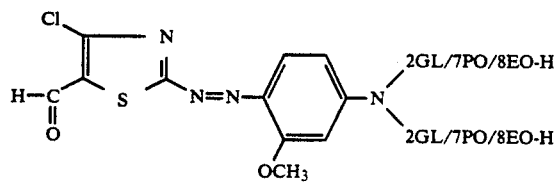

A 2000 milliliter beaker is charged with 212.9 grams of m-anisidine intermediate (0.11 mole), 300 grams of water, 300 grams of ice and 4 grams of urea. This mixture is cooled to below 0° C. The diazo solution (as prepared in Example 10) from 2-amino-4-chloro-3-formylthiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an bluish violet liquid.

EXAMPLE 15

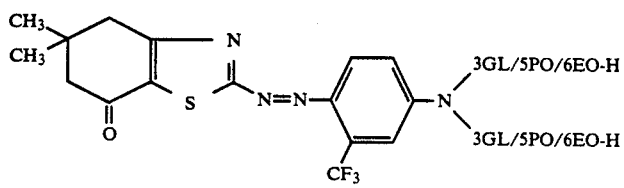

A 2000 milliliter beaker is charged with 188.4 grams of m-trifluoromethylaniline intermediate (0.11 mole), 300 grams of water, 300 grams of ice and 4 grams of urea. This mixture is cooled to below 0° C. The diazo solution (as prepared in Example 10) from 4,5-(3,3-dimethyl-oxytetramethylene)-2-aminothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 16

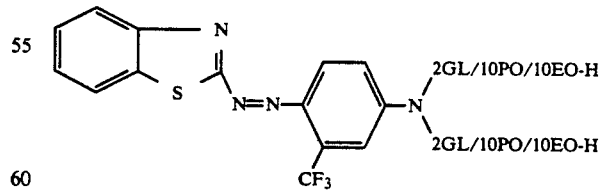

A 2000 milliliter beaker is charged with 180.1 grams of m-trifluoroaniline 4GL/10PO/10EO-H intermediate (0.11 mole), 300 grams of water, 300 grams of ice and 4 grams of urea. This mixture is cooled to below 0° C. The diazo solution (as prepared in Example 10) from 2-aminobenzothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 17

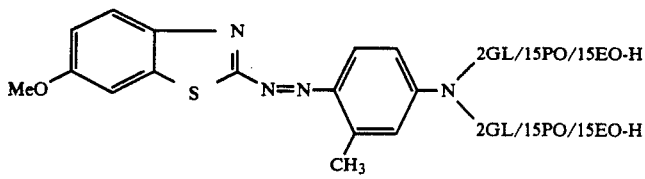

Five hundred and forty-nine grams of 85% phosphoric acid, 150 grams of 98% sulfuric acid, and 9 drops of 2-ethyl hexanol defoamer are added to a 1000 milliliter three necked flask equipped with a thermometer, cooling bath, and mechanical stirrer. The mixture is cooled and 54 grams (0.3 mole) of 2-amino-6-methoxybenzothiazole are added to the flask. The mixture are further cooled to below 0° C. after which 105 grams of 40% nitrosyl sulfuric acid are added while maintaining the temperature below 5° C. After three hours the mixture gives a positive nitrite test and 25 grams of sulfuric acid are added slowly keeping the temperature below 5° C. A negative nitrite test is evident after one further hour.

A 4000 milliliter beaker is charged with 380.9 grams of m-toluidine 4GL/30PO/30EO-H intermediate (0.33 mole), 500 grams of water, 500 grams of ice and 12 grams of urea. This mixture is cooled to below 0° C. The diazo solution was added dropwise to the beaker over about 30 minutes, maintaining the temperature below 10° C. The resulting mixture was stirred for several hours and allowed to stand overnight, after which 780 grams of 50% sodium hydroxide are added to neutralize excess acid to a pH of about 7 keeping the temperature below 20° C. The bottom salt layer was removed and the product was dissolved in methylene chloride. The methylene chloride solution was washed four times with water and then dried over sodium sulfate. The methylene chloride solvent was then filtered and stripped to give a red liquid with a maximum absorbance of 526 nm.

EXAMPLE 18

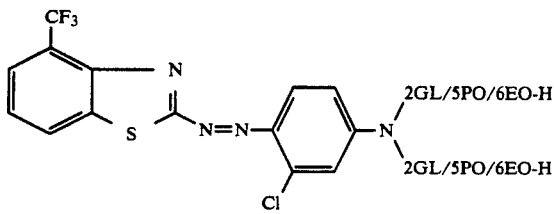

A 2000 milliliter beaker is charged with 168.5 grams of m-chloroaniline 4GL/10PO/12EO-H intermediate (0.11 mole), 300 grams of water, 300 grams of ice and 4 grams of urea. This mixture is cooled to below 0° C. The diazo solution (as prepared in Example 17) from 2-amino-4-trifluoromethylbenzothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 19

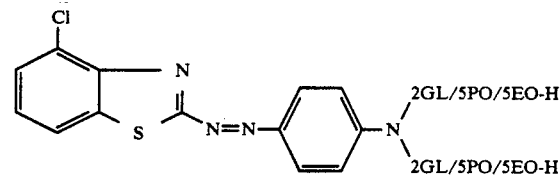

A 2000 milliliter beaker is charged with 155 grams of aniline 4GL/10PO/10EO-H intermediate (0.11 mole), 300 grams of water, 300 grams of ice and 4 grams of urea. This mixture is cooled to below 0° C. The diazo solution (as prepared in Example 17) from 2-amino-4-chlorobenzothiazole) is added dropwise to the beaker over about 30 minutes, maintaining the temperature below 10° C. The resulting mixture is stirred for several hours and allowed to stand overnight, after which 260 grams of 50% sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid with a maximum absorbance at 524 nm.

EXAMPLE 20 COMPARATIVE COLORANT

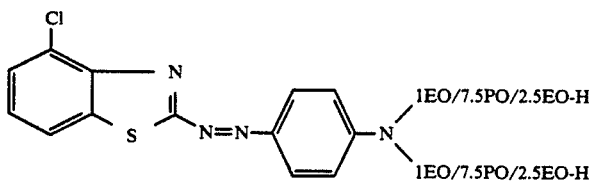

A 2000 milliliter beaker is charged with 139.8 grams of aniline 2EO/15PO/5EO-H intermediate (0.11 mole), 300 grams of water, 300 grams of ice and 4 grams of urea. This mixture is cooled to below 0° C. The diazo solution (as prepared in Example 17) from 2-amino-4-chlorobenzothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid with a maximum absorbance at 524 nm.

EXAMPLE 21

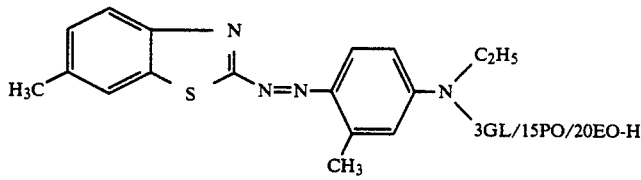

A 2000 milliliter beaker is charged with 231.7 grams of m-toluidine 3GL/15PO/20EO-H intermediate (0.11 mole), 400 grams of water, 400 grams of ice and 4 grams of urea. This mixture is cooled to below 0° C. The diazo solution (as prepared in Example 17) from 2-amino-6-methylbenzothiazole) is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 22

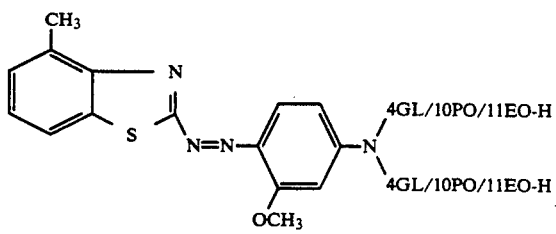

A 2000 milliliter beaker is charged with 312.7 grams of m-anisidine 8GL/20PO/22EO-H intermediate (0.11 mole), 500 grams of water, 500 grams of ice and 4 grams of urea. This mixture is cooled to below 0° C. The diazo solution (as prepared in Example 17) from 2-amino-4-methylbenzothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 23

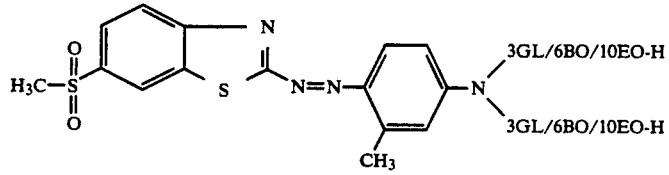

A 2000 milliliter beaker is charged with 252.4 grams of m-toluidine 6GL/12BO/20EO-H intermediate (0.11 mole), 300 grams of water, 300 grams of ice and 4 grams of urea. This mixture is cooled to below 0° C. The diazo solution (as prepared in Example 17) from 2-amino-6-sulfonylbenzothiazole) is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an red liquid.

EXAMPLE 24

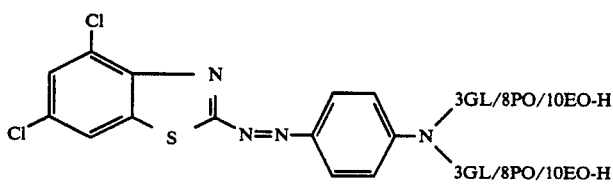

A 2000 milliliter beaker is charged with 258 grams of aniline 6GL/18PO/20EO-H intermediate (0.11 mole), 400 grams of water, 400 grams of ice and 4 grams of urea. This mixture is cooled to below 0° C. The diazo solution (as prepared in Example 17) from 2-amino-4,6-dichlorobenzothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an red liquid.

EXAMPLE 25

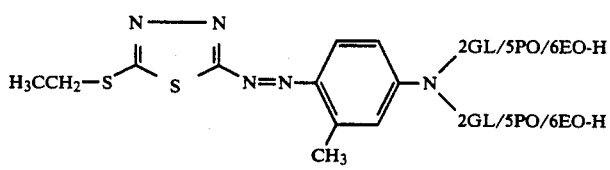

Three hundred twenty grams acetic acid, 80 grams propionic acid, and 9 drops of 2-ethyl hexanol defoamer are added to a 1000 milliliter three necked flask equipped with a thermometer, cooling bath, and mechanical stirrer. The mixture is cooled and 32.2 grams (0.2 mole) of 2-amino-5-ethylthio-1,3,4-thiadiazole are added to the flask. The mixture is further cooled to below 5° C. after which 70 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 332.4 grams (0.22 mole) of m-toluidine 4GL/10PO/12EO-H intermediate, 400 grams of water, 400 grams of ice and 8 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 503 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 26

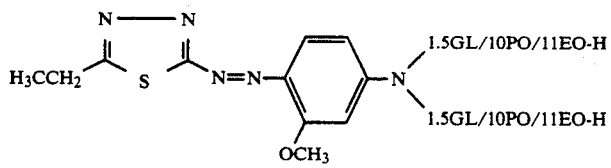

A 4000 milliliter beaker is charged with 544.1 grams of m-anisidine 3GL/20PO/22EO-H intermediate (0.22 mole), 600 grams of water, 600 grams of ice and 8 grams of urea. This mixture is cooled to below 0° C. The diazo solution (as prepared in Example 25) from 2-amino-5-ethyl-1,3,4-thiadiazole is added dropwise to the beaker over about 30 minutes, maintaining the temperature below 10° C. The resulting mixture is stirred for several hours and allowed to stand overnight, after which 503 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 27

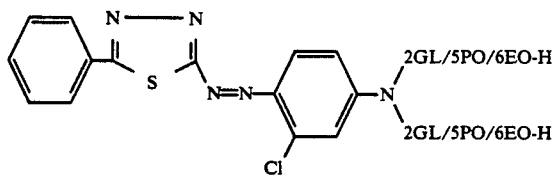

A 2000 milliliter beaker is charged with 336.9 grams of m-chloroaniline 4GL/10PO/12EO-H intermediate (0.22 mole), 400 grams of water, 400 grams of ice and 8 grams of urea. This mixture is cooled to below 0° C. The diazo solution (as prepared in Example 25) from 2-amino-5-phenyl-1,3,4-thiadiazole is added dropwise to the beaker over about 30 minutes, maintaining the temperature below 10° C. The resulting mixture is stirred for several hours and allowed to stand overnight, after which 503 grams of 50% sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 28

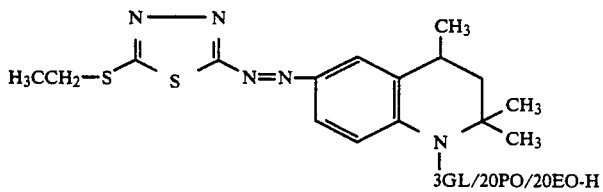

A 4000 milliliter beaker is charged with 536.1 grams of 2,2,4-trimethyltetrahydroquinoline 3GL/20PO/20EO-H intermediate (0.22 mole), 600 grams of water, 600 grams of ice and 8 grams of urea. This mixture is cooled to below 0° C. The diazo solution (as prepared in Example 25) from 2-amino-5-ethyl-1,3,4-thiadiazole is added dropwise to the beaker over about 30 minutes, maintaining the temperature below 10° C. The resulting mixture is stirred for several hours and allowed to stand overnight, after which 503 grams of 50% sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 29

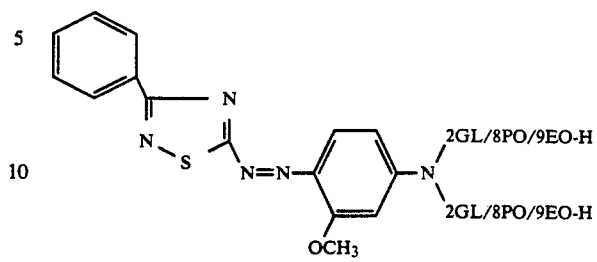

One hundred and fifty grams of 85% phosphoric acid, and 3 drops of 2-ethyl hexanol defoamer are added to a 1000 milliliter three necked flask equipped with a thermometer, cooling bath, and mechanical stirrer. The mixture is cooled and 17.7 grams (0.1 mole) of 5-amino-3-phenyl-1,2,4-thiadiazole are added to the flask. The mixture is further cooled to below 0° C. after which 35 grams of 40% nitrosyl sulfuric acid are added while maintaining the temperature below 5° C. After three hours the mixture gives a positive nitrite test and 2 grams of sulfamic acid are added slowly keeping the temperature below 5° C. A negative nitrite test was evident after one further hour.

A 1000 milliliter beaker is charged with 235.3 grams (0.11 mole) of m-anisidine 4GL/16PO/18EO-H intermediate, 300 grams of water, 300 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a bluish red liquid.

EXAMPLE 30

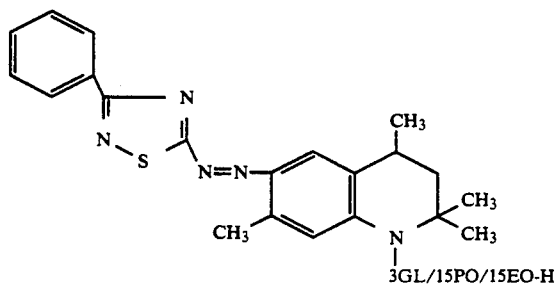

A 2000 milliliter beaker is charged with 213.5 grams of 2,2,4,7-tetramethyltetrahydroquinoline 3GL/15PO/15EO-H intermediate (0.11 mole), 300 grams of water, 300 grams of ice and 4 grams of urea. This mixture is cooled to below 0° C. The diazo solution (as prepared in Example 29) from 5-amino-3-phenyl-1,2,4-thiadiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an bluish red liquid.

EXAMPLE 31

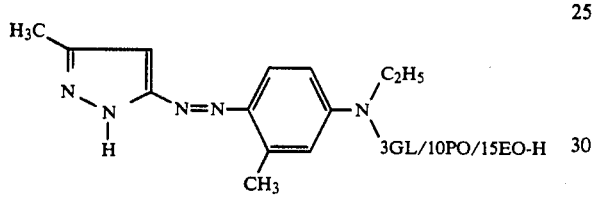

One hundred eighty grams acetic acid, 41 grams propionic acid, and 4 drops of 2-ethyl hexanol defoamer are added to a 500 milliliter three necked flask equipped with a thermometer, cooling bath, and mechanical stirrer. The mixture is cooled and 9.7 grams (0.1 mole) of 5-amino-3-methylpyrazole are added to the flask. The mixture is further cooled to below 5° C. after which 35 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 175.7 grams (0.11 mole) of N-ethyl-m-toluidine 3GL/10PO/15EO-H intermediate (0.11 mole), 300 grams of water, 300 grams of ice and 8 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 268 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an yellow liquid with a maximum absorbance at 418 nm.

EXAMPLE 32

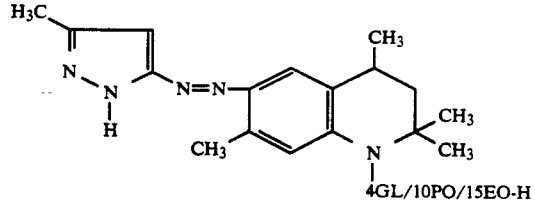

A 2000 milliliter beaker is charged with 189.9 grams of 2,2,4,7-tetramethyltetrahydroquinoline 4GL/10PO/15EO-H intermediate (0.11 mole), 300 grams of water, 300 grams of ice and 4 grams of urea. This mixture is cooled to below 0° C. The diazo solution (as prepared in Example 31) from 5-amino-3-methylpyrazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellow liquid.

EXAMPLE 33

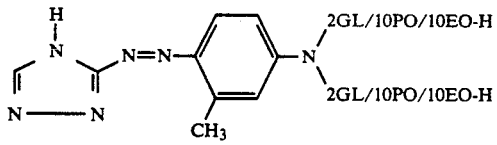

Three hundred grams acetic acid, 40 grams propionic acid, and 6 drops of 2-ethyl hexanol defoamer are added to a 500 milliliter three necked flask equipped with a thermometer, cooling bath, and mechanical stirrer. The mixture is cooled and 27 grams (0.32 mole) of 3-amino-1,2,4-triazole are added to the flask. The mixture is further cooled to below 5° C. after which 105 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 4000 milliliter beaker is charged with 855.1 grams (0.35 mole) of m-toluidine 4GL/20PO/20EO-H intermediate (0.33 mole), 900 grams of water, 900 grams of ice and 10 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 805 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellow liquid.

EXAMPLE 34

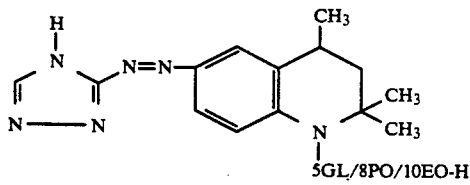

A 4000 milliliter beaker is charged with 507.2 grams of 2,2,4-trimethyltetrahydroquinoline 5GL/8PO/10EO-H intermediate (0.35 mole), 600 grams of water, 600 grams of ice and 12 grams of urea. This mixture is cooled to below 0° C. The diazo solution (as prepared in Example 33) from 3-amino-1,2,4-triazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellow liquid.

EXAMPLE 35

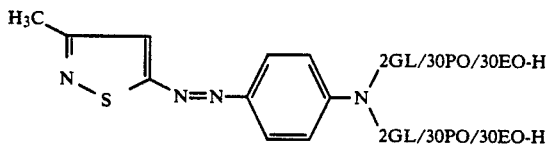

One hundred eighty grams acetic acid, 41 grams propionic acid, and 4 drops of 2-ethyl hexanol defoamer are added to a 500 milliliter three necked flask equipped with a thermometer, cooling bath, and mechanical stirrer. The mixture is cooled and 15 grams (0.1 mole) of 5-amino-3-methylisothiazole hydrochloride are added to the flask. The mixture is further cooled to below 5° C. after which 35 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 716 grams (0.11 mole) of aniline 4GL/60PO/60EO-H intermediate (0.11 mole), 800 grams of water, 800 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 268 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid with a maximum absorbance at 493 nm.

EXAMPLE 36

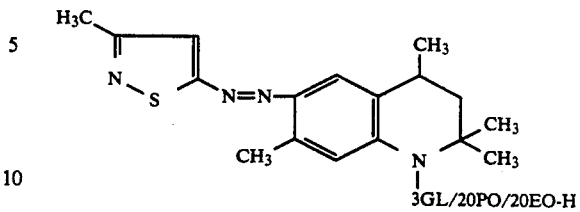

A 2000 milliliter beaker is charged with 269.6 grams of 2,2,4,7-tetramethyltetrahydroquinoline 3GL/20PO/20EO-H intermediate (0.11 mole), 300 grams of water, 300 grams of ice and 4 grams of urea. This mixture is cooled to below 0° C. The diazo solution (as prepared in Example 35) from 5-amino-3-methylisothiazole hydrochloride is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a reddish-orange liquid.

EXAMPLE 37

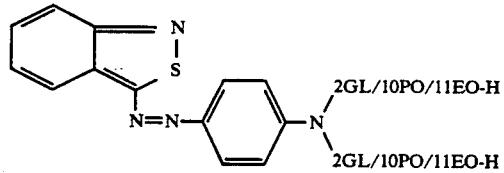

One hundred eighty grams acetic acid, 40 grams propionic acid, and 6 drops of 2-ethyl hexanol defoamer are added to a 500 milliliter three necked flask equipped with a thermometer, cooling bath, and mechanical stirrer. The mixture is cooled and 15 grams (0.1 mole) of 3-amino-1,2-benzisothiazole are added to the flask. The mixture is further cooled to below 5° C. after which 37.5 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 276.9 grams (0.11 mole) of aniline 4GL/20PO/22EO-H intermediate (0.11 mole), 300 grams of water, 300 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 268 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 38

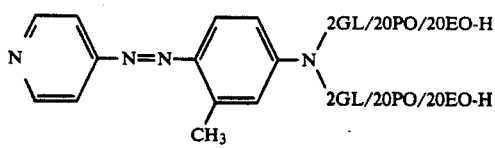

Three hundred grams acetic acid, 60 grams propionic acid, and 4 drops of 2-ethyl hexanol defoamer are added to a 1000 milliliter three necked flask equipped with a thermometer, cooling bath, and mechanical stirrer. The mixture is cooled and 28.2 grams (0.3 mole) of 4-aminopyridine are added to the flask. The mixture is further cooled to below 5° C. after which 135 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 4000 milliliter beaker is charged with 1479.4 grams (0.33 mole) of m-toluidine 4GL/40PO/40EO-H intermediate, 1000 grams of water, 1000 grams of ice and 12 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 804 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellowish orange liquid.

EXAMPLE 39

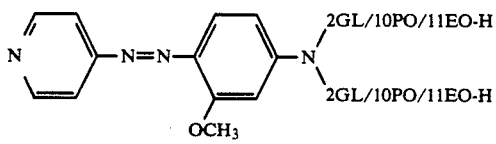

A 4000 milliliter beaker is charge with 840.5 grams of m-anisidine 4HL/290PO/22EO-H intermediate (0.33 mole), 900 grams of water, 900 grams of ice and 12 grams of urea. This mixture is cooled to below 0° C. The diazo solution (as prepared in Example 38) from 4-aminopyridine is added dropwise to the beaker over about 30 minutes, maintaining the temperature below 10° C. The resulting mixture is stirred for several hours and allowed to stand overnight, after which 805 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellowish orange liquid.

EXAMPLE 40

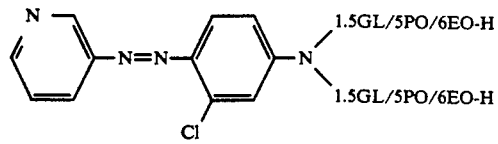

A 2000 milliliter beaker is charged with 481 grams of m-chloroaniline 3GL/10PO/12EO-H intermediate (0.33 mole), 500 grams of water, 500 grams of ice and 12 grams of urea. This mixture is cooled to below 0° C. The diazo solution (as prepared in Example 38) from 3-aminopyridine is added dropwise to the beaker over about 30 minutes, maintaining the temperature below 10° C. The resulting mixture is stirred for several hours and allowed to stand overnight, after which 805 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellowish orange liquid.

EXAMPLE 41

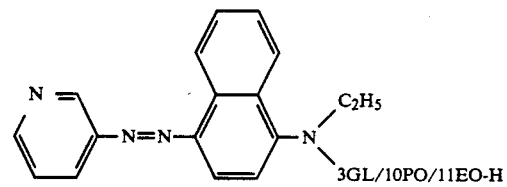

A 4000 milliliter beaker is charged with 480.8 grams of N-ethyl-aminonaphthalene 3GL/10PO/11EO-H intermediate (0.33 mole), 600 grams of water, 600 grams of ice and 12 grams of urea. This mixture is cooled to below 0° C. The diazo solution (as prepared in Example 38) from 3-aminopyridine is added dropwise to the beaker over about 30 minutes, maintaining the temperature below 10° C. The resulting mixture is stirred for several hours and allowed to stand overnight, after which 805 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellowish orange liquid.

EXAMPLE 42

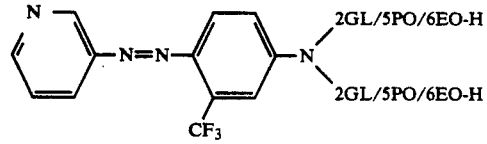

A 4000 milliliter beaker is charged with 516.5 grams m-trifluoromethylaniline 4GL/10PO/12EO-H intermediate (0.33 mole), 600 grams of water, 600 grams of ice and 12 grams of urea. This mixture is cooled to below 0° C. The diazo solution (as prepared in Example 38) from 3-aminopyridine is added dropwise to the beaker over about 30 minutes, maintaining the temperature below 10° C. The resulting mixture is stirred for several hours and allowed to stand overnight, after which 805 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellowish orange liquid.

EXAMPLE 43

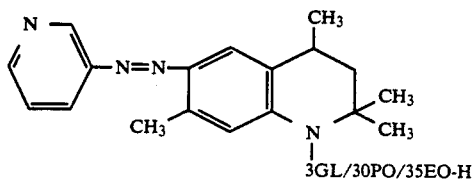

A 2000 milliliter beaker is charged with 387.6 grams of 2,2,4,7-tetramethyltetrahydroquinoline intermediate (0.11 mole), 400 grams of water, 400 grams of ice and 4 grams of urea. This mixture is cooled to below 0° C. The diazo solution (as prepared in Example 38) from 3-aminopyridine is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellowish orange liquid.

EXAMPLE 44

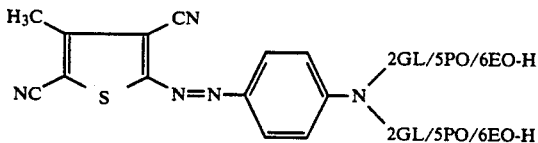

One hundred eighty-three grams of 85% phosphoric acid, 25 grams of 98% sulfuric acid, and 3 drops of 2-ethyl hexanol defoamer are added to a 1000 milliliter three necked flask equipped with a thermometer, cooling bath, and mechanical stirrer. The mixture is cooled and 16.3 grams (0.1 mole) of 2-amino-3,5-dicyano-4-methylthiophene. is added to the flask. The mixture is further cooled to below 0° C. after which 35 grams of 40% nitrosyl sulfuric acid are added while maintaining the temperature below 5° C. After three hours the mixture gives a positive nitrite test and 2.5 grams of sulfamic acid are added slowly keeping the temperature below 5° C. A negative nitrite test is evident after one further hour.

A 2000 milliliter beaker is charged with 158.6 grams of aniline 4GL/10PO/12EO-H intermediate (0.11 mole), 300 grams of water, 300 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an violet liquid with a maximum absorbance at 556 nm.

EXAMPLE 45

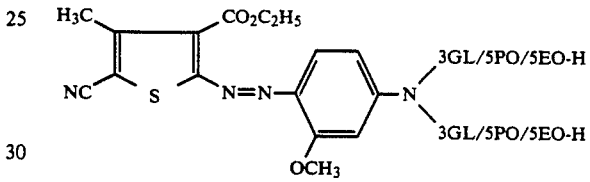

A 2000 milliliter beaker is charged with 166.6 grams of m-anisidine 6GL/10PO/10EO-H intermediate (0.11 mole), 300 grams of water, 300 grams of ice and 4 grams of urea. This mixture is cooled to below 0° C. The diazo solution (as prepared in Example 44) from 2-amino-3-carboethoxy-5-cyano-4-methylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a reddish violet liquid.

EXAMPLE 46

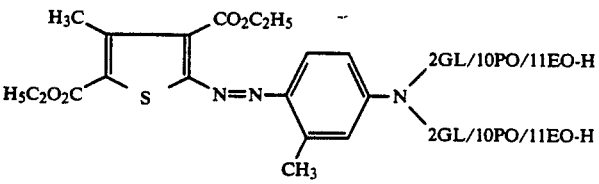

A 2000 milliliter beaker is charge with 265.7 grams of m-toluidine 4GL/20PO/22EO-H intermediate (0.11 mole), 400 grams of water, 400 grams of ice and 4 grams of urea. This mixture is cooled to below 0° C. The diazo solution (as prepared in Example 44) from 2-amino-3,5-dicarboethoxy-4-methylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid with a maximum absorbance at 530 nm.

EXAMPLE 47

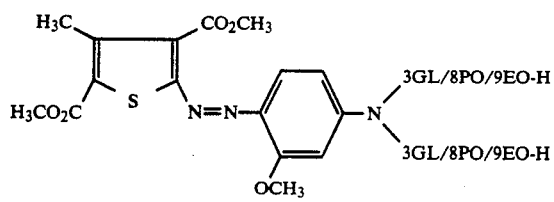

A 2000 milliliter beaker is charged with 240 grams of m-anisidine 6GL/16PO/18EO-H intermediate (0.11 mole), 300 grams of water, 300 grams of ice and 4 grams of urea. This mixture is cooled to below 0° C. The diazo solution (as prepared in Example 44) from 2-amino-3,5-dicarbomethoxy-4-methylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 48

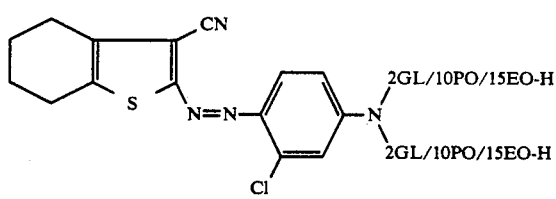

A 2000 milliliter beaker is charged with 304.7 grams of m-chloroaniline 4GL/20PO/30EO-H intermediate (0.11 mole), 400 grams of water, 400 grams of ice and 4 grams of urea. This mixture is cooled to below 0° C. The diazol solution (as prepared in Example 44) from 2-amino-3-cyano-4,5-tetramethylenethiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 49

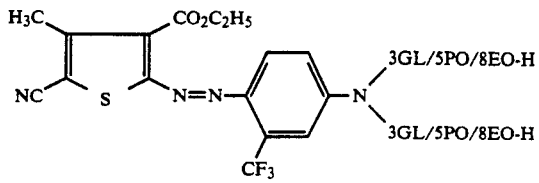

A 2000 milliliter beaker is charged with 198.2 grams of m-toluidine 6GL/10PO/16EO-H intermediate (0.11 mole), 400 grams of water, 400 grams of ice and 4 grams of urea. This mixture is cooled to below 0° C. The diazo solution (as prepared in Example 44) from 2-amino-3-carboethoxy-5-cyano-4-methylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a reddish violet liquid.

EXAMPLE 50

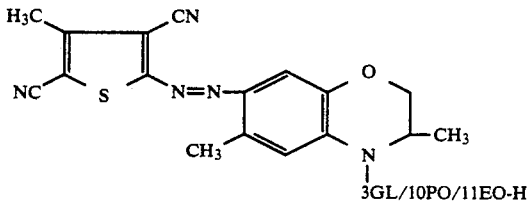

A 2000 milliliter beaker is charged with 149.1 grams of 3,7-dimethyl-3,4-dihydro-2H-1,4-benzoxazine 3GL/10PO/10EO-H intermediate (0.11 mole), 300 grams of water, 300 grams of ice and 4 grams of urea. This mixture is cooled to below 0° C. The diazo solution (as prepared in Example 44) from 2-amino-3,5-dicyano-4-methylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue violet liquid with a maximum absorbance at 578 nm.

EXAMPLE 51

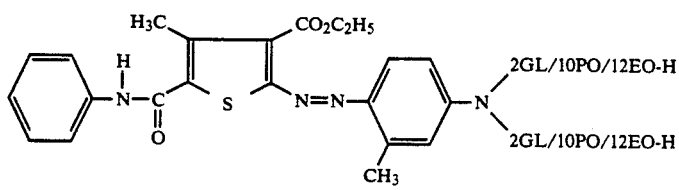

A 2000 milliliter beaker is charged with 274.9 grams of m-toluidine 4GL/20PO/24EO-H intermediate (0.11 mole), 400 grams of water, 400 grams of ice and 4 grams of urea. This mixture is cooled to below 0° C. The diazo solution (as prepared in Example 44) from 2-amino-3-carboethoxy-5-(N-phenylcarbamoyl)-4-methylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 52

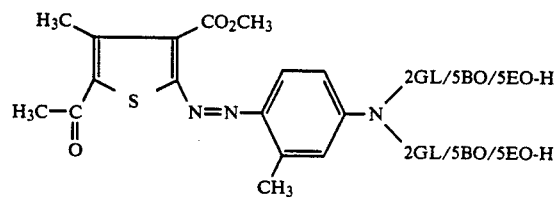

A 2000 milliliter beaker is charged with 164 grams of m-toluidine 4GL/10BO/10EO-H intermediate (0.11 mole), 300 grams of water, 300 grams of ice and 4 grams of urea. This mixture is cooled to below 0° C. The diazo solution (as prepared in Example 44) from 5-acetyl-2-amino-3-carbomethoxy-4-methylthiophene is added dropwise to the beaker over about 3 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a violet liquid.

EXAMPLE 53

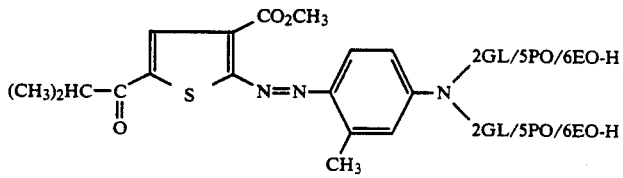

A 2000 milliliter beaker is charged with 158.6 grams of m-toluidine 4GL/10PO/12EO-H intermediate (0.11 mole), 300 grams of water, 300 grams of ice and 4 grams of urea. This mixture is cooled to below 0° C. The diazo solution (as prepared in Example 44) from 2-amino-3-carbomethoxy-5-isobutyrylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a violet liquid.

EXAMPLE 54

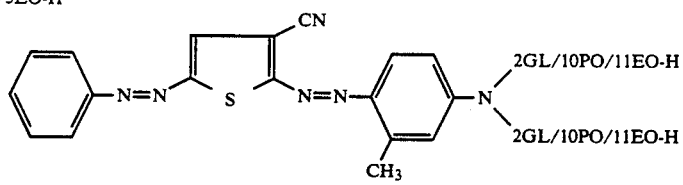

A 2000 milliliter beaker is charged with 279.5 grams of m-toluidine 4GL/20PO/22EO-H intermediate (0.11 mole), 400 grams of water, 400 grams of ice and 4 grams of urea. This mixture is cooled to below 0° C. The diazo solution (as prepared in Example 44) from 2-amino-3-cyano-5-phenylazothiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue liquid with a maximum absorbance at 622 nm.

EXAMPLE 55

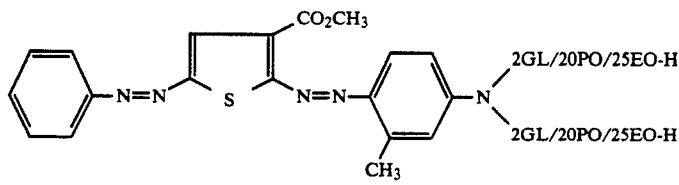

A 4000 milliliter beaker is charged with 533.7 grams of m-toluidine 4GL/40PO/50EO-H intermediate (0.11 mole), 600 grams of water, 600 grams of ice and 4 grams of urea. This mixture is cooled to below 0° C. The diazo solution (as prepared in Example 44) from 2-amino-3-carbomethoxy-5-phenylazothiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue liquid.

EXAMPLE 56

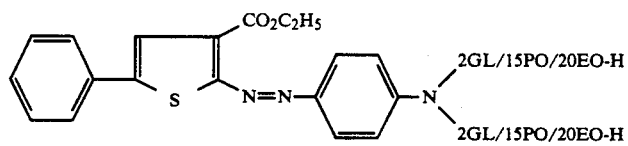

A 4000 milliliter beaker is charged with 408.2 grams of aniline 4GL/30PO/40EO-H intermediate (0.11 mole), 500 grams of water, 500 grams of ice and 4 grams of urea. This mixture is cooled to below 0° C. The diazo solution (as prepared in Example 44) from 2-amino-3-carboethoxy-5-phenylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 57

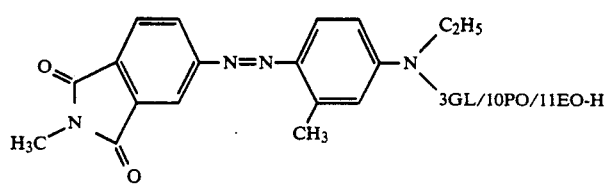

One hundred and eighty-three grams of 85% phosphoric acid, 25 grams of 98% sulfuric acid, and 3 drops of 2-ethyl hexanol defoamer are added to a 500 milliliter three necked flask equipped with a thermometer, cooling bath, and mechanical stirrer. The mixture is cooled and 17.6 grams (0.1 mole) of 4-amino-N-methylphthalimide is added to the flask. The mixture is further cooled to below 0° C. after which 35 grams of 40% nitrosyl sulfuric acid are added while maintaining the temperature below 5° C. After three hours the mixture gives a positive nitrite test and 1 gram of sulfamic acid is added slowly keeping the temperature below 5° C. A negative nitrite test is evident after one further hour.

A 2000 milliliter beaker is charged with 146.2 grams of N-ethyl-m-toluidine 3GL/10PO/11EO-H intermediate (0.11 mole), 300 grams of water, 300 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid.

EXAMPLE 58

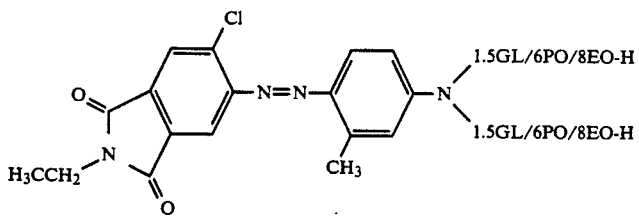

A 2000 milliliter beaker is charged with 181.4 grams of m-toluidine 3GL/12PO/16EO-H intermediate (0.11 mole), 300 grams of water, 300 grams of ice and 4 grams of urea. This mixture is cooled to below 0° C. The diazo solution (as prepared in Example 57) from 4-amino-5-chloro-N-ethylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 59

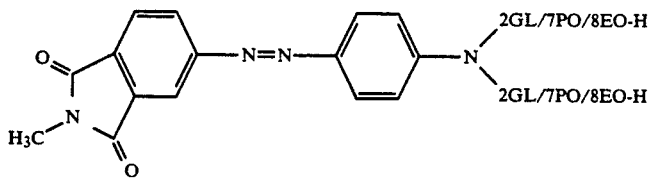

A 2000 milliliter beaker is charged with 199.9 grams of aniline 4GL/14PO/16EO-H intermediate (0.11 mole), 300 grams of water, 300 grams of ice and 4 grams of urea. This mixture is cooled to below 0° C. The diazo solution (as prepared in Example 57) from 4-amino-N-methylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid with a maximum absorbance at 476 nm.

EXAMPLE 60

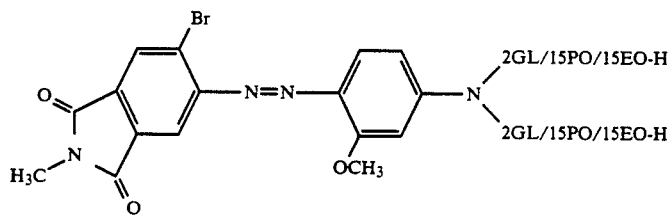

A 3000 milliliter beaker is charged with 365.2 grams of m-anisidine 4GL/30PO/30EO-H intermediate (0.11 mole), 400 grams of water, 400 grams of ice and 4 grams of urea. This mixture is cooled to below 0° C. The diazo solution (as prepared in Example 57) from 4-amino-5-bromo-N-methylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 61

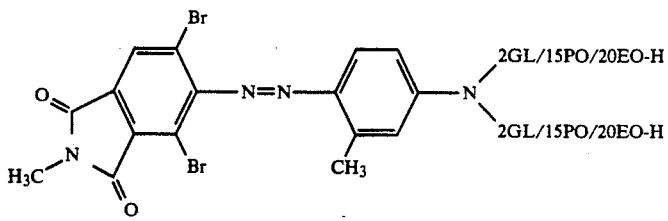

A 3000 milliliter beaker is charged with 409.7 grams of m-toluidine 4GL/30PO/40EO-H intermediate (0.11 mole), 500 grams of water, 500 grams of ice and 4 grams of urea. This mixture is cooled to below 0° C. The diazo solution (as prepared in Example 57) from 4-amino-3,5-dibromo-N-methylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a reddish orange liquid.

EXAMPLE 62

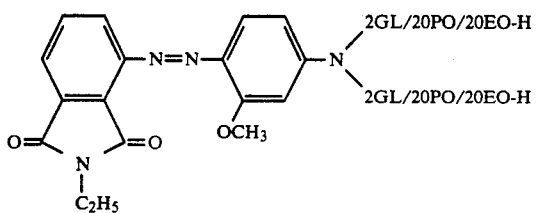

A 3000 milliliter beaker is charged with 472.3 grams of m-anisidine 4GL/40PO/40EO-H intermediate (0.11 mole), 500 grams of water, 500 grams of ice and 4 grams of urea. This mixture is cooled to below 0° C. The diazo solution (as prepared in Example 57) from 3-amino-N-ethylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid.

EXAMPLE 63

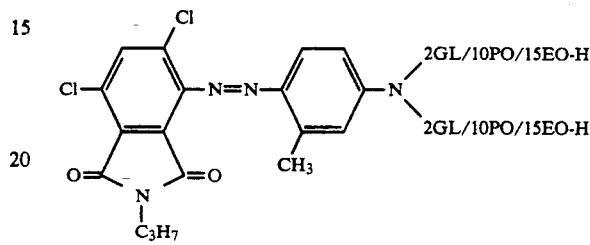

A 2000 milliliter beaker is charged with 302.6 grams of m-toluidine 4GL/20PO/30EO-H intermediate (0.11 mole), 400 grams of water, 400 grams of ice and 4 grams of urea. This mixture is cooled to below 0° C. The diazo solution (as prepared in Example 57) from 3-amino-4,6-dichloro-N-(1-propylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a reddish orange liquid.

EXAMPLE 64

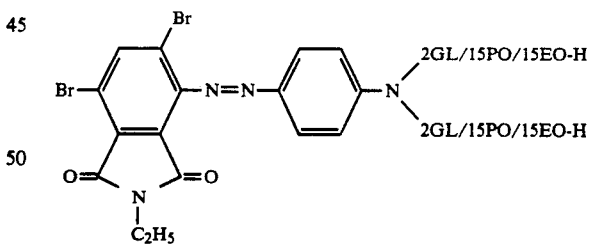

A 2000 milliliter beaker is charged with 362 grams of aniline 4GL/30PO/30EO-H intermediate (0.11 mole), 400 grams of water, 400 grams of ice and 4 grams of urea. This mixture is cooled to below 0° C. The diazo solution (as prepared in Example 57) from 3-amino-4,6-dibromo-N-ethylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a reddish liquid.

EXAMPLE 65

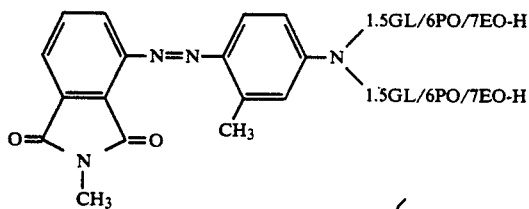

A 2000 milliliter beaker is charged with 179.9 grams of m-toluidine 3GL/12PO/14EO-H intermediate (0.11 mole), 300 grams of water, 300 grams of ice and 4 grams of urea. This mixture is cooled to below 0° C. The diazo solution (as prepared in Example 57) from 3-amino-N-methylphthalimide is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid with a maximum absorbance at 463 nm.

EXAMPLE 66

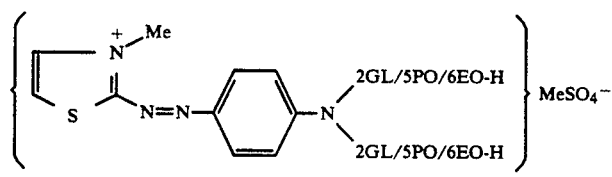

Seventy-five (0.047 mole) thiazole azo aniline (prepared in Example 10) intermediate are added to a flask fitted with a heating mantle, stirrer, and nitrogen inlet/outlet. After heating the flask to 40° C. and purging with nitrogen, 15.1 grams (0.12 mole) dimethyl sulfate are introduced into the flask. The temperature is increased to 95° C. for one hour to allow reaction completion. After cooling to 40° C., the pH is adjusted to pH 8.0 with a 10% solution of ammonium hydroxide. The product is dissolved in methylene chloride and added to a separatory funnel where it is washed with water to remove ammonium sulfate salts. The product is vacuumed dry on a rotary evaporator and collected to give a blue liquid with a maximum absorbance at 601 nm.

EXAMPLE 67

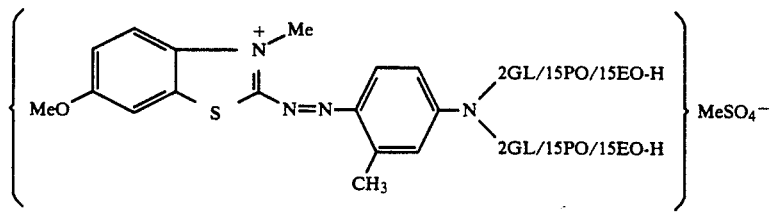

One Hundred seventy-five grams (0.047 mole) benzothiazole azo (prepared in Example 17) intermediate are added to a flask fitted with a heating mantle, stirrer, and nitrogen inlet/outlet. After heating the flask to 40° C. and purging with nitrogen, 15.1 grams (0.12 mole) dimethyl sulfate are introduced into the flask. The temperature is increased to 95° C. for one hour to allow reaction completion. After cooling to 40° C., the pH is adjusted to pH 8.0 with a 10% solution of ammonium hydroxide. The product is dissolved in methylene chloride and added to a separatory funnel where it is washed with water to remove ammonium sulfate salts. The product is vacuumed dry on a rotary evaporator and collected to give a blue liquid with a maximum absorbance at 620 nm.

EXAMPLE 68

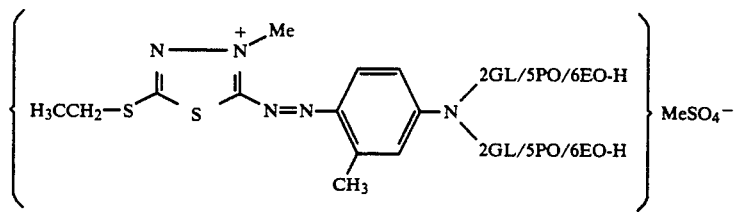

Eighty-six grams (0.047 mole) thiadiazole azo (prepared in Example 25) intermediate are added to a flask fitted with a heating mantle, stirrer, and nitrogen inlet/outlet. After heating the flask to 40° C. and purging with nitrogen, 15.1 grams (0.12 mole) dimethyl sulfate are introduced into the flask. The temperature is increased to 95° C. for one hour to allow reaction completion. After cooling to 40° C., the pH is adjusted to pH 8.0 with a 10% solution of ammonium hydroxide. The product is dissolved in methylene chloride and added to a separatory funnel where it is washed with water to remove ammonium sulfate salts. The product is vacuumed dry on a rotary evaporator and collected to give a blue liquid.

EXAMPLE 69

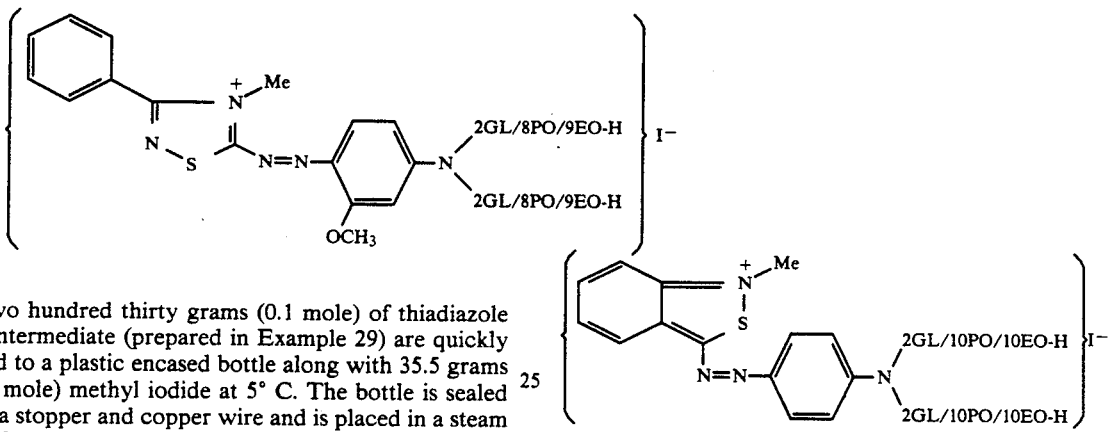

Two hundred thirty grams (0.1 mole) of thiadiazole azo intermediate (prepared in Example 29) are quickly added to a plastic encased bottle along with 35.5 grams (0.25 mole) methyl iodide at 5° C. The bottle is sealed with a stopper and copper wire and is placed in a steam bath for approximately two hours. At the end of this reaction period, the bottle is uncapped and any excess methyl iodide volatilized off to give a blue liquid.

EXAMPLE 70

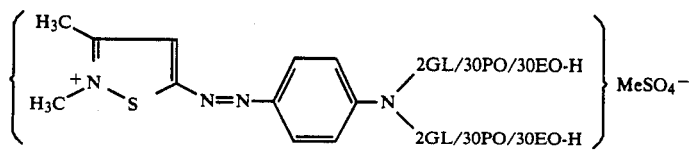

Three hundred twelve grams (0.047 mole) isothiazole azo (prepared in Example 34) intermediate are added to a flask fitted with a heating mantle, stirrer, and nitrogen inlet/outlet. After heating the flask to 40° C. and purging with nitrogen, 15.1 grams (0.12 mole) dimethyl sulfate are introduced into the flask. The temperature is increased to 95° C. for one hour to allow reaction completion. After cooling to 40° C., the pH is adjusted to pH 8.0 with a 10% solution of ammonium hydroxide. The product is dissolved in methylene chloride and added to a separatory funnel where it is washed with water to remove ammonium sulfate salts. The product is vacuumed dry on a rotary evaporator and collected to give a blue liquid with a maximum absorbance at 601 nm.

EXAMPLE 71

Two hundred fifty-nine grams (0.1 mole) of benzisothiazole azo intermediate (prepared in Example 37) are quickly added to a plastic encased bottle along with 35.5 grams (0.25 mole) methyl iodide at 5° C. The bottle is sealed with a stopper and copper wire and is placed in a steam bath for approximately two hours. At the end of this reaction period, the bottle is uncapped and any excess methyl iodide volatilized off to give a blue liquid.

EXAMPLE 72

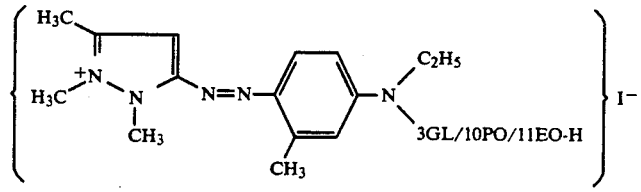

One hundred fifty-two grams (0.1 mole) of pyrazole azo intermediate (prepared in Example 31) are quickly added to a plastic encased bottle along with 35.5 grams (0.25 mole) methyl iodide at 5° C. The bottle is sealed with a stopper and copper wire and is placed in a steam bath for approximately two hours. At the end of this reaction period, the bottle is uncapped and any excess methyl iodide volatilized off to give a red liquid.

EXAMPLE 73

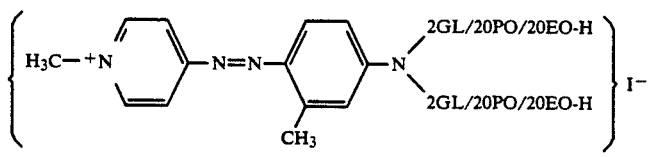

Four hundred fifty-nine grams (0.1 mole) of pyridine azo intermediate (prepared in Example 38) are quickly added to a plastic encased bottle along with 35.5 grams (0.25 mole) methyl iodide at 5° C. The bottle is sealed with a stopper and copper wire and is placed in a steam bath for approximately two hours. At the end of this reaction period, the bottle is uncapped and any excess methyl iodide volatilized off to give a bluish violet liquid.

EXAMPLE 74

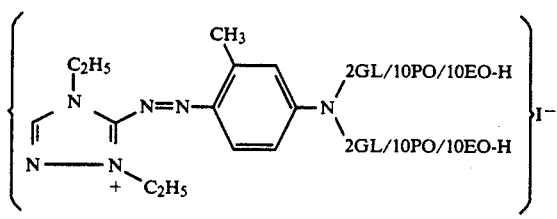

Two hundred forty-three grams (0.1 mole) of triazole azo intermediate (prepared in Example 33) are quickly added to a plastic encased bottle along with 17.2 grams (0.11 mole) ethyl iodide at 5° C. The bottle is sealed with a stopper and copper wire and is placed in a steam bath for approximately two hours. At the end of this reaction period, the bottle is uncapped and any excess methyl iodide volatilized off to give a red liquid.

EXAMPLE 75

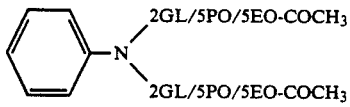

A mixture is prepared by charging 1408 grams (1 mole) of aniline 4GL/10PO/10EO intermediate in 3 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride by reduced vacuum at 90° C. An IR spectrum of the resulting liquid product displays an absence of hydroxyl absorbance and characteristic carbonyl absorbance of the corresponding acetate intermediate.

EXAMPLE 75A

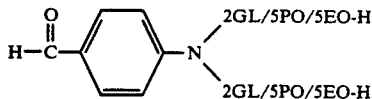

A dry 2000 ml three-neck flask is charged with 181 grams dimethylformamide under nitrogen and cooled to 0° C. One hundred ninety-two grams of phosphorous oxychloride is added dropwise with mechanical stirring and cooling over one hour. The resulting mixture is stirred for an additional two hours at 0°-5° C. Then 1492 grams (1 mole) of aniline 4GL/10PO/10EO diacetate intermediate are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated to 50°-60° C. until the formylated diacetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed by reduced vacuum at 90° C. The resulting liquid has a maximum absorbance at 341 nm. An IR spectrum of the resulting liquid product displays both the presence of hydroxyl absorbance and characteristic carbonyl absorbance of the corresponding formyl intermediate.

EXAMPLE 75B

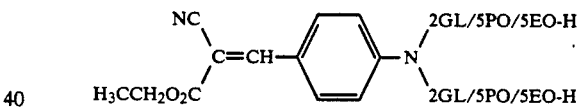

One hundred forty-four grams of aldehyde (0.1 mole), 11.3 grams of ethyl cyanoacetate (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and washed with water three times. The resulting methylene chloride solution is then dried over magnesium sulfate and filtered into a 500 milliter round bottom flask. The solution is then stripped of all volatiles under reduced vacuum to give a yellow liquid with a maximum absorbance at 426 nm.

EXAMPLE 76 COMPARATIVE EXAMPLE

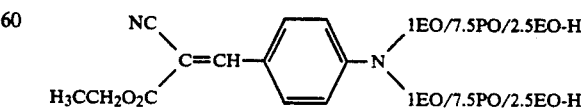

One hundred seventy-seven grams of aldehyde (0.1 mole), 11.3 grams of ethylcyanoacetate (0.1 mole), two drops of piperidine catalyst and 300 milliters of toluene were charged into a 500 milliter three necked flask equipped with thermometer, reflux condenser, Dean Stark trap, mechanical stirrer, and heating mantle. This mixture was heated to reflux until no more water condensed in the trap which took about four hours. The resulting mixture was dissolved in methylene chloride and washed with water three times. The resulting methylene chloride solution was then dried over magnesium sulfate and filtered into a 500 milliter round bottom flask. The solution was then stripped of all volatiles under reduced vacuum to give a yellow liquid with a maximum absorbance at 426 nm.

EXAMPLE 77

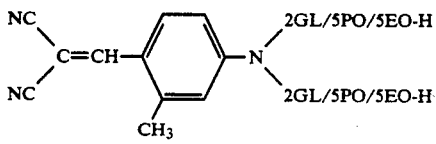

One hundred forty-five grams of aldehyde (0.1 mole), 6.6 grams of malononitrile (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and washed with water three times. The resulting methylene chloride solution is then dried over magnesium sulfate and filtered into a 500 milliter round bottom flask. The solution is then stripped of all volatiles under reduced vacuum to give a yellow liquid with a maximum absorbance at 433 nm.

EXAMPLE 78

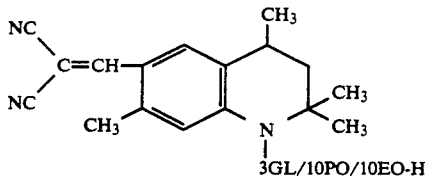

One hundred forty-six grams of aldehyde (0.1 mole), 6.6 grams of malononitrile (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and washed with water three times. The resulting methylene chloride solution is then dried over magnesium sulfate and filtered into a 500 milliter round bottom flask. The solution is then stripped of all volatiles under reduced vacuum to give a yellow liquid.

EXAMPLE 79

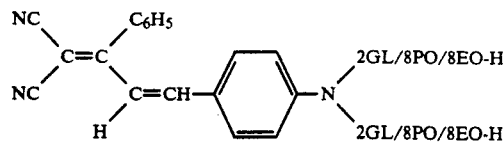

One hundred ninety-three grams of aldehyde (0.1 mole), 16.8 grams of 1-phenylenthylidene malonitrile (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid with a maximum absorbance at 500 nm.

EXAMPLE 80

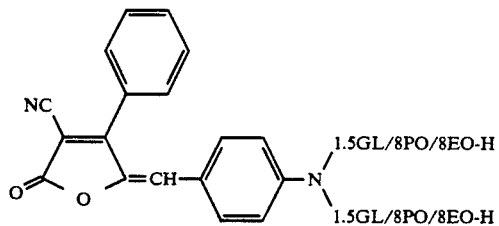

One hundred ninety-eight grams of aldehyde (0.1 mole), 18.5 grams of 3-cyano-4-phenyl-2-(5H)-furanone, two drops of piperidine catalyst and 300 milliters of toluene are charged into a 500 milliter three necked flask equipped with thermometer, reflux condenser, Dean-Stark trap, mechanical stirrer, and heating mantle. This mixture is heated to reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid with a maximum absorbance at 530 nm.

EXAMPLE 81

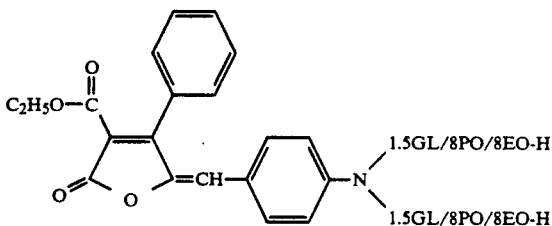

Two hundred five grams of aldehyde (0.1 mole), 18.5 grams of 3-ethoxycarbonyl-4-phenyl-2-(5H)-furanone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid with a maximum absorbance at 504 nm.

EXAMPLE 82

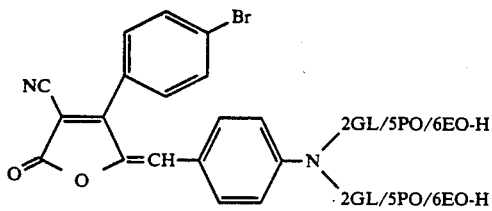

One hundred fifty-three grams of aldehyde (0.1 mole), 26.4 grams of 3-cyano-4-(p-bromophenyl)-2-(5H)-furanone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid with a maximum absorbance at 537 nm.

EXAMPLE 83

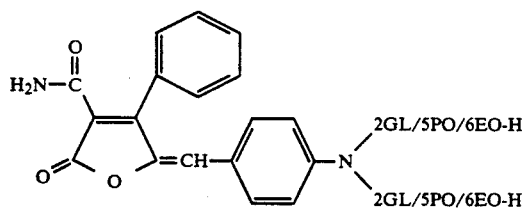

One hundred fifty-three grams of aldehyde (0.1 mole), 20.3 grams of 3-carbamoyl-4-phenyl-2-(5H)-furanone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid with a maximum absorbance at 498 nm.

EXAMPLE 84

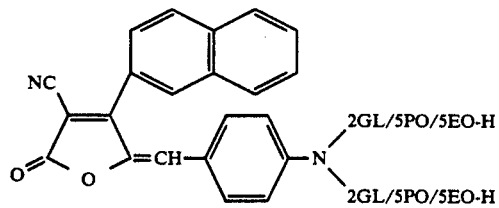

One hundred forty-four grams of aldehyde (0.1 mole), 23.5 grams of 3-cyano-4-(-2-naphthyl)-2-(5H)-furanone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid with a maximum absorbance at 534 nm.

EXAMPLE 85

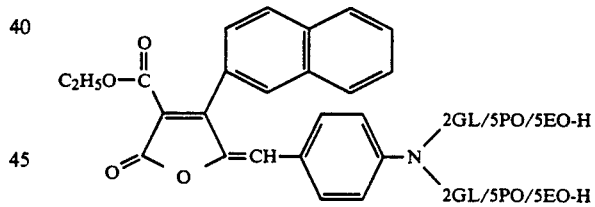

One hundred forty-four grams of aldehyde (0.1 mole), 28.2 grams of 3-ethoxycarbonyl-4-(-2-naphthyl)-2-(5H)-furanone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid.

EXAMPLE 86

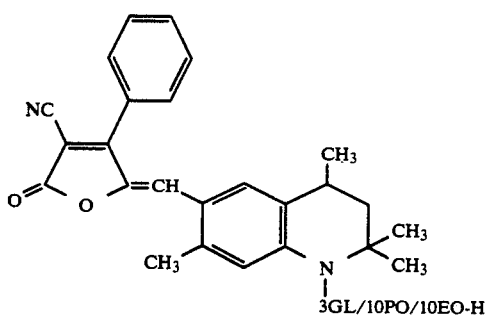

One hundred forty-six grams (0.1 mole) of aldehyde, 23.5 grams of 3-cyano-4-phenyl-2-(5H)-furanone (0.1 mole), two drops of piperidine catalyst and 300 milliliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution was then stripped of all volatiles under reduced vacuum to give a red violet liquid with a maximum absorbance at 554 nm.

EXAMPLE 87

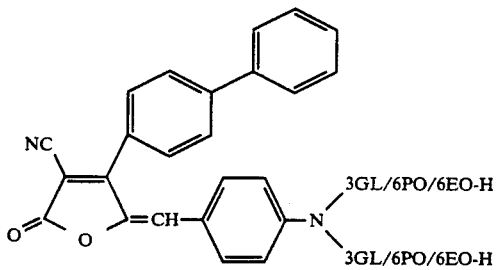

One hundred seventy-nine grams of aldehyde (0.1 mole), 26.1 grams of 3-cyano-4-biphenyl-2-(5H)-furanone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a red liquid with a maximum absorbance at 534 nm.

EXAMPLE 88

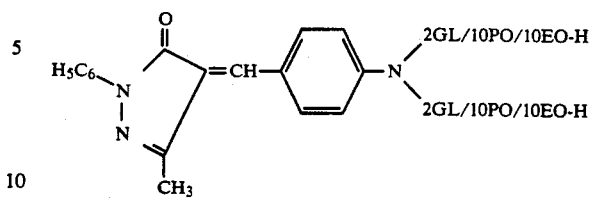

Two hundred sixteen grams of aldehyde (0.1 mole), 17.4 grams of 3-methyl-1-phenylpyrazole (0.1 mole), two drops of piperidine catalyst and 300 milliliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give an orange liquid with a maximum absorbance at 464 nm.

EXAMPLE 89

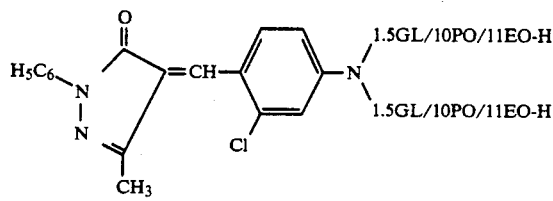

Two hundred fifty-one grams of aldehyde (0.1 mole), 17.4 grams of 3-methyl-1-phenylpyrazole (0.1 mole), two drops of piperidine catalyst and 300 milliliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give an orange liquid.

EXAMPLE 90

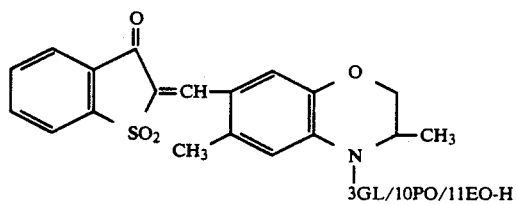

One hundred forty-eight grams of aldehyde (0.1 mole), 18.2 grams of 3(2H)-thianaphthalenone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a reddish orange liquid.

EXAMPLE 91

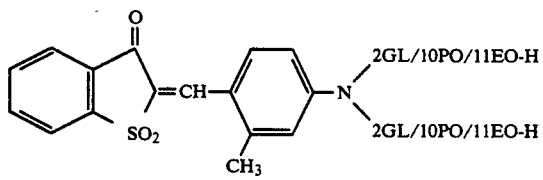

Two hundred fifty-six grams of aldehyde (0.1 mole), 18.2 grams of 3(2H)-thianaphthalenone (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give an orange liquid with a maximum absorbance at 493 nm.

EXAMPLE 92

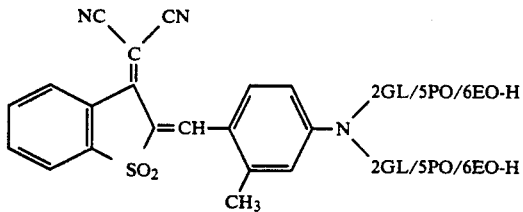

One hundred fifty-four grams of aldehyde (0.1 mole), 22.8 grams of the substituted 3(2H)-thianaphthalidene (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a blue liquid with a maximum absorbance at 600 nm.

EXAMPLE 93

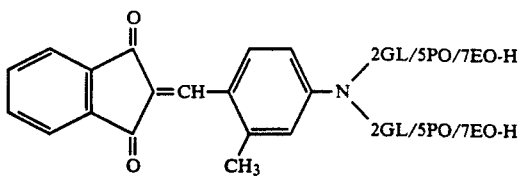

One hundred sixty-three grams of aldehyde (0.1 mole), 14.6 grams of 1,3-indandione (0.1 mole), two drops of piperidine catalyst and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliliter round bottom flask. The solution is then stripped of all volatiles under reduced vacuum to give an orange liquid with a maximum absorbance at 501 nm.

EXAMPLE 94

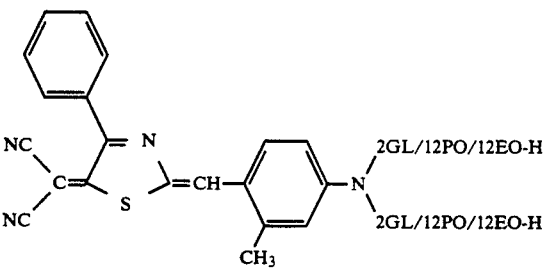

Two hundred eighty-eight grams of aldehyde (0.1 mole), 22.5 grams of thiazole (0.1 mole), two drops of piperidine catalyst and 300 milliliters of toluene are charged into a 500 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 500 milliliter round bottom flask. The solution is then stripped of all volatiles under reduced vacuum to give a bluish green liquid with a maximum absorbance at 658 nm.

EXAMPLE 95

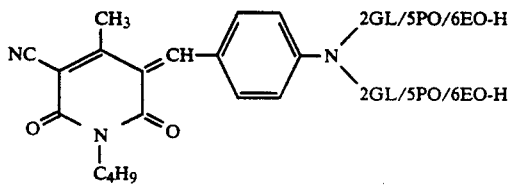

One hundred fifty-three grams of aldehyde (0.1 mole), 20.6 grams of dione (0.1 mole), two drops of piperidine catalyst and 300 milliliters of toluene are charged into a 500 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 500 milliliter round bottom flask. The solution is then stripped of all volatiles under reduced vacuum to give a violet liquid with a maximum absorbance at 557 nm.

EXAMPLE 96

Four hundred grams of acetic acid, 17.3 grams (0.1 mole) 2-methylene-1,3,3-trimethylindoline, and 275 grams (0.105 mole) of formyl-m-toluidine 6GL/20PO/20EO-H intermediate are charged into a 2000 milliliter three necked flask equipped with a reflux condenser, thermometer, heating mantle, and mechanical stirrer. This mixture is heated to 95° C. with the heating mantle and is maintained at 95°-100° C. for an additional 6 hours. The reaction mixture is cooled and transferred to a 2000 milliliter round bottom flask and stripped of acetic acid. The pH of the resulting product is adjusted with 25% sodium hydroxide to 7 to give a reddish violet liquid with a maximum absorbance of 560 nm.

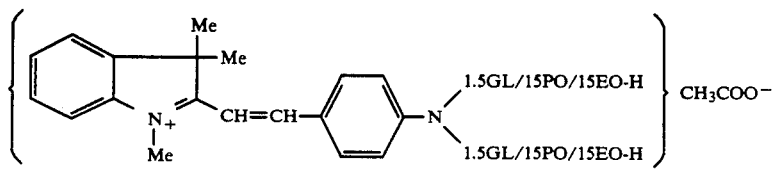

Four hundred grams of acetic acid, 17.3 grams (0.1 mole) 2-methylene-1,3,3-trimethylindoline, and 357.3 grams (0.105 mole) of formylaniline 3GL/30PO/30EO-H intermediate are charged into a 2000 milliliter three necked flask equipped with a reflux condenser, thermometer, heating mantle, and mechanical stirrer. This mixture is heated to 95° C. with the heating mantle and is maintained at 95°-100° C. for an additional 6 hours. The reaction mixture is cooled and transferred to a 2000 milliliter round bottom flask and stripped of acetic acid. The pH of the resulting product is adjusted with 25% sodium hydroxide to 7 to give a bluish red liquid with a maximum absorbance of 546 nm.

EXAMPLE 97

EXAMPLE 98

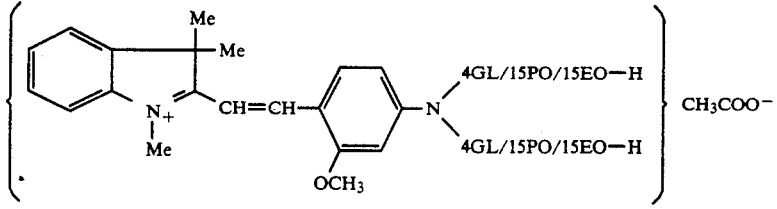

Four hundred grams of acetic acid, 17.3 grams (0.1 mole) 2-methylene-1,3,3-trimethylindoline, and 368.2 grams (0.105 mole) of formyl-m-anisidine 8GL/30PO/30EO-H intermediate are charged into a 2000 milliliter three necked flask equipped with a reflux condenser, thermometer, heating mantle, and mechanical stirrer. This mixture is heated to 95° C. with the heating mantle and is maintained at 95°-100° C. for an additional 6 hours. The reaction mixture is cooled and transferred to a 2000 milliliter round bottom flask and stripped of acetic acid. The pH of the resulting product is adjusted with 25% sodium hydroxide to 7 to give a bluish red liquid.

EXAMPLE 99

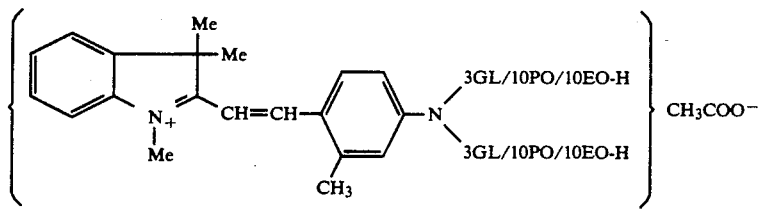

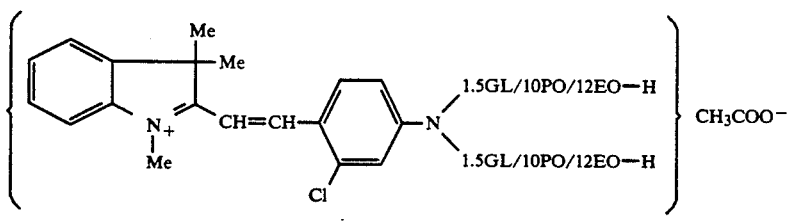

Four hundred grams of acetic acid, 17.3 grams (0.1 mole) 2-methylene-1,3,3-trimethylindoline, and 272.3 grams (0.105 mole) of formyl-m-chloroaniline 3GL/20PO/24EO-H intermediate are charged into a 2000 milliliter three necked flask equipped with a reflux condenser, thermometer, heating mantle, and mechanical stirrer. This mixture is heated to 95° C. with the heating mantle and is maintained at 95°-100° C. for an additional 6 hours. The reaction mixture is cooled and transferred to a 2000 milliliter round bottom flask and stripped of acetic acid. The pH of the resulting product is adjusted with 25% sodium hydroxide to 7 to give a bluish red liquid.

EXAMPLE 100

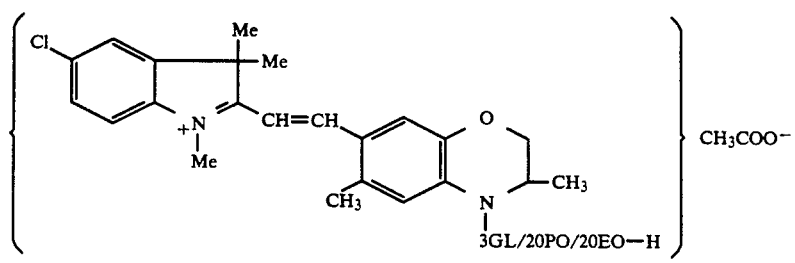

Four hundred grams of acetic acid, 17.3 grams (0.1 mole) 2-methylene-1,3,3-trimethylindoline, and 160.7 grams (0.105 mole) of formyl-tetramethyltetrahydroquinoline 3GL/15PO/15EO-H intermediate are charged into a 2000 milliliter three necked flask equipped with a reflux condenser, thermometer, heating mantle, and mechanical stirrer. This mixture is heated to 95° C. with the heating mantle and is maintained at 95°-100° C. for an additional 6 hours. The reaction mixture is cooled and transferred to a 2000 milliliter round bottom flask and stripped of acetic acid. The pH of the resulting product is adjusted with 25% sodium hydroxide to 7 to give a bluish red liquid.

EXAMPLE 101

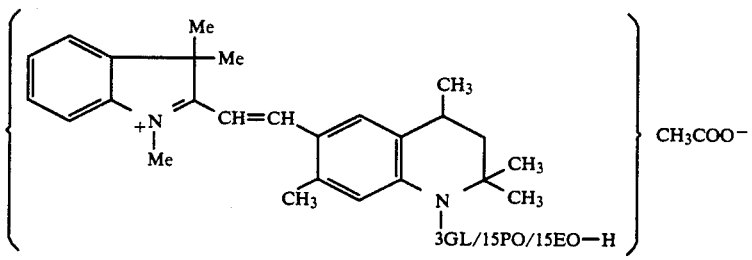

Four hundred grams of acetic acid, 20.7 grams (0.1 mole) 5-chloro-2-methylene-1,3,3-trimethylindoline, and 257.5 grams (0.105 mole) of formyl-dimethyl-3,4-dihydro-2H-1,4-benzoxazine 3GL/20PO/20EO-H intermediate are charged into a 2000 milliliter three necked flask equipped with a reflux condenser, thermometer, heating mantle, and mechanical stirrer. This mixture is heated to 95° C. with the heating mantle and is maintained at 95°-100° C. for an additional 6 hours. The reaction mixture is cooled and transferred to a 2000 milliliter round bottom flask and stripped of acetic acid. The pH of the resulting product is adjusted with 25% sodium hydroxide to 7 to give a violet liquid.

EXAMPLE 102

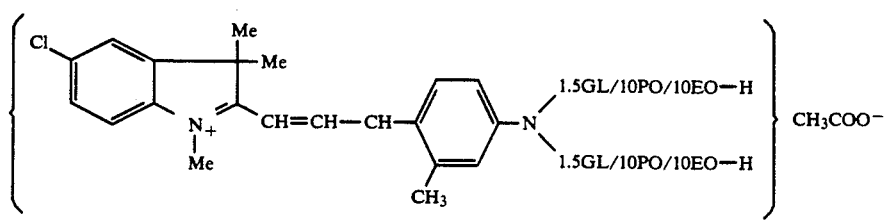

Four hundred grams of acetic acid, 20.7 grams (0.1 mole) 5-chloro-2-methylene-1,3,3-trimethylindoline, and 251.9 grams (0.105 mole) of formyl-m-toluidine 3GL/20PO/20EO-H intermediate are charged into a 2000 milliliter three necked flask equipped with a reflux condenser, thermometer, heating mantle, and mechanical stirrer. This mixture is heated to 95° C. with the heating mantle and is maintained at 95°-100° C. for an additional 6 hours. The reaction mixture is cooled and transferred to a 2000 milliliter round bottom flask and stripped of acetic acid. The pH of the resulting product is adjusted with 25% sodium hydroxide to 7 to give a violet liquid.

EXAMPLE 103

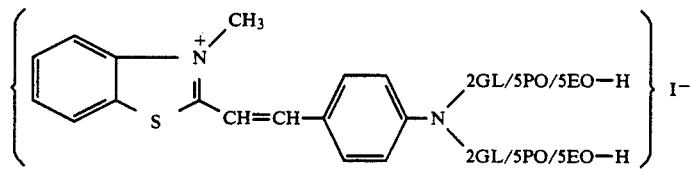

Forty-one grams (0.14 mole) methylium methyl benzothiazole iodide, (0.11 mole) of formylaniline 4GL/10PO/10EO-H intermediate and 0.2 gram of morpholine catalyst are charged into a 1000 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 1000 milliliter round bottom flask and stripped of all volatiles and collected to give a red liquid.

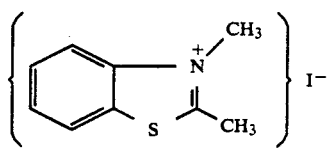

Seventy grams (0.47 mole) of methyl benzothiazole are quickly added to a plastic encased bottle along with 133.2 grams (0.94 mole) methyl iodide at 5° C. The bottle is sealed with a stopper and copper wire and is placed in a steam bath for approximately two hours. At the end of this reaction period, the bottle is uncapped and any excess methyl iodide volatilized off. The product is isolated as a crushed solid.

EXAMPLE 104

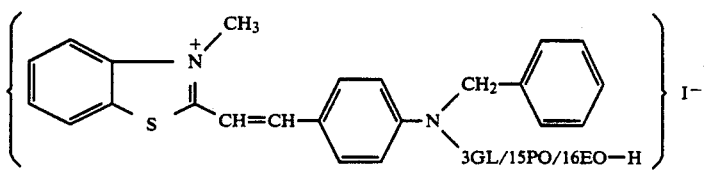

Forty-one grams (0.14 mole) methylium methyl benzothiazole iodide, 220.9 grams (0.11 mole) of formyl-N-benzyl-aniline 3GL/15PO/16EO-H intermediate and 0.2 gram of morpholine catalyst are charged into a 1000 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 1000 milliliter round bottom flask and stripped of all volatiles and collected to give a red liquid.

EXAMPLE 105

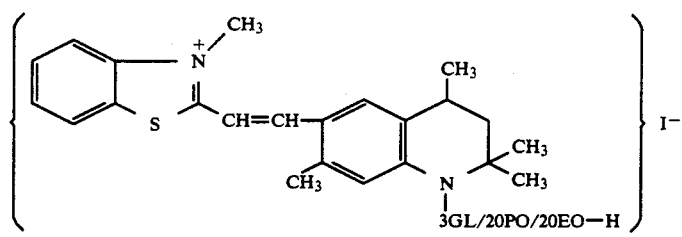

Forty-one grams (0.14 mole) methylium methyl benzothiazole iodide, 303.5 (0.11 mole) of formyltetramethyltetrahydroquinoline 3GL/20BO/20EO-H intermediate, and 0.2 gram of morpholine catalyst are charged into a 1000 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 1000 milliliter round bottom flask and stripped of all volatiles and collected to give a bluish red liquid with a maximum absorbance of 540 nm.

EXAMPLE 106

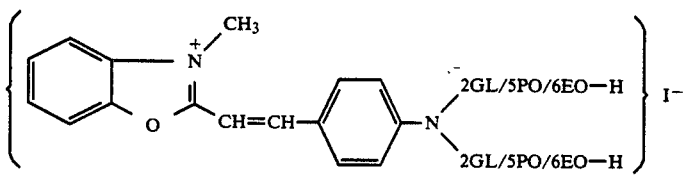

Thirty-nine grams (0.14 mole) methylium methyl benzoxazole iodide, 198.3 grams (0.11 mole) of formylaniline 4GL/10PO/12EO-H intermediate, and 0.2 gram of morpholine catalyst are charged into a 500 milliliter three necked flask equipped with a reflux condenser, thermometer, heating mantle, and mechanical stirrer. This mixture is heated to 90° C. with the heating mantle and is maintained at 90° C. for an additional 4 hours. The reaction mixture is cooled and transferred to a 500 milliliter round bottom flask and stripped of all volatiles and collected to give a red liquid.

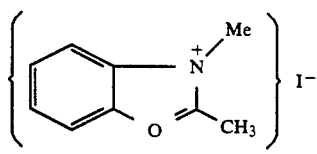

Thirty-five grams (0.26 mole) of methyl benzoxazole are quickly added to a plastic encased bottle along with 74.4 grams (0.52 mole) methyl iodide at 5° C. The bottle is sealed with a stopper and copper wire and is placed in a steam bath for approximately two hours. At the end of this reaction period, the bottle is uncapped and any excess methyl iodide volatilized off. The product is isolated as a crushed solid.

EXAMPLE 107

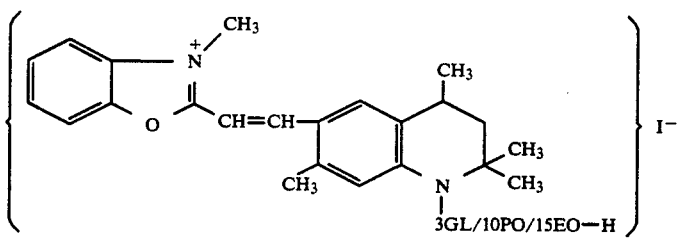

Thirty-eight grams (0.14 mole) methylium methyl benzoxazole iodide, 184.7 grams (0.11 mole) of formyl-tetramethyltetrahydroquinoline 3GL/10PO/15EO-H intermediate, and 0.2 gram of morpholine catalyst are charged into a 500 milliliter three necked flask equipped with a reflux condenser, thermometer, heating mantle, and mechanical stirrer. This mixture is heated to 90° C. with the heating mantle and is maintained at 90° C. for an additional 4 hours. The reaction mixture is cooled and transferred to a 500 milliliter round bottom flask and stripped of all volatiles and collected to give a red liquid with a maximum absorbance of 508 nm.

EXAMPLE 108

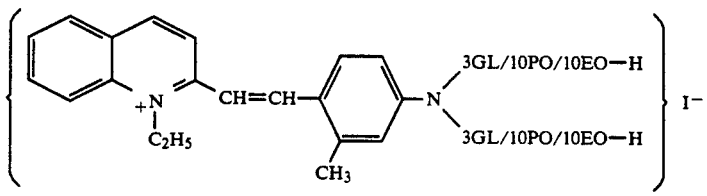

Seventy-five grams (0.1 mole) ethylquinaldinium iodide, 288.1 grams (0.11 mole) of formylm-toluidine 6GL/20PO/20EO-H intermediate, and 0.2 gram morpholine catalyst are charged into a 500 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 500 milliliter round bottom flask and stripped of all volatiles and collected to give a reddish violet liquid.

EXAMPLE 109

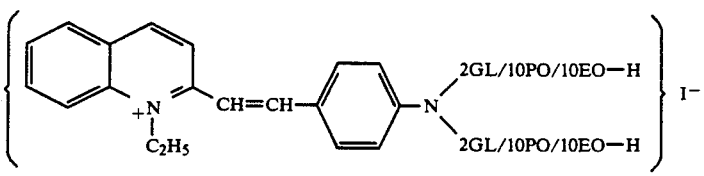

Seventy-five grams (0.1 mole) ethylquinaldinium iodide, 273.5 grams (0.11 mole) of formylaniline 4GL/20PO/20EO-H intermediate, and 0.2 gram morpholine catalyst are charged into a 500 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 500 milliliter round bottom flask and stripped of all volatiles and collected to give a red violet liquid with a maximum absorbance of 555 nm.

Seventy-five grams (0.1 mole) ethylquinaldinium iodide, 203.6 grams (0.11 mole) of formyl-m-chloroaniline 4GL/12PO/16EO-H intermediate, and 0.2 gram morpholine catalyst are charged into a 500 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 500 milliliter round bottom flask and stripped of all volatiles and collected to give a reddish violet liquid.

EXAMPLE 112

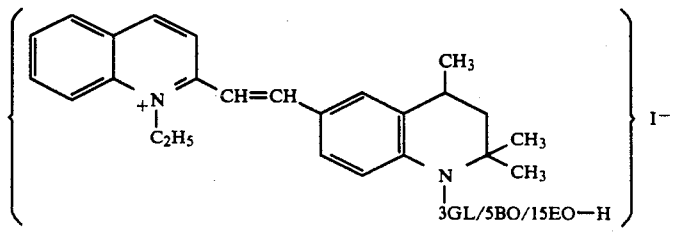

EXAMPLE 110

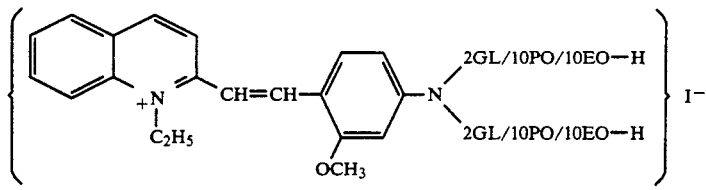

Seventy-five grams (0.1 mole) ethylquinaldinium iodide, 273.6 grams (0.11 mole) of formyl-m-anisidine 4GL/20PO/20EO-H intermediate, and 0.2 gram morpholine catalyst are charged into a 500 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 500 milliliter round bottom flask and stripped of all volatiles and collected to give a reddish violet liquid.

EXAMPLE 111

Seventy-five grams (0.1 mole) ethylquinaldinium iodide, 159 grams (0.11 mole) of formyltrimethyltetrahydroquinoline 3GL/5BO/15EO-H intermediate, and 0.2 gram morpholine catalyst are charged into a 500 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 500 milliliter round bottom flask and stripped of all volatiles and collected to give a violet liquid.

EXAMPLE 113

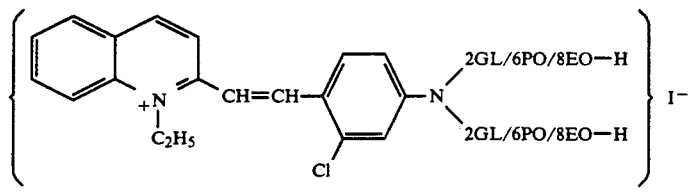

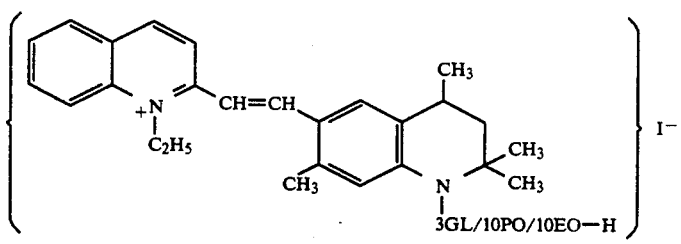

Seventy-five grams (0.1 mole) ethylquinaldinium iodide, 160.5 grams (0.11 mole) of formyltetramethyltetrahydroquinoline 3GL/10PO/10EO-H intermediate, and 0.2 gram morpholine catalyst are charged into a 500 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 500 milliliter round bottom flask and stripped of all volatiles and collected to give a violet liquid.

EXAMPLE 114

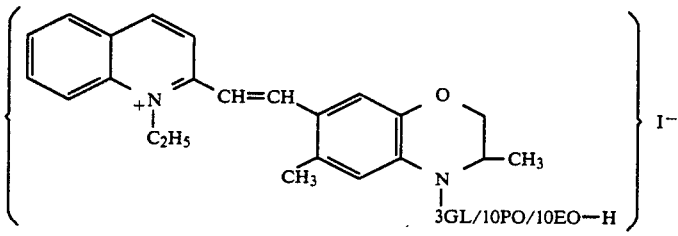

Seventy-five grams (0.1 mole) ethylquinaldinium iodide, 157.5 grams (0.11 mole) of formyl-3,7-dimethyl-3,4-dihydro-2H-1,4-benzoxazine 3GL/10PO/10EO-H intermediate, and 0.2 gram morpholine catalyst are charged into a 500 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 500 milliliter round bottom flask and stripped of all volatiles and collected to give a violet liquid.

EXAMPLE 115

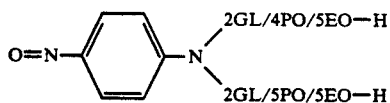

A mixture is prepared by charging 1330 grams (1 mole) of aniline 4GL/10PO/10EO intermediate, along with 400 ml of concentrated hydrochloric acid and 100 ml of water in a 3000 ml three neck flask. The mixture is stirred mechanically and cooled to 0° C. A solution of 76 grams (1.1 moles) of sodium nitrite dissolved in 300 ml of water is then added dropwise over one and a half hours maintaining the temperature below 0° C. The mixture is allowed to warm to room temperature and stirred for an additional two hours. The excess nitrite is then destroyed by pulling a vacuum for an additional 30 minutes. After cooling to 0° C., the mixture is neutralized with dilute sodium hydroxide solution and the product extracted into methylene chloride. The methylene chloride layer is phase separated and dried over anhydrous magnesium sulfate. The methylene chloride solution is filtered and the solvent is removed by reduced vacuum at 90° C. The resulting liquid has a maximum absorbance at 390 nm. An IR spectrum of the resulting liquid product displays a characteristic nitroso absorbance.

EXAMPLE 115A

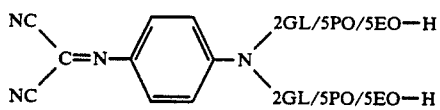

One hundred forty-four grams of nitrosoaniline 4GL/10PO/10EO-H intermediate (0.1 mole), 6.6 grams of malononitrile (0.1 mole), and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a yellow orange liquid.

EXAMPLE 116

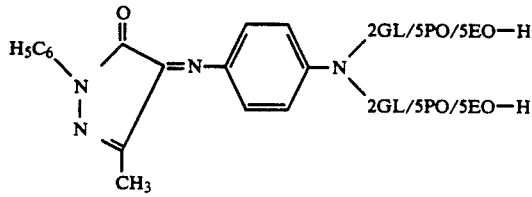

One hundred forty-four grams of nitrosoaniline 4GL/10PO/10EO-H intermediate (0.1 mole), 17.4 grams of 3-methyl-1-phenylpyrazole (0.1 mole) and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution was then stripped of all volatiles under reduced vacuum to give a red liquid with a maximum absorbance at 522 nm.

EXAMPLE 117

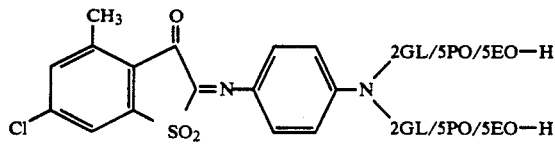

One hundred forty-four grams of nitrosoaniline 4GL/10PO/10EO-H intermediate (0.1 mole), 18.2 grams of 6-chloro-4-methyl-3(2H)-thianaphthalenone (0.1 mole) and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a reddish liquid.

EXAMPLE 118

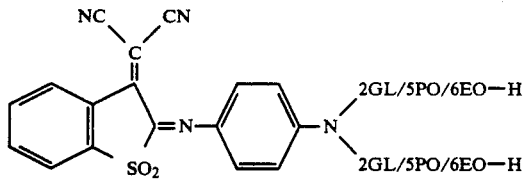

One hundred fifty-three grams of nitrosoaniline 4GL/10PO/12EO-H intermediate (0.1 mole), grams of 22.8 grams of the substituted 3(2H)-thianaphthalidene (0.1 mole) and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a bluish green liquid with a maximum absorbance at 650 nm.

EXAMPLE 119

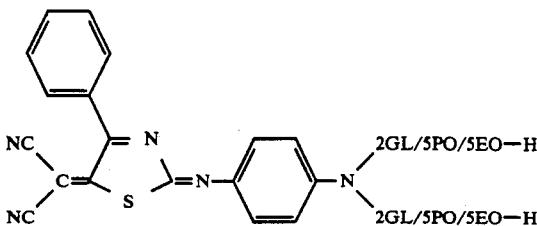

One hundred forty-four grams of nitrosoaniline 4GL/10PO/10EO-H intermediate (0.1 mole), 22.5 grams of thiazole (0.1 mole) and 300 milliters of toluene are charged into a 500 milliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a bluish green liquid with a maximum absorbance at 672 nm.

EXAMPLE 120

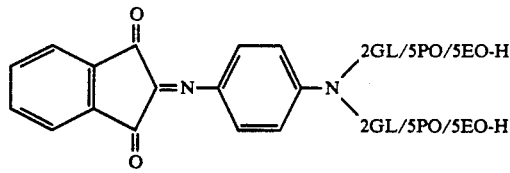

One hundred forty-four grams of nitroso aniline 4GL/10PO/10EO-H intermediate (0.1 mole), 14.6 grams of 1,3-indandione (0.1 mole) and 300 milliters of toluene are charged into a 500 milliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution was then dried over magnesium sulfate and filtered into a 500 milliter round bottom flask. The solution is then stripped of all volatiles under reduced vacuum to give a red liquid with a maximum absorbance at 520 nm.

EXAMPLE 121

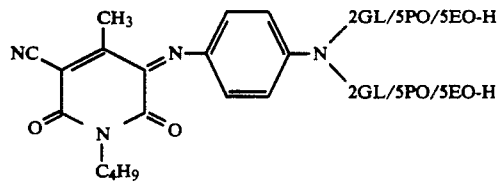

One hundred forty-four grams of nitrosoaniline 4GL/10PO/10EO-H intermediate (0.1 mole), 20.6 grams of dione (0.1 mole) and 300 milliters of toluene are charged into a 500 milliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a blue liquid with a maximum absorbance at 618 nm.

EXAMPLE 122

Two hundred forty-six grams of nitrosoaniline 4GL/20PO/20EO-H intermediate (0.1 mole), 18.5 grams of 3-cyano-4-phenyl-2-(5H)-furanone and 300 milliters of toluene are charged into a 500 milliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliter round bottom flask. The solution is then stripped of all volatiles under reduced vacuum to give a blue violet liquid with a maximum absorbance at 565 nm.

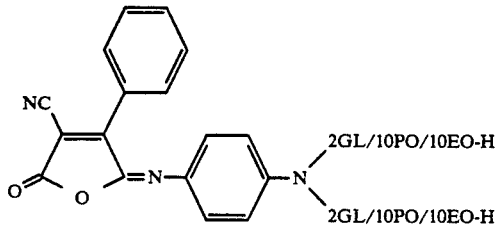

TABLE 1

| Entry | $R_3$ | $R_{16}$ | $R_{17}$ | $R_{18}$ |
|---|---|---|---|---|
| 1 | 4-$NO_2$ | H | $C_2H_5$ | 2GL/10PO/10EO-H |
| 2 | 4-$SO_2CH_3$ | H | $C_6H_{11}$ | 4GL/10PO/10EO-H |
| 3 | 2-Cl,4-$NO_2$ | 3-$CH_3$ | $CH_2CH=CH_2$ | 3GL/10PO/10EO-H |
| 4 | 2-Cl,4-$SO_2CH_3$ | 3-$CH_3$ | 5GL/5PO/5EO-H | 5GL/5PO/5EO-H |
| 5 | 2,4-di-$NO_2$ | 3-$CH_3$ | $CH_2C_6H_5$ | 3GL/15BO/6EO-H |
| 6 | 2-Br,4,6-di-$NO_2$ | 2-$CH_3$ | $CH_3$ | 4GL/20PO/10EO-H |
| 7 | 2-Br,4-CN | 2-$OCH_3$ | $C_2H_4C_6H_5$ | 2GL/20BO/10EO-H |
| 8 | 2-$CF_3$,4-$NO_2$ | 2-$OCH_3$,5-$CH_3$ | 2GL/10PO/5EO-H | 2GL/10PO/5EO-H |
| 9 | 2-$SO_2CH_3$,4-$NO_2$ | 3-$OCH_3$ | 3GL/20PO/5EO-H | 3GL/20PO/5EO-H |
| 10 | 2-Br,4-$CO_2C_2H_5$ | 3-$CF_3$ | 2GL/10BO/5EO-H | 2GL/10BO/5EO-H |
| 11 | 2-CN,4-$NO_2$ | 3-Cl | 2GL/5BO/2EO-H | 2GL/5BO/2EO-H |
| 12 | 2-CN,4-$NO_2$,6-Cl | H | $C_6H_{10}$-4-$CH_3$ | 4GL/30PO/10EO-H |
| 13 | 2-$OCH_3$,4-$NO_2$ | H | $C_6H_4$-4-$OCH_3$ | 3GL/40PO/10EO-H |
| 14 | 2,4-di-$SO_2CH_3$ | 3-$CH_3$ | $C_6H_4$-3-Cl | 4GL/8PO/8EO-H |
| 15 | 2,4-di-CN | 3-$CH_3$ | $C_6H_4$-3-$CO_2C_2H_5$ | 6GL/5PO/10EO-H |
| 16 | 2,6-di-Br,4-$SO_2CH_3$ | 3-$CH_3$ | $C_6H_4$-4-CN | 6GL/15PO/5EO-H |
| 17 | H | H | $C_2H_4C_6H_5$ | 4GL/40PO/40EO-H |
| 18 | 4-$CH_3$ | H | $C_2H_4OC_6H_5$ | 3GL/50PO/60EO-H |
| 19 | 4-$OCH_3$ | H | $C_2H_4SC_6H_5$ | 2.5GL/10PO/10EO-H |
| 20 | 2,5-di-Cl | H | $C_2H_4OC_2H_5$ | 3GL/15BO/10EO-H |
| 21 | 2,4-diBr | H | $C_2H_4SC_2H_5$ | 3GL/10PO/15EO-H |
| 22 | 2-F,4-$NO_2$ | 3-$OC_6H_5$ | $C_3H_6SO_2CH_3$ | 3GL/25PO/25EO-H |
| 23 | 2-I,6-CN,4-$NO_2$ | 3-$SC_6H_5$ | $C_2H_4OC_2H_4OC_2H_5$ | 6GL/25PO/35EO-H |
| 24 | 4-CN | 2,5-di-Cl | $C_2H_4CN$ | 6GL/10PO/10EO-H |
| 25 | 4-CHO | 2,5-di-$CH_3$ | $CH_2C_6H_{11}$ | 4GL/10PO/10EO-H |
| 26 | 2-$SO_2NHC_2H_5$,4-$NO_2$ | H | $CH_2CH_2Cl$ | 4GL/15PO/15EO-H |
| 27 | 2-$COC_6H_5$,4,6-di-$NO_2$ | 3-$CH_3$ | $C_4H_4OCOCH_3$ | 3GL/40PO/20EO-H |
| 28 | 2-$NO_2$,4-SCN | 3-$CH_3$ | $C_2H_4N(SO_2CH_3)CH_3$ | 3GL/10PO/10EO-H |
| 29 | 4-$SO_2C_6H_5$ | 3-$CH_3$ | $C_2H_4CON(C_2H_5)_2$ | 4GL/10PO/10EO-H |
| 30 | 4-$SO_2N(CH_3)C_6H_5$ | 3-$CH_3$ | $C_2H_4SO_2N(CH_3)_2$ | 5GL/15PO/15EO-H |
| 31 | 4-$SO_2N(C_6H_5)C_6H_{11}$ | 3-$CH_3$ | $C_2H_4SO_2N(CH_3)C_6H_5$ | 4GL/11PO/10EO-H |
| 32 | 4-$SO_2N(C_2H_5)_2$ | 3-$CH_3$ | $C_2H_4SO_2(CH_3)C_6H_{11}$ | 3GL/8PO/18EO-H |
| 33 | 2-$SCH_3$,4-$NO_2$ | 3-$CH_3$ | $C_2H_4N(SO_2C_6H_5)C_2H_5$ | 3GL/16PO/5EO-H |
| 34 | 2-Br,4-$SO_2NH_2$ | 3-$CH_3$ | $C_2H_4OCONHO_6H_5$ | 4GL/14PO/20EO-H |
| 35 | 4-$CONH_2$ | 3-$CH_3$ | $C_2H_4SO_2C_6H_5$ | 3GL/19PO/30EO-H |
| 36 | 2-$CONHC_2H_4OH$ | 3-$CH_3$ | $C_2H_4OCO_2C_2H_5$ | 3GL/50PO/50EO-H |
| 37 | 2,6-di-CN,4-$NO_2$ | 3-$CH_3$ | $C_2H_4SO_2CH=CH_2$ | 4GL/20PO/80EO-H |
| 38 | 2-$SO_2CH_3$,4,6-di-$NO_2$ | 3-$CH_3$ | $C_2H_4OCOC_6H_5$ | 3GL/50PO/50EO-H |
| 39 | 2-$SO_2C_6H_5$ | 3-$CH_3$ | $CH_2CH(OCH_3)CH_2OCH_3$ | 3GL/29PO/18EO-H |
| 40 | 3,5-di-$CO_2C_2H_5$ | 3-$CH_3$ | $C_2H_4OCON(CH_3)_2$ | 4GL/10BO/10EO-H |

TABLE 2

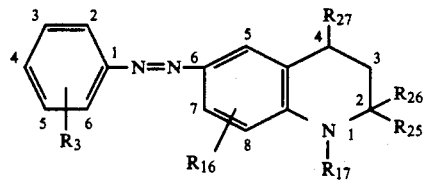

| Entry | R₃ | R₁₆ | R₂₅ | R₂₆ | R₂₇ | R₁₇ |
|---|---|---|---|---|---|---|
| 1 | 4-NO₂ | H | H | H | H | 2GL/10PO/10EO-H |
| 2 | 4-SO₂CH₃ | H | CH₃ | H | H | 4GL/10PO/10EO-H |
| 3 | 2-Cl,4-NO₂ | H | C₂H₅ | H | H | 3GL/10PO/10EO-H |
| 4 | 2-Cl,4-SO₂CH₃ | H | CH₃ | H | H | 5GL/5PO/5EO-H |
| 5 | 2,4-di-NO₂ | H | CH₃ | CH₃ | CH₃ | 3GL/15BO/6EO-H |
| 6 | 2-Br,4,6-di-NO₂ | 7-CH₃ | CH₃ | H | H | 4GL/20PO/10EO-H |
| 7 | 2-Br,4-CN | 7-CH₃ | CH₃ | H | H | 2GL/20BO/10EO-H |
| 8 | 2-CF₃,4-NO₂ | 7-CH₃ | CH₃ | CH₃ | CH₃ | 2GL/10PO/5EO-H |
| 9 | 2-SO₂CH₃,4-NO₂ | 5-CH₃,8-OCH₃ | CH₃ | H | H | 3GL/20PO/5EO-H |
| 10 | 2-Br,4-CO₂C₂H₅ | 5-CH₃,8-OCH₃ | CH₃ | CH₃ | CH₃ | 2GL/10BO/5EO-H |
| 11 | 2-CN,4-NO₂ | 8-OCH₃ | CH₃ | H | H | 2GL/5BO/2EO-H |
| 12 | 2-CN,4-NO₂,6-Cl | 8-OCH₃ | CH₃ | CH₃ | CH₃ | 4GL/30PO/10EO-H |
| 13 | 2-OCH₃,4-NO₂ | 5,8-di-OCH₃ | CH₃ | H | H | 3GL/40PO/10EO-H |
| 14 | 2,4-di-SO₂CH₃ | 5,8-di-OCH₃ | CH₃ | H | H | 4GL/8PO/8EO-H |
| 15 | 2,4-di-CN | 7-Cl | CH₃ | H | H | 6GL/5PO/10EO-H |
| 16 | 2,6-di-Br,4-SO₂CH₃ | 7-OCH₃ | CH₃ | H | H | 6GL/15PO/5EO-H |
| 17 | 4-CN | 7-OC₂H₅ | CH₃ | H | H | 4GL/40PO/40EO-H |
| 18 | 4-CH₃ | 7-CF₃ | CH₃ | H | H | 3GL/50PO/60EO-H |
| 19 | 4-SO₂C₆H₅ | 7-CH₃ | CH₃ | H | H | C₂H₄SO₂NHC₆H₄-O-3GL/10PO/5EO-H |
| 20 | 2,5-di-Cl | 7-CH₃ | CH₃ | H | H | CH₂C₆H₄SO₂C₆H₄-O-4GL/15PO/4EO-H |

TABLE 3

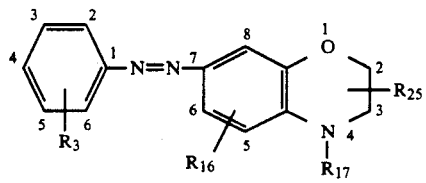

| Entry | R₃ | R₁₆ | R₂₅ | R₁₇ |
|---|---|---|---|---|
| 1 | 4-NO₂ | H | H | 2GL/10PO/10EO-H |
| 2 | 4-SO₂CH₃ | H | 2-CH₃ | 4GL/10PO/10EO-H |
| 3 | 2,4-diBr | H | 2-CH₃ | 3GL/10PO/15EO-H |
| 4 | 2-Cl,4-NO₂ | H | H | 3GL/25PO/25EO-H |
| 5 | 2-Br,6-CN,4-NO₂ | 6-CH₃ | H | 6GL/25PO/35EO-H |
| 6 | 4-CN | 6-CH₃ | 3-CH₃ | 6GL/10PO/10EO-H |
| 7 | 2-Br,4-CN | 6-CH₃ | 3-CH₃ | 4GL/10PO/10EO-H |
| 8 | 4-SO₂CH₃ | 6-CH₃ | 3-CH₃ | 4GL/15PO/15EO-H |
| 9 | 2-COC₆H₅,4,6-di-NO₂ | 6-CH₃ | H | 3GL/40PO/20EO-H |
| 10 | 2-NO₂,4-SCN | H | H | 3GL/10PO/10EO-H |
| 11 | 4-SO₂C₆H₅ | H | 3-CH₃ | 4GL/10PO/10EO-H |
| 12 | 4-SO₂N(CH₃)C₆H₅ | 6-OCH₃ | 3-CH₃ | 5GL/15PO/15EO-H |
| 13 | 4-SO₂N(C₆H₅)C₆H₁₁ | 6-Cl | 3-CH₃ | 4GL/11PO/10EO-H |
| 14 | 4-SO₂N(C₂H₅)₂ | H | H | 3GL/8PO/18EO-H |
| 15 | 2-SCH₃,4-NO₂ | 6,8-di-CH₃ | 3-CH₃ | 3GL/16PO/5EO-H |
| 16 | 2,4-di-CN | H | 3-CH₃ | 4GL/14PO/20EO-H |
| 17 | 2-CN,4-NO₂ | 6-CH₃ | 3-CH₃ | 3GL/19PO/30EO-H |
| 18 | 2-CONHC₂H₄OH | H | 3-CH₃ | 3GL/50PO/50EO-H |
| 19 | 2,6-di-CN,4-NO₂ | H | 3-CH₃ | 4GL/20PO/80EO-H |
| 20 | 2-SO₂CH₃,4,6-di-NO₂ | H | 3-CH₃ | 3GL/50PO/50EO-H |
| 21 | 2-SO₂C₆H₅ | 6-CH₃ | 3-CH₃ | C₂H₄SO₂N(CH₃)-3GL/10PO/5EO-H |
| 22 | 3,5-di-CO₂C₂H₅ | 6-CH₃ | 3-CH₃ | C₂H₄S-4GL/20BO/10EO-H |

TABLE 4

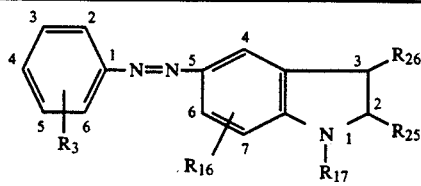

| Entry | $R_3$ | $R_{16}$ | $R_{25}$ | $R_{26}$ | $R_{17}$ |
|---|---|---|---|---|---|
| 1 | 4-$NO_2$ | H | H | H | 2GL/10PO/10EO-H |
| 2 | 4-$SO_2CH_3$ | H | $CH_3$ | H | 4GL/10PO/10EO-H |
| 3 | 2-Cl,4-$NO_2$ | H | $CH_3$ | H | 3GL/10PO/10EO-H |
| 4 | 2-Cl,4-$SO_2CH_3$ | H | $CH_3$ | H | 5GL/5PO/5EO-H |
| 5 | 2,4-di-$NO_2$ | H | $CH_3$ | H | 3GL/15BO/6EO-H |
| 6 | 2-Br,4,6-di-$NO_2$ | 6-$CH_3$ | $CH_3$ | $CH_3$ | 4GL/20PO/10EO-H |
| 7 | 2-Br,4-CN | 6-$CH_3$ | $CH_3$ | H | 2GL/20BO/10EO-H |
| 8 | 2-$CF_3$,4-$NO_2$ | 6-$CH_3$ | $CH_3$ | H | 2GL/10PO/5EO-H |
| 9 | 2-$SO_2CH_3$,4-$NO_2$ | 4,6-di-$CH_3$ | $CH_3$ | H | 3GL/20PO/5EO-H |
| 10 | 2-Br,4-$CO_2C_2H_5$ | 6-$OCH_3$ | $CH_3$ | H | 2GL/10BO/5EO-H |
| 11 | 2-CN,4-$NO_2$ | 6-Cl | $CH_3$ | H | 2GL/5BO/2EO-H |
| 12 | 2-CN,4-$NO_2$,6-Cl | 6-$C_2H_5$ | $CH_3$ | H | 4GL/30PO/10EO-H |
| 13 | 2-$OCH_3$,4-$NO_2$ | 6-$CH_3$ | $CH_3$ | H | 3GL/40PO/10EO-H |
| 14 | 2,4-di-$SO_2CH_3$ | 6-$CH_3$ | $CH_3$ | H | 4GL/8PO/8EO-H |
| 15 | 2,4-di-CN | H | $CH_3$ | H | 6GL/5PO/10EO-H |
| 16 | 2,6-di-Br,4-$SO_2CH_3$ | H | $CH_3$ | H | 6GL/15PO/5EO-H |
| 17 | 4-CN | H | $CH_3$ | H | 4GL/40PO/40EO-H |
| 18 | 4-$CH_3$ | H | $CH_3$ | H | $C_2H_4OC_6H_4$-3GL/10PO/15EO-H |
| 19 | 4-$SO_2C_6H_5$ | H | $CH_3$ | H | $CH_2CH(CH_3)O$-3GL/10PO/5EO-H |
| 20 | 2,5-di-Cl | H | $CH_3$ | H | $C_3H_6O$-4GL/15PO/4EO-H |

TABLE 5

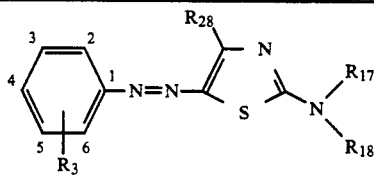

| Entry | $R_3$ | $R_{17}$ | $R_{18}$ | $R_{28}$ |
|---|---|---|---|---|
| 1 | 4-$NO_2$ | 2GL/10PO/10EO-H | 2GL/10PO/10EO-H | $C_6H_5$ |
| 2 | 4-$SO_2CH_3$ | 4GL/10PO/10EO-H | 4GL/10PO/10EO-H | $C_6H_5$ |
| 3 | 2-Cl,4-$NO_2$ | 3GL/10PO/10EO-H | 3GL/10PO/10EO-H | $CH_3$ |
| 4 | 2-Cl,4-$SO_2CH_3$ | 5GL/5PO/5EO-H | 5GL/5PO/5EO-H | $CH_3$ |
| 5 | 2,4-di-$NO_2$ | 3GL/15BO/6EO-H | 3GL/15BO/6EO-H | $C_6H_{11}$ |
| 6 | 4-CN | 4GL/20PO/10EO-H | 4GL/20PO/10EO-H | $C_6H_4$-4-$CH_3$ |
| 7 | 2-Br,4-CN | $C_6H_5$ | 2GL/20BO/10EO-H | $C_6H_4$-4-$CH_3$ |
| 8 | 2-$CF_3$,4-$NO_2$ | $CH_2C_6H_5$ | 2GL/10PO/5EO-H | $C_6H_4$-4-$OCH_3$ |
| 9 | 2-$SO_2CH_3$,4-$NO_2$ | $CH_3$ | 3GL/20PO/5EO-H | $C_6H_4$-4-Cl |
| 10 | 2-Br,4-$CO_2C_2H_5$ | $CH_3$ | 2GL/10BO/5EO-H | $C_6H_5$ |
| 11 | 2-CN,4-$NO_2$ | 2GL/5BO/2EO-H | 2GL/5BO/2EO-H | $C_6H_5$ |
| 12 | 2-CN,4-$NO_2$,6-Cl | $CH_3$ | 4GL/30PO/10EO-H | $CH_3$ |
| 13 | 2-$OCH_3$,4-$NO_2$ | $C_2H_5$ | 3GL/40PO/10EO-H | 2-thienyl |
| 14 | 2,4-di-$SO_2CH_3$ | $CH_3$ | 4GL/8PO/8EO-H | 5-Cl-2-thienyl |
| 15 | 2,4-di-CN | $CH_3$ | $C_6H_4$-4-$C_2H_4O$-3GL/10PO/5EO-H | $CH_3$ |
| 16 | 2,6-di-Br,4-$SO_2CH_3$ | $CH_3$ | $C_2H_4O$-4GL/15BO/10EO-H | $CH_3$ |
| 17 | 2,4-di-Br | H | $C_2H_4N(SO_2CH_3)$-3GL/10PO/10EO-H | $C_6H_5$ |
| 18 | 4-$CH_3$ | 3GL/50PO/60EO-H | 3GL/50PO/60EO-H | $C_6H_5$ |
| 19 | 4-$OCH_3$ | 3GL/10PO/10EO-H | 3GL/10PO/10EO-H | $CH_3$ |
| 20 | 2,5-di-Cl | $C_2H_5$ | 3GL/15BO/10EO-H | $C_6H_5$ |

TABLE 6

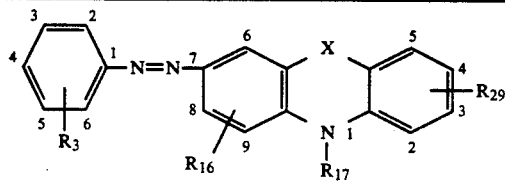

| Entry | $R_3$ | $R_{16}$ | $R_{17}$ | X | $R_{29}$ |
|---|---|---|---|---|---|
| 1 | 4-$NO_2$ | H | 2GL/10PO/10EO-H | CB* | H |
| 2 | 4-$SO_2CH_3$ | H | 4GL/10PO/10EO-H | CB* | H |

TABLE 6-continued

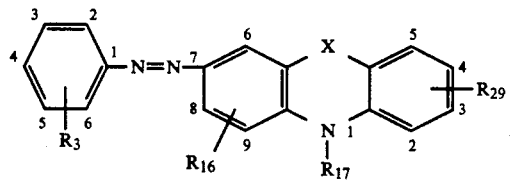

| Entry | R₃ | R₁₆ | R₁₇ | X | R₂₉ |
|---|---|---|---|---|---|
| 3 | 2-Cl,4-NO₂ | 8-CH₃ | 4GL/11PO/11EO-H | CB* | H |
| 4 | 2-Cl,4-SO₂CH₃ | 8-CH₃ | 5GL/5PO/5EO-H | CB* | H |
| 5 | 2,4-di-NO₂ | 8-CH₃ | 3GL/15BO/6EO-H | CB* | 4-OCH₃ |
| 6 | 2-Br,4,6-di-NO₂ | H | 4GL/20PO/10EO-H | O | 3,4-di-Cl |
| 7 | 2-Br,4-CN | H | 2GL/20BO/10EO-H | O | 2-Cl |
| 8 | 2-CF₃,4-NO₂ | 8-CH₃ | 2GL/10PO/5EO-H | O | 3-OCH₃ |
| 9 | 2-SO₂CH₃,4-NO₂ | 8-CH₃ | 3GL/20PO/5EO-H | S | H |
| 10 | 2-Br,4-CO₂C₂H₅ | 8-CH₃ | 2GL/10BO/5EO-H | S | H |
| 11 | 2-CN,4-NO₂ | 5,8-di-CH₃ | 2GL/5BO/2EO-H | S | H |
| 12 | 2-CN,4-NO₂,6-Cl | H | 4GL/30PO/10EO-H | S | H |
| 13 | 2-OCH₃,4-NO₂ | 8-CH₃ | 3GL/40PO/10EO-H | O | H |
| 14 | 2,4-di-SO₂CH₃ | 8-CH₃ | 4GL/8PO/8EO-H | O | 4-OCH₃ |
| 15 | 2,4-di-CN | H | 6GL/5PO/10EO-H | O | H |
| 16 | 2,6-di-Br,4-SO₂CH₃ | H | 6GL/15PO/5EO-H | O | H |
| 17 | 4-CN | H | 4GL/40PO/40EO-H | O | H |
| 18 | 4-CH₃ | 8-CH₃ | 5GL/20BO/5EO-H | O | H |
| 19 | 4-SO₂C₆H₅ | 8-CH₃ | C₂H₄O-4GL/15PO/10EO-H | O | H |
| 20 | 2,5-di-Cl | 8-CH₃ | 4GL/15PO/4EO-H | O | H |

*covalent bond

TABLE 7

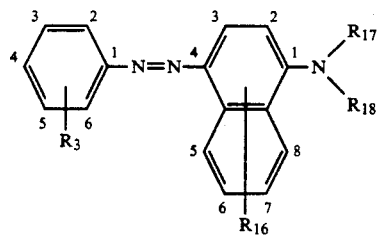

| Entry | R₃ | R₁₆ | R₁₇ | R₁₈ |
|---|---|---|---|---|
| 1 | 4-NO₂ | H | 2GL/10PO/10EO-H | 2GL/10PO/10EO-H |
| 2 | 4-SO₂CH₃ | H | C₂H₅ | 4GL/10PO/10EO-H |
| 3 | 2-Cl,4-NO₂ | 2-CH₃ | CH₂CH=CH₂ | 3GL/10PO/10EO-H |
| 4 | 2-Cl,4-SO₂CH₃ | 2-CH₃ | 5GL/5PO/5EO-H | 5GL/5PO/5EO-H |
| 5 | 4-CN | 5-O-3GL/5BO/16EO-H | C₂H₅ | H |
| 6 | 2-Br,4,6-di-NO₂ | 2-CH₃ | CH₃ | 4GL/20PO/10EO-H |
| 7 | 2-Br,4-CN | 2-OCH₃ | C₂H₄C₆H₅ | 2GL/20BO/10EO-H |
| 8 | 2-CF₃,4-NO₂ | 2-OCH₃,6-CH₃ | 2GL/10PO/5EO-H | 2GL/10PO/5EO-H |
| 9 | 2-SO₂CH₃,4-NO₂ | 3-OCH₃ | 3GL/20PO/5EO-H | 3GL/20PO/5EO-H |
| 10 | 2-Br,4-CO₂C₂H₅ | H | H | C₂H₄SO₂NH-2GL/10BO/5EO-H |
| 11 | 2-CN,4-NO₂ | H | 2GL/5BO/2EO-H | 2GL/5BO/2EO-H |
| 12 | 2-CN,4-NO₂,6-Cl | H | C₆H₁₀-4-CH₃ | 4GL/30PO/10EO-H |
| 13 | 2-OCH₃,4-NO₂ | H | C₆H₄-4-OCH₃ | 3GL/40PO/10EO-H |
| 14 | 2,4-di-SO₂CH₃ | 2-CH₃ | C₆H₄-3-Cl | 4GL/8PO/8EO-H |
| 15 | 2,4-di-CN | 2-CH₃ | 6GL/5PO/10EO-H | 6GL/5PO/10EO-H |
| 16 | 2,6-di-Br,4-SO₂CH₃ | 5-OCH₃ | 6GL/15PO/5EO-H | 6GL/15PO/5EO-H |
| 17 | H | H | 4GL/40PO/40EO-H | 4GL/40PO/40EO-H |
| 18 | 4-CH₃ | H | C₂H₄OC₆H₅ | 3GL/50PO/60EO-H |
| 19 | 4-OCH₃ | H | C₂H₄SC₆H₅ | 2.5GL/10PO/10EO-H |
| 20 | 2,5-di-Cl | H | C₂H₄OC₂H₅ | 3GL/15BO/10EO-H |

TABLE 8

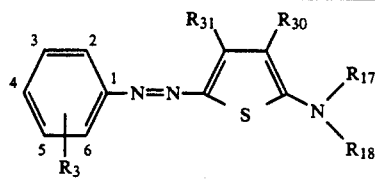

| Entry | R₃ | R₁₇ | R₁₈ | R₃₀ | R₃₁ |
|---|---|---|---|---|---|
| 1 | 4-NO₂ | 2GL/10PO/10EO-H | 2GL/10PO/10EO-H | H | H |
| 2 | 4-SO₂CH₃ | 4GL/10PO/10EO-H | 4GL/10PO/10EO-H | H | H |
| 3 | 2-Cl,4-NO₂ | 3GL/10PO/10EO-H | 3GL/10PO/10EO-H | H | CH₃ |
| 4 | 2-Cl,4-SO₂CH₃ | 5GL/5PO/5EO-H | 5GL/5PO/5EO-H | H | C₆H₅ |
| 5 | 4-SO₂N(CH₃)-3GL/10PO/5EO-H | H | H | H | CH₃ |
| 6 | 4-SO₂-4GL/20PO/10EO-H | H | H | CO₂C₂H₅ | CH₃ |
| 7 | 3-O-4GL/14BO/10EO-H | H | H | CN | CH₃ |
| 8 | 3-S-3GL/15PO/12EO-H | H | C₂H₅ | SO₂CH₃ | CH₃ |
| 9 | 4-N=N—C₆H₄-4-O-3GL/10PO/5EO-H | H | CH₃ | CONH₂ | CH₃ |
| 10 | 4-N=N—C₆H₄-4-S-3GL/10PO/5EO-H | H | H | SO₂C₆H₅ | CH₃ |
| 11 | 2-CN,4-NO₂ | 3GL/20PO/5EO-H | CH₃ | CONHC₂H₅ | CH₃ |
| 12 | 2-CN,4-NO₂,6-Cl | 4GL/30PO/10EO-H | 4GL/30PO/10EO-H | H | C₆H₅ |
| 13 | 2-OCH₃,4-NO₂ | 3GL/40PO/10EO-H | C₂H₅ | CONHC₂H₄OH | C₆H₅ |
| 14 | 2,4-di-SO₂CH₃ | 4GL/8PO/8EO-H | 4GL/8PO/8EO-H | H | CH₃ |
| 15 | 2,4-di-CN | 6GL/5PO/10EO-H | CH₃ | H | CH₃ |
| 16 | 2,6-di-Br,4-SO₂CH₃ | 6GL/15PO/5EO-H | CH₂C₆H₅ | H | CH₃ |
| 17 | 4-CN | 4GL/40PO/40EO-H | 4GL/40PO/40EO-H | H | C₆H₅ |
| 18 | 4-CH₃ | 3GL/10PO/15EO-H | 3GL/10PO/15EO-H | H | CH₃ |
| 19 | 4-SO₂C₆H₅ | 5GL/10PO/5EO-H | 5GL/10PO/5EO-H | H | CH₃ |
| 20 | 2,5-di-Cl | 4GL/15PO/4EO-H | CH₃ | H | C₆H₅ |

TABLE 9

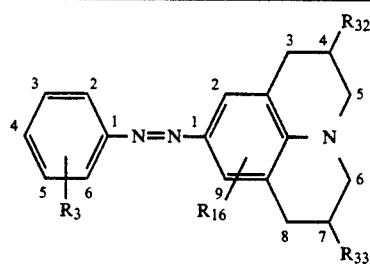

| Entry | R₃ | R₁₆ | R₃₂ | R₃₃ |
|---|---|---|---|---|
| 1 | 4-NO₂ | H | O-2GL/10PO/10EO-H | H |
| 2 | 4-SO₂CH₃ | H | O-4GL/10PO/10EO-H | H |
| 3 | 2-Cl,4-NO₂ | 2-CH₃ | O-3GL/10PO/10EO-H | H |
| 4 | 2-Cl,4-SO₂CH₃ | 2-CH₃ | O-5GL/15PO/5EO-H | H |
| 5 | 2,4-di-NO₂ | 2-CH₃ | O-3GL/15BO/6EO-H | H |
| 6 | 2-Br,4,6-di-NO₂ | 2-OCH₃ | O-4GL/20PO/10EO-H | CH₃ |
| 7 | 4-CN | 2-Cl | O-3GL/10PO/20EO-H | CH₃ |
| 8 | 2-CF₃,4-NO₂ | 2-CH₃ | O-3GL/10PO/10EO-H | O-3GL/10PO/10EO-H |
| 9 | 2-SO₂CH₃,4-NO₂ | 2-OCH₃ | O-3GL/20PO/5EO-H | O-3GL/20PO/5EO-H |
| 10 | 2-Br,4-CO₂C₂H₅ | 2-CH₃ | O-2GL/10BO/5EO-H | O-2GL/10BO/5EO-H |
| 11 | 2-CN,4-NO₂ | 2,9-di-CH₃ | O-2GL/5BO/2EO-H | OCH₃ |
| 12 | 2-CN,4-NO₂,6-Cl | H | O-3GL/40PO/10EO-H | OCH₃ |
| 13 | 2-OCH₃,4-NO₂ | H | O-3GL/40PO/10EO-H | Cl |
| 14 | 2,4-di-SO₂CH₃ | 2-CH₃ | O-4GL/8PO/8EO-H | Cl |
| 15 | 2,4-di-CN | 2-CH₃ | O-6GL/5PO/10EO-H | H |
| 16 | 2,6-di-Br,4-SO₂CH₃ | 2-CH₃ | O-6GL/15PO/5EO-H | O-6GL/15PO/5EO-H |
| 17 | O-4GL/40PO/40EO-H | H | H | H |
| 18 | O-3GL/50PO/60EO-H | H | H | H |
| 19 | S-2GL/10PO/10EO-H | H | H | Cl |
| 20 | S-3GL/15BO/10EO-H | H | H | C₂H₅ |

TABLE 10

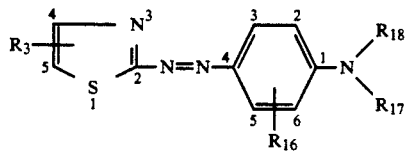

| Entry | R_3 | R_16 | R_17 | R_18 |
|---|---|---|---|---|
| 1 | 4-CH_3 | H | C_2H_5 | 2GL/10PO/10EO-H |
| 2 | 4-C_6H_5 | H | C_6H_{11} | 4GL/10PO/10EO-H |
| 3 | 4-N=N—C_6H_5 | 3-CH_3 | CH_2CH=CH_2 | 3GL/10PO/10EO-H |
| 4 | 4-CH_3,5-CO_2C_2H_5 | 3-CH_3 | 5GL/5PO/5EO-H | 5GL/5PO/5EO-H |
| 5 | 5-CN | 3-CH_3 | CH_2C_6H_5 | 3GL/15BO/6EO-H |
| 6 | 5-CHO | 2-CH_3 | CH_3 | 4GL/20PO/10EO-H |
| 7 | 5-SO_2CH_3 | 2-OCH_3 | C_2H_4C_6H_5 | 2GL/20BO/10EO-H |
| 8 | 5-NO_2 | 2-OCH_3,5-CH_3 | 2GL/10PO/5EO-H | 2GL/10PO/5EO-H |
| 9 | 4-SO_2CH_3,5-NO_2 | 3-OCH_3 | 3GL/20PO/5EO-H | 3GL/20PO/5EO-H |
| 10 | 5-COCH_3 | 3-CF_3 | 2GL/10BO/5EO-H | 2GL/10BO/5EO-H |
| 11 | 5-COC_6H_5 | 3-Cl | 2GL/5BO/2EO-H | 2GL/5BO/2EO-H |
| 12 | 5-Cl | H | C_6H_{10}-4-CH_3 | 4GL/30PO/10EO-H |
| 13 | 5-Br | H | C_6H_4-4-OCH_3 | 3GL/40PO/10EO-H |
| 14 | 4-CF_3 | 3-CH_3 | C_6H_4-3-Cl | 4GL/8PO/8EO-H |
| 15 | 5-SCN | 3-CH_3 | C_6H_4-3-CO_2C_2H_5 | 6GL/5PO/10EO-H |
| 16 | 5-SO_2N(C_2H_5)_2 | 3-CH_3 | C_6H_4-4-CN | 6GL/15PO/5EO-H |
| 17 | 5-CON(CH_3)_2 | H | C_2H_4C_6H_5 | 4GL/40PO/40EO-H |
| 18 | 5-CONH_2 | H | C_2H_4OC_6H_5 | 3GL/50PO/60EO-H |
| 19 | 5-CONHC_2H_4OH | H | C_2H_4SC_6H_5 | 2.5GL/10PO/10EO-H |
| 20 | 5-SO_2NHC_2H_4OH | H | C_2H_4OC_2H_5 | 3GL/15BO/10EO-H |

TABLE 11

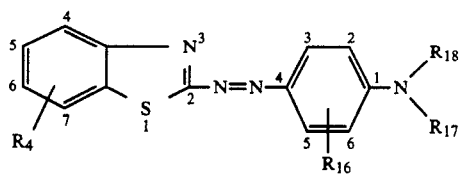

| Entry | R_4 | R_16 | R_17 | R_18 |
|---|---|---|---|---|
| 1 | H | H | C_2H_5 | 2GL/10PO/10EO-H |
| 2 | 4-Cl | H | C_6H_{11} | 4GL/10PO/10EO-H |
| 3 | 5,6-di-Cl | 3-CH_3 | CH_2CH=CH_2 | 3GL/10PO/10EO-H |
| 4 | 6-CH_3 | 3-CH_3 | 5GL/5PO/5EO-H | 5GL/5PO/5EO-H |
| 5 | 6-OCH_3 | 3-CH_3 | CH_2C_6H_5 | 3GL/15BO/6EO-H |
| 6 | 6-CN | 2-CH_3 | CH_3 | 4GL/20PO/10EO-H |
| 7 | 6-CO_2CH_3 | 2-OCH_3 | C_2H_4C_6H_5 | 2GL/20BO/10EO-H |
| 8 | 6-SO_2CH_3 | 2-OCH_3,5-CH_3 | 2GL/10PO/5EO-H | 2GL/10PO/5EO-H |
| 9 | 4-CF_3 | 3-OCH_3 | 3GL/20PO/5EO-H | 3GL/20PO/5EO-H |
| 10 | 6-SO_2C_6H_5 | 3-CF_3 | 2GL/10BO/5EO-H | 2GL/10BO/5EO-H |
| 11 | 6-COC_6H_5 | 3-Cl | 2GL/5BO/2EO-H | 2GL/5BO/2EO-H |
| 12 | 6-COCH_3 | H | C_6H_{10}-4-CH_3 | 4GL/30PO/10EO-H |
| 13 | 6-CON(CH_3)_2 | H | C_6H_4-4-OCH_3 | 3GL/40PO/10EO-H |
| 14 | 6-SO_2N(C_2H_5)_2 | 3-CH_3 | C_6H_4-3-Cl | 4GL/8PO/8EO-H |
| 15 | 6-SCN | 3-CH_3 | C_6H_4-3-CO_2C_2H_5 | 6GL/5PO/10EO-H |
| 16 | 6-SCH_3 | 3-CH_3 | C_6H_4-4-CN | 6GL/15PO/5EO-H |
| 17 | 6-SC_2H_4CN | H | C_2H_4C_6H_5 | 4GL/40PO/40EO-H |
| 18 | 6-SO_2C_2H_4CN | H | C_2H_4OC_6H_5 | 3GL/50PO/60EO-H |
| 19 | 6-NHCOCH_3 | H | C_2H_4SC_6H_5 | 2.5GL/10PO/10EO-H |
| 20 | 6-N=N—C_6H_5 | H | C_2H_4OC_2H_5 | 3GL/15BO/10EO-H |
| 21 | 6-O-3GL/10PO/10EO-H | H | C_2H_4SC_2H_5 | 3GL/10PO/15EO-H |
| 22 | 6-S-4GL/12BO/15EO-H | H | C_3H_6SO_2CH_3 | 3GL/25PO/25EO-H |
| 23 | 5-NO_2 | H | C_2H_4OC_2H_4OC_2H_5 | 6GL/25PO/35EO-H |
| 24 | 6-Cl,5-NO_2 | H | C_2H_4CN | 6GL/10PO/10EO-H |
| 25 | 4-CHO | 2,5-di-CH_3 | CH_2C_6H_{11} | 4GL/10PO/10EO-H |

TABLE 12

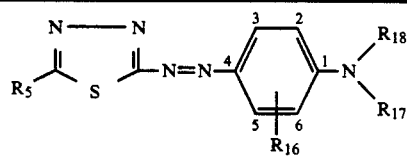

| Entry | R₅ | R₁₆ | R₁₇ | R₁₈ |
|---|---|---|---|---|
| 1 | H | H | $C_2H_5$ | 2GL/10PO/10EO-H |
| 2 | $CH_3$ | H | $C_6H_{11}$ | 4GL/10PO/10EO-H |
| 3 | $C_6H_5$ | 3-$CH_3$ | $CH_2CH=CH_2$ | 3GL/10PO/10EO-H |
| 4 | $C_2H_5S$ | 3-$CH_3$ | 5GL/5PO/5EO-H | 5GL/5PO/5EO-H |
| 5 | $NCCH_2S$ | 3-$CH_3$ | $CH_2C_6H_5$ | 3GL/15BO/6EO-H |
| 6 | $C_2H_5SO_2$ | 2-$CH_3$ | $CH_3$ | 4GL/20PO/10EO-H |
| 7 | $C_6H_5O$ | 2-$OCH_3$ | $C_2H_4C_6H_5$ | 2GL/20BO/10EO-H |
| 8 | $CH_2=CHCH_2S$ | 2-$OCH_3$,5-$CH_3$ | 2GL/10PO/5EO-H | 2GL/10PO/5EO-H |
| 9 | $C_6H_5CH_2$ | 3-$OCH_3$ | 3GL/20PO/5EO-H | 3GL/20PO/5EO-H |
| 10 | Cl | 3-$CF_3$ | 2GL/10BO/5EO-H | 2GL/10BO/5EO-H |
| 11 | NCS | 3-Cl | 2GL/5BO/2EO-H | 2GL/5BO/2EO-H |
| 12 | $SO_2N(C_2H_5)_2$ | H | $C_6H_{10}$-4-$CH_3$ | 4GL/30PO/10EO-H |
| 13 | $CH_3CONH$ | H | $C_6H_4$-4-$OCH_3$ | 3GL/40PO/10EO-H |
| 14 | $C_6H_{11}$ | 3-$CH_3$ | $C_6H_4$-3-Cl | 4GL/8PO/8EO-H |
| 15 | $C_6H_4$-4-$CO_2CH_3$ | 3-$CH_3$ | $C_6H_4$-3-$CO_2C_2H_5$ | 6GL/5PO/10EO-H |
| 16 | $SO_2NH_2$ | 3-$CH_3$ | $C_6H_4$-4-CN | 6GL/15PO/5EO-H |
| 17 | $CO_2C_4H_9$-n | H | $C_2H_4C_6H_5$ | 4GL/40PO/40EO-H |
| 18 | Br | H | $C_2H_4OC_6H_5$ | 3GL/50PO/60EO-H |
| 19 | S-4GL/10PO/10EO-H | H | $C_2H_4SC_6H_5$ | 2.5GL/10PO/10EO-H |
| 20 | $SC_2H_4O$-3GL/10PO/5EO-H | H | $C_2H_4OC_2H_5$ | 3GL/15BO/10EO-H |

TABLE 13

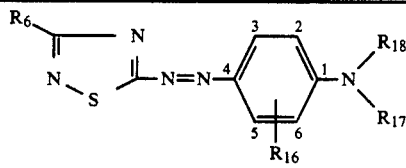

| Entry | R₆ | R₁₆ | R₁₇ | R₁₈ |
|---|---|---|---|---|
| 1 | H | H | $C_2H_5$ | 2GL/10PO/10EO-H |
| 2 | $CH_3$ | H | $C_6H_{11}$ | 4GL/10PO/10EO-H |
| 3 | $C_6H_5$ | 3-$CH_3$ | $CH_2CH=CH_2$ | 3GL/10PO/10EO-H |
| 4 | $CH_3S$ | 3-$CH_3$ | 5GL/5PO/5EO-H | 5GL/5PO/5EO-H |
| 5 | Cl | 3-$CH_3$ | $CH_2C_6H_5$ | 3GL/15BO/6EO-H |
| 6 | $C_6H_4$-2-CN | 2-$CH_3$ | $CH_3$ | 4GL/20PO/10EO-H |
| 7 | $C_2H_5SO_2$ | 2-$OCH_3$ | $C_2H_4C_6H_5$ | 2GL/20BO/10EO-H |
| 8 | NC | 2-$OCH_3$,5-$CH_3$ | 2GL/10PO/5EO-H | 2GL/10PO/5EO-H |
| 9 | $CH_3O_2CC_2H_5$ | 3-$OCH_3$ | 3GL/20PO/5EO-H | 3GL/20PO/5EO-H |
| 10 | $C_6H_5CH_2S$ | 3-$CF_3$ | 2GL/10BO/5EO-H | 2GL/10BO/5EO-H |
| 11 | $C_2H_5SO_2$ | 3-Cl | 2GL/5BO/2EO-H | 2GL/5BO/2EO-H |
| 12 | H | H | $C_6H_{10}$-4-$CH_3$ | 4GL/30PO/10EO-H |
| 13 | $C_2H_5$ | H | $C_6H_4$-4-$OCH_3$ | 3GL/40PO/10EO-H |
| 14 | $C_6H_5CH_2S$ | 3-$CH_3$ | $C_6H_4$-3-Cl | 4GL/8PO/8EO-H |
| 15 | $C_2H_5S$ | 3-$CH_3$ | $C_6H_4$-3-$CO_2C_2H_5$ | 6GL/5PO/10EO-H |
| 16 | Br | 3-$CH_3$ | $C_6H_4$-4-CN | 6GL/15PO/5EO-H |
| 17 | H | H | $C_2H_4C_6H_5$ | 4GL/40PO/40EO-H |
| 18 | H | H | $C_2H_4OC_6H_5$ | 3GL/50PO/60EO-H |
| 19 | $CH_3$ | H | $C_2H_4SC_6H_5$ | 2.5GL/10PO/10EO-H |
| 20 | $C_6H_5$ | H | $C_2H_4OC_2H_5$ | 3GL/15BO/10EO-H |

TABLE 14

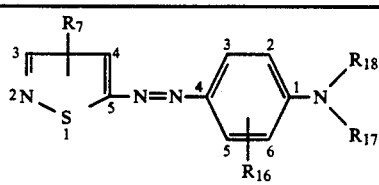

| Entry | R₇ | R₁₆ | R₁₇ | R₁₈ |
|---|---|---|---|---|
| 1 | H | H | $C_2H_5$ | 2GL/10PO/10EO-H |
| 2 | 3-$CH_3$ | H | $C_6H_{11}$ | 4GL/10PO/10EO-H |
| 3 | 3-$C_6H_5$ | 3-$CH_3$ | $CH_2CH=CH_2$ | 3GL/10PO/10EO-H |
| 4 | 3-$CH_3$,4-Cl | 3-$CH_3$ | 5GL/5PO/5EO-H | 5GL/5PO/5EO-H |

TABLE 14-continued

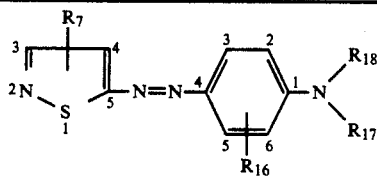

| Entry | R7 | R16 | R17 | R18 |
|---|---|---|---|---|
| 5 | 3-CH$_3$,4-Br | 3-CH$_3$ | CH$_2$C$_6$H$_5$ | 3GL/15BO/6EO-H |
| 6 | 3-CH$_3$,4-CN | 2-CH$_3$ | CH$_3$ | 4GL/20PO/10EO-H |
| 7 | 3-CH$_3$,4-SO$_2$CH$_3$ | 2-OCH$_3$ | C$_2$H$_4$C$_6$H$_5$ | 2GL/20BO/10EO-H |
| 8 | 3-CH$_3$,4-SC$_2$H$_5$ | 2-OCH$_3$,5-CH$_3$ | 2GL/10PO/5EO-H | 2GL/10PO/5EO-H |
| 9 | 3-CH$_3$,4-SO$_2$C$_6$H$_5$ | 3-OCH$_3$ | 3GL/20PO/5EO-H | 3GL/20PO/5EO-H |
| 10 | 3-CH$_3$,4-NO$_2$ | 3-CF$_3$ | 2GL/10BO/5EO-H | 2GL/10BO/5EO-H |
| 11 | 3-CH$_3$,4-CO$_2$C$_2$H$_5$ | 3-Cl | 2GL/5BO/2EO-H | 2GL/5BO/2EO-H |
| 12 | 3-CH$_3$,4-SC$_2$H$_4$OH | H | C$_6$H$_{10}$-4-CH$_3$ | 4GL/30PO/10EO-H |
| 13 | 3-CH$_3$,4-S$_6$H$_5$ | H | C$_6$H$_4$-4-OCH$_3$ | 3GL/40PO/10EO-H |
| 14 | 3-Cl,4-CN | 3-CH$_3$ | C$_6$H$_4$-3-Cl | 4GL/8PO/8EO-H |
| 15 | 3-CH$_3$,4-CONHCH$_3$ | 3-CH$_3$ | C$_6$H$_4$-3-CO$_2$C$_2$H$_5$ | 6GL/5PO/10EO-H |
| 16 | 3-CH$_3$,4-OC$_6$H$_5$ | 3-CH$_3$ | C$_6$H$_4$-4-CN | 6GL/15PO/5EO-H |
| 17 | 3-CH$_3$,4-OCH$_3$ | H | C$_2$H$_4$C$_6$H$_5$ | 4GL/40PO/40EO-H |
| 18 | 3-C$_2$H$_5$ | H | C$_2$H$_4$OC$_6$H$_5$ | 3GL/50PO/60EO-H |
| 19 | 3-CH$_3$,4-SCN | H | C$_2$H$_4$SC$_6$H$_5$ | 2.5GL/10PO/10EO-H |
| 20 | 3-CH$_3$,4-SCH$_3$ | H | C$_2$H$_4$OC$_2$H$_5$ | 3GL/15BO/10EO-H |

TABLE 15

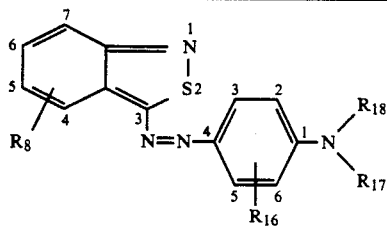

| Entry | R8 | R16 | R17 | R18 |
|---|---|---|---|---|
| 1 | H | H | C$_2$H$_5$ | 2GL/10PO/10EO-H |
| 2 | 5-Cl | H | C$_6$H$_{11}$ | 4GL/10PO/10EO-H |
| 3 | 5-Br | 3-CH$_3$ | CH$_2$CH=CH$_2$ | 3GL/10PO/10EO-H |
| 4 | 5-CH$_3$ | 3-CH$_3$ | 5GL/5PO/5EO-H | 5GL/5PO/5EO-H |
| 5 | 5-CH$_3$ | 3-CH$_3$ | CH$_2$C$_6$H$_5$ | 3GL/15BO/6EO-H |
| 6 | 6-Cl | 2-CH$_3$ | CH$_3$ | 4GL/20PO/10EO-H |
| 7 | 6-Cl | 2-OCH$_3$ | C$_2$H$_4$C$_6$H$_5$ | 2GL/20BO/10EO-H |
| 8 | 5-NO$_2$ | 2-OCH$_3$,5-CH$_3$ | 2GL/10PO/5EO-H | 2GL/10PO/5EO-H |
| 9 | 5-Cl,7-SO$_2$N(CH$_3$)$_2$ | 3-OCH$_3$ | 3GL/20PO/5EO-H | 3GL/20PO/5EO-H |
| 10 | 5-OCH$_3$ | 3-CF$_3$ | 2GL/10BO/5EO-H | 2GL/10BO/5EO-H |
| 11 | 5-Br,7-SO$_2$NH$_2$ | 3-Cl | 2GL/5BO/2EO-H | 2GL/5BO/2EO-H |
| 12 | 5-SO$_2$CH$_3$ | H | C$_6$H$_{10}$-4-CH$_3$ | 4GL/30PO/10EO-H |
| 13 | 5-CF$_3$ | H | C$_6$H$_4$-4-OCH$_3$ | 3GL/40PO/10EO-H |
| 14 | 5-CO$_2$CH$_3$ | 3-CH$_3$ | C$_6$H$_4$-3-Cl | 4GL/8PO/8EO-H |
| 15 | 5-COCH$_3$ | 3-CH$_3$ | C$_6$H$_4$-3-CO$_2$C$_2$H$_5$ | 6GL/5PO/10EO-H |
| 16 | 5-CONH$_2$ | 3-CH$_3$ | C$_6$H$_4$-4-CN | 6GL/15PO/5EO-H |
| 17 | 4,5-di-Cl | H | C$_2$H$_4$C$_6$H$_5$ | 4GL/40PO/40EO-H |
| 18 | 5-SO$_2$C$_6$H$_5$ | H | C$_2$H$_4$OC$_6$H$_5$ | 3GL/50PO/60EO-H |
| 19 | 5-SO$_2$NHC$_2$H$_5$ | H | C$_2$H$_4$SC$_6$H$_5$ | 2.5GL/10PO/10EO-H |
| 20 | 5-Cl | H | C$_2$H$_4$OC$_2$H$_5$ | 3GL/15BO/10EO-H |

TABLE 16

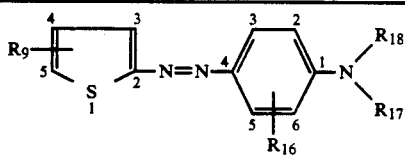

| Entry | R9 | R16 | R17 | R18 |
|---|---|---|---|---|
| 1 | 3-CO$_2$CH$_3$,5-COCH$_3$ | H | C$_2$H$_5$ | 2GL/10PO/10EO-H |
| 2 | 3,5-di-CO$_2$CH$_3$,4-CH$_3$ | H | C$_6$H$_{11}$ | 4GL/10PO/10EO-H |
| 3 | 3,5-di-CN,4-CH$_3$ | 3-CH$_3$ | CH$_2$CH=CH$_2$ | 3GL/10PO/10EO-H |
| 4 | 3-CO$_2$CH$_3$,5-COC$_6$H$_5$ | 3-CH$_3$ | 5GL/5PO/5EO-H | 5GL/5PO/5EO-H |
| 5 | 3-CN,5-CHO | 3-CH$_3$ | CH$_2$C$_6$H$_5$ | 3GL/15BO/6EO-H |

TABLE 16-continued

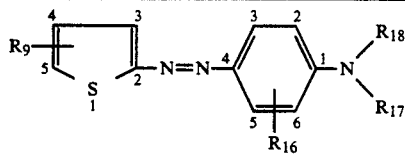

| Entry | R9 | R16 | R17 | R18 |
|---|---|---|---|---|
| 6 | 3-CN,5-N=N—C6H5 | 2-CH3 | CH3 | 4GL/20PO/10EO-H |
| 7 | 3-CONHC2H4OH,5-COCH3 | 2-OCH3 | C2H4C6H5 | 2GL/20BO/10EO-H |
| 8 | 3,5-di-SO2CH3 | 2-OCH3,5-CH3 | 2GL/10PO/5EO-H | 2GL/10PO/5EO-H |
| 9 | 3-CN,4-CH3,5-CO2C2H5 | 3-OCH3 | 3GL/20PO/5EO-H | 3GL/20PO/5EO-H |
| 10 | 3-CO2C2H5,4-CH3,5-CN | 3-CF3 | 2GL/10BO/5EO-H | 2GL/10BO/5EO-H |
| 11 | 3-CO2CH3,4-C6H5,5-CONH2 | H | 2GL/5BO/2EO-H | 2GL/5BO/2EO-H |
| 12 | 3-SO2C6H5,5-CH3 | H | C6H10-4-CH3 | 4GL/30PO/10EO-H |
| 13 | 3-CO2C4H9-n,5-SCN | H | C6H4-4-OCH3 | 3GL/40PO/10EO-H |
| 14 | 3-CO2C2H5,5-SO2CH3 | 3-CH3 | C6H4-3-Cl | 4GL/8PO/8EO-H |
| 15 | 3-CO2CH3,5-SCH3 | 3-CH3 | C6H4-3-CO2C2H5 | 6GL/5PO/10EO-H |
| 16 | 3-CN,5-NO2 | 3-CH3 | C6H4-4-CN | 6GL/15PO/5EO-H |
| 17 | 3-NO2,5-CN | H | C2H4C6H5 | 4GL/40PO/40EO-H |
| 18 | 3,5-di-NO2 | H | C2H4OC6H5 | 3GL/50PO/60EO-H |
| 19 | 3-NO2,5-COCH3 | H | C2H4SC6H5 | 2.5GL/10PO/10EO-H |
| 20 | 3-CO2CH3,5-CONH(CH3)2 | H | C2H4OC2H5 | 3GL/15PO/10EO-H |
| 21 | 3-CO2C2H5,5-Br | H | C2H4SC2H5 | 3GL/10PO/15EO-H |
| 22 | 3-CO2CH3,COCH=CHC6H5 | H | C3H6SO2CH3 | 3GL/25PO/25EO-H |

TABLE 17

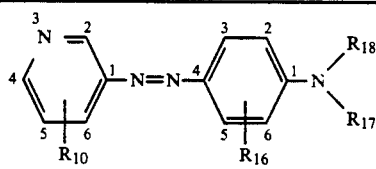

| Entry | R10 | R16 | R17 | R18 |
|---|---|---|---|---|
| 1 | H | H | C2H5 | 2GL/10PO/10EO-H |
| 2 | 2-Cl | H | C6H11 | 4GL/10PO/10EO-H |
| 3 | 2-CN | 3-CH3 | CH2CH=CH2 | 3GL/10PO/10EO-H |
| 4 | 2,4-di-Br | 3-CH3 | 5GL/5PO/5EO-H | 5GL/5PO/5EO-H |
| 5 | 2,4-di-CN | 3-CH3 | CH2C6H5 | 3GL/15BO/6EO-H |
| 6 | 2,4-di-SO2CH3 | 2-CH3 | CH3 | 4GL/20PO/10EO-H |
| 7 | 2,4-di-SO2C6H5 | 2-OCH3 | C2H4C6H5 | 2GL/20BO/10EO-H |
| 8 | 2-S-CH3 | 2-OCH3,5-CH3 | 2GL/10PO/5EO-H | 2GL/10PO/5EO-H |
| 9 | 2-CO2CH3,4-OC2H5 | 3-OCH3 | 3GL/20PO/5EO-H | 3GL/20PO/5EO-H |
| 10 | 2-SO2C6H3(3,4-di-Cl) | 3-CF3 | 2GL/10BO/5EO-H | 2GL/10BO/5EO-H |
| 11 | 2-CH3,6-NO2 | 3-Cl | 2GL/5BO/2EO-H | 2GL/5BO/2EO-H |
| 12 | 2-SC4H9-n | H | C6H10-4-CH3 | 4GL/30PO/10EO-H |
| 13 | 2-CON(C2H5)2,4,6-di-CN | H | C6H4-4-OCH3 | 3GL/40PO/10EO-H |
| 14 | 2-SO2NH2,4,6-di-SO2CH3 | H | C6H4-3-Cl | 4GL/8PO/8EO-H |
| 15 | S-benzothiazol-2-yl | 3-CH3 | C6H4-3-CO2C2H5 | 6GL/5PO/10EO-H |
| 16 | S-benzoxazol-2-yl | 3-CH3 | C6H4-4-CN | 6GL/15PO/5EO-H |
| 17 | S-triazol-3-yl | H | C2H4C6H5 | 4GL/40PO/40EO-H |
| 18 | 2-C6H5,6-SC6H5 | H | C2H4OC6H5 | 3GL/50PO/60EO-H |
| 19 | 2-CHO,5-CN,6-CO2CH3 | H | C2H4SC6H5 | 2.5GL/10PO/10EO-H |
| 20 | 2-SC2H4OH | H | C2H4OC2H5 | 3GL/15BO/10EO-H |
| 21 | 2-SO2C2H4OH | H | C2H4SC2H5 | 3GL/10PO/15EO-H |
| 22 | 2-SO2CH3 | H | C3H6SO2CH3 | 3GL/25PO/25EO-H |
| 23 | 5-NO2 | H | C2H4OC2H4OC2H5 | 6GL/25PO/35EO-H |
| 24 | 6-Cl,5-NO2 | H | C2H4CN | 6GL/10PO/10EO-H |
| 25 | 4-CHO | 2,5-di-CH3 | CH2C6H11 | 4GL/10PO/10EO-H |

TABLE 18

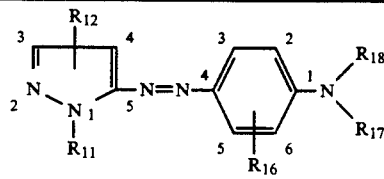

| Entry | R11 | R12 | R16 | R17 | R18 |
|---|---|---|---|---|---|
| 1 | H | 4-CN | H | CH3 | 2GL/10PO/10EO-H |
| 2 | CH3 | 4-CN | H | C6H11 | 4GL/10PO/10EO-H |

TABLE 18-continued

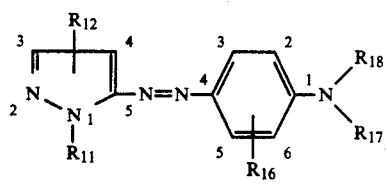

| Entry | $R_{11}$ | $R_{12}$ | $R_{16}$ | $R_{17}$ | $R_{18}$ |
|---|---|---|---|---|---|
| 3 | $C_6H_5$ | 4-CN | 3-$CH_3$ | $CH_2CH=CH_2$ | 3GL/10PO/10EO-H |
| 4 | $CH_3$ | 4-$CO_2C_2H_5$ | 3-$CH_3$ | 4GL/16PO/15EO-H | 4GL/16PO/15EO-H |
| 5 | $CH_3$ | 4-$CO_2CH_3$ | 2-$CH_3$ | $CH_2C_6H_5$ | 3GL/10PO/5EO-H |
| 6 | $SO_2CH_3$ | 4-CN | 2-$OCH_3$ | $CH_3$ | 4GL/20PO/10EO-H |
| 7 | $SO_2C_2H_5$ | 4-CN | 2-$OCH_3$,5-$CH_3$ | $C_2H_4C_6H_5$ | 4GL/14BO/10EO-H |
| 8 | $SO_2C_6H_5$ | 4-CN | 3-$OCH_3$ | 3GL/15PO/12EO-H | 3GL/15PO/12EO-H |
| 9 | $SO_2CH_3$ | 4-$SO_2CH_3$ | 3-$CF_3$ | 3GL/10PO/5EO-H | 3GL/10PO/5EO-H |
| 10 | $CH_3$ | 3-$CH_2CN$,4-CN | 3-Cl | 3GL/10PO/5EO-H | 3GL/10PO/5EO-H |
| 11 | $C_6H_4$-4-Cl | 4-$CONHC_2H_4OH$ | H | 3GL/20PO/5EO-H | 3GL/20PO/5EO-H |
| 12 | $C_6H_5$ | 4-$CONH_2$ | H | $C_6H_{10}$-4-$CH_3$ | 4GL/30PO/10EO-H |
| 13 | $CH_2C_6H_5$ | 3-S-$C_6H_5$,4-$CO_2CH_3$ | 3-$CH_3$ | $C_6H_4$-4-CN | 3GL/40PO/10EO-H |
| 14 | $CH_2C_6H_5$ | 3-S-$C_6H_5$,4-$CO_2C_2H_5$ | 3-$CH_3$ | $C_2H_4C_6H_5$ | 4GL/8PO/8EO-H |
| 15 | $CH_3$ | 3-$CH_3$,4-$CO_2C_2H_5$ | 3-$CH_3$ | 6GL/5PO/10EO-H | 6GL/5PO/10EO-H |
| 16 | $C_2H_5$ | 3-$CH_3$,4-$CO_2CH_3$ | H | 6GL/15PO/5EO-H | 6GL/15PO/5EO-H |
| 17 | $CH_3$ | 4-$CONH_2$ | H | 4GL/40PO/40EO-H | 4GL/40PO/40EO-H |
| 18 | $C_6H_5$ | 4-$CONH_2$ | H | 3GL/10PO/15EO-H | 3GL/10PO/15EO-H |
| 19 | $C_6H_5$ | 4-$CONHC_2H_4OH$ | 3-$CH_3$ | 5GL/10PO/5EO-H | 5GL/10PO/5EO-H |
| 20 | $CH_3$ | 4-$CON(C_2H_5)_2$ | 3-$CH_3$ | 4GL/15PO/4EO-H | 4GL/15PO/4EO-H |

TABLE 19

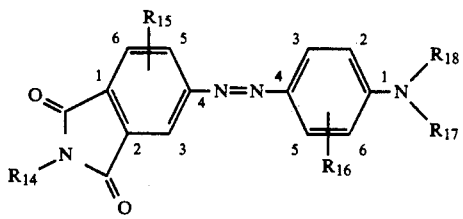

| Entry | $R_{14}$ | $R_{15}$ | $R_{16}$ | $R_{17}$ | $R_{18}$ |
|---|---|---|---|---|---|
| 1 | H | H | H | $CH_3$ | 2GL/10PO/10EO-H |
| 2 | $C_2H_5$ | H | H | $C_2H_5$ | 4GL/10PO/10EO-H |
| 3 | $C_6H_{11}$ | H | 3-$CH_3$ | 3GL/10PO/10EO-H | 3GL/10PO/10EO-H |
| 4 | $C_6H_5$ | H | 3-$CH_3$ | 4GL/16PO/15EO-H | 4GL/16PO/15EO-H |
| 5 | $C_4H_9$-n | 5-Br | 2-$CH_3$ | $CH_2C_6H_5$ | 3GL/10PO/5EO-H |
| 6 | $C_2H_4OH$ | 5-Cl | 2,5-di-Cl | 4GL/20PO/10EO-H | 4GL/20PO/10EO-H |
| 7 | $C_3H_6OCH_3$ | 3,5-di-Br | 2-$OCH_3$,5-$OCH_3$ | $C_2H_4C_6H_5$ | 4GL/14BO/10EO-H |
| 8 | $CH_2C_6H_5$ | 3,5-di-$SO_2C_6H_5$ | 3-$OCH_3$ | 3GL/15PO/12EO-H | 3GL/15PO/12EO-H |
| 9 | $CH_2C_6H_{11}$ | 5-$SO_2C_6H_5$ | 3-$CF_3$ | 3GL/10PO/5EO-H | 3GL/10PO/5EO-H |
| 10 | $C_2H_4CN$ | 3,5-di-$SO_2CH_3$ | 3-Cl | 3GL/10PO/5EO-H | 3GL/10PO/5EO-H |
| 11 | $C_2H_4C_6H_5$ | 3,5-di-CN | H | 3GL/20PO/5EO-H | 3GL/20PO/5EO-H |
| 12 | $C_2H_4Cl$ | 5-$NO_2$ | H | $C_6H_{10}$-4-$CH_3$ | 4GL/30PO/10EO-H |
| 13 | $C_2H_4OCOCH_3$ | 5-$OC_6H_5$ | 3-$CH_3$ | $C_2H_5$ | 3GL/40PO/10EO-H |
| 14 | 3GL/10PO/5EO-H | H | 3-$CH_3$ | $C_2H_4OH$ | $C_2H_4OH$ |
| 15 | $C_2H_4O$-4GL/10PO/5EO-H | 2-Br | 3-$CH_3$ | $CH_3$ | $CH_3$ |
| 16 | $C_6H_4$-4-$CH_3$ | 5-$OCH_3$ | H | 6GL/15PO/5EO-H | 6GL/15PO/5EO-H |
| 17 | $C_2H_5$ | 5-$SC_6H_5$ | H | 4GL/40PO/40EO-H | 4GL/40PO/40EO-H |
| 18 | n-$C_4H_9$ | 5-$SC_2H_5$ | H | 3GL/10PO/15EO-H | 3GL/10PO/15EO-H |
| 19 | $CH_3$ | 3-CN,5-$CH_3$ | 3-$CH_3$ | 5GL/10PO/5EO-H | 5GL/10PO/5EO-H |
| 20 | $C_2H_5$ | 3-Br,5-$CH_3$ | 3-$CH_3$ | 4GL/15PO/4EO-H | 4GL/15PO/4EO-H |

TABLE 20

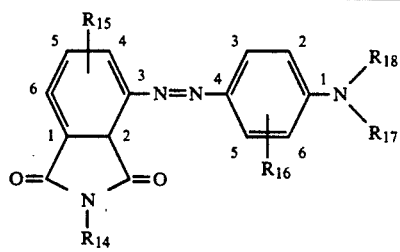

| Entry | R14 | R15 | R16 | R17 | R18 |
|---|---|---|---|---|---|
| 1 | H | H | H | CH3 | 2GL/10PO/10EO-H |
| 2 | C2H5 | H | H | C2H5 | 4GL/10PO/10EO-H |
| 3 | C6H11 | H | 3-CH3 | 3GL/10PO/10EO-H | 3GL/10PO/10EO-H |
| 4 | C6H5 | H | 3-CH3 | 4GL/16PO/15EO-H | 4GL/16PO/15EO-H |
| 5 | C4H9-N | 4,6-di-Br | 2-CH3 | CH2C6H5 | 3GL/10PO/5EO-H |
| 6 | C2H4OH | 4-CN,6-Br | 2,5-di-CH3 | 4GL/20PO/10EO-H | 4GL/20PO/10EO-H |
| 7 | C3H6OCH3 | 4-SO2CH3,6-Br | H | C2H4C6H5 | 4GL/14BO/10EO-H |
| 8 | CH2C6H5 | 6-NO2 | 3-OCH3 | 3GL/15PO/12EO-H | 3GL/15PO/12EO-H |
| 9 | CH2C6H11 | 4-Br,6-NO2 | 3-CF3 | 3GL/10PO/5EO-H | 3GL/10PO/5EO-H |
| 10 | C2H4CN | H | 3-Cl | 3GL/10PO/5EO-H | 3GL/10PO/5EO-H |
| 11 | C2H4C6H5 | H | H | 3GL/20PO/5EO-H | 3GL/20PO/5EO-H |
| 12 | C2H4Cl | H | H | C6H10-4CH3 | 4GL/30PO/10EO-H |
| 13 | C2H4OCOCH3 | 4,6-di-Br | 3-CH3 | C2H5 | 3GL/40PO/10EO-H |
| 14 | 3GL/15PO/10EO-H | 4,6-di-Cl | 3-CH3 | C2H4OH | C2H4OH |
| 15 | C2H4O-5GL/20PO/5EO-H | H | 3-CH3 | CH3 | CH3 |
| 16 | C6H4-4-CH3 | H | H | 6GL/15PO/5EO-H | 6GL/15PO/5EO-H |
| 17 | C2H5 | H | H | 4GL/40PO/40EO-H | 4GL/40PO/40EO-H |
| 18 | n-C4H9 | H | H | 3GL/10PO/15EO-H | 3GL/10PO/15EO-H |
| 19 | CH3 | H | 3-CH3 | 5GL/10PO/5EO-H | 5GL/10PO/5EO-H |
| 20 | C2H5 | H | 3-CH3 | 4GL/15PO/4EO-H | 4GL/15PO/4EO-H |

TABLE 21

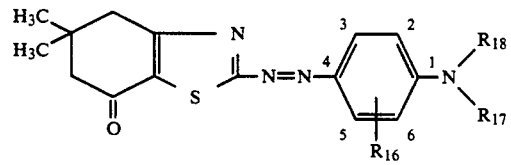

| Entry | R16 | R17 | R18 |
|---|---|---|---|
| 1 | H | C2H5 | 2GL/10PO/10EO-H |
| 2 | H | C6H11 | 4GL/10PO/10EO-H |
| 3 | 3-CH3 | CH2CH=CH2 | 3GL/10PO/10EO-H |
| 4 | 3-CH3 | 5GL/5PO/5EO-H | 5GL/5PO/5EO-H |
| 5 | 3-CH3 | CH2C6H5 | 3GL/15BO/6EO-H |
| 6 | 2-CH3 | CH3 | 4GL/20PO/10EO-H |
| 7 | 2-OCH3 | C2H4C6H5 | 2GL/20BO/10EO-H |
| 8 | 2-OCH3,5-CH3 | 2GL/10PO/5EO-H | 2GL/10PO/5EO-H |
| 9 | 3-OCH3 | 3GL/20PO/5EO-H | 3GL/20PO/5EO-H |
| 10 | 3-CF3 | 2GL/10BO/5EO-H | 2GL/10BO/5EO-H |
| 11 | 3-Cl | 2GL/5BO/2EO-H | 2GL/5BO/2EO-H |
| 12 | H | C6H10-4-CH3 | 4GL/30PO/10EO-H |
| 13 | H | C6H4-4-OCH3 | 3GL/40PO/10EO-H |
| 14 | 3-CH3 | C6H4-3-Cl | 4GL/8PO/8EO-H |
| 15 | 3-CH3 | C6H4-3-CO2C2H5 | 6GL/5PO/10EO-H |
| 16 | 3-CH3 | C6H4-4-CN | 6GL/15PO/5EO-H |
| 17 | H | C2H4C6H5 | 4GL/40PO/40EO-H |
| 18 | H | C2H4OC6H5 | 3GL/50PO/60EO-H |
| 19 | H | C2H4SC6H5 | 2.5GL/10PO/10EO-H |
| 20 | H | C2H4OC2H5 | 3GL/15BO/10EO-H |

TABLE 22

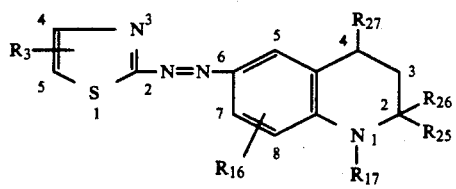

| Entry | R₃ | R₁₆ | R₂₅ | R₂₆ | R₂₇ | R₁₇ |
|---|---|---|---|---|---|---|
| 1 | 4-CH₃ | H | H | H | H | 2GL/10PO/10EO-H |
| 2 | 4-C₆H₅ | H | CH₃ | H | H | 4GL/10PO/10EO-H |
| 3 | 4-N=N—C₆H₅ | H | C₂H₅ | H | H | 3GL/10PO/10EO-H |
| 4 | 4-CH₃,5-CO₂C₂H₅ | H | CH₃ | H | H | 5GL/5PO/5EO-H |
| 5 | 5-CN | H | CH₃ | CH₃ | CH₃ | 3GL/15BO/6EO-H |
| 6 | 5-CHO | 7-CH₃ | CH₃ | H | H | 4GL/20PO/10EO-H |
| 7 | 5-SO₂CH₃ | 7-CH₃ | CH₃ | H | H | 2GL/20BO/10EO-H |
| 8 | 5-NO₂ | 7-CH₃ | CH₃ | CH₃ | CH₃ | 2GL/10PO/5EO-H |
| 9 | 4-SO₂CH₃,5-NO₂ | 5-CH₃,8-OCH₃ | CH₃ | H | H | 3GL/20PO/5EO-H |
| 10 | 5-COCH₃ | 5-CH₃,8-OCH₃ | CH₃ | CH₃ | CH₃ | 2GL/10BO/5EO-H |
| 11 | 5-COC₆H₅ | 8-OCH₃ | CH₃ | H | H | 2GL/5BO/2EO-H |
| 12 | 5-Cl | 8-OCH₃ | CH₃ | CH₃ | CH₃ | 4GL/30PO/10EO-H |
| 13 | 5-Br | 5,8-di-OCH₃ | CH₃ | H | H | 3GL/40PO/10EO-H |
| 14 | 4-CF₃ | 5,8-di-OCH₃ | CH₃ | H | H | 4GL/8PO/8EO-H |
| 15 | 5-SO₂N(C₂H₃)₂ | 7-Cl | CH₃ | H | H | 6GL/5PO/10EO-H |
| 16 | 5-SCN | 7-OCH₃ | CH₃ | H | H | 6GL/15PO/5EO-H |
| 17 | 5-CON(CH₃)₂ | 7-OC₂H₅ | CH₃ | H | H | 4GL/40PO/40EO-H |
| 18 | 5-CONH₂ | 7-CF₃ | CH₃ | H | H | 3GL/50PO/60EO-H |
| 19 | 5-CONHC₂H₄OH | 7-CH₃ | CH₃ | H | H | C₂H₄SO₂NHC₆H₄-O-3GL/10PO/5EO-H |
| 20 | 5-SO₂NHC₂H₄OH | 7-CH₃ | CH₃ | H | H | CH₂C₆H₄SO₂C₆H₄-O-4GL/15PO/4EO-H |

TABLE 23

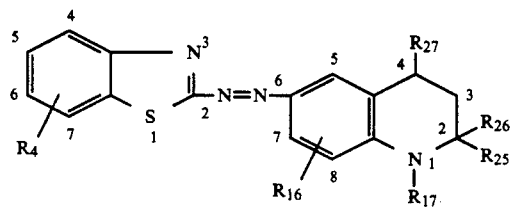

| Entry | R₄ | R₁₆ | R₂₅ | R₂₆ | R₂₇ | R₁₇ |
|---|---|---|---|---|---|---|
| 1 | H | H | H | H | H | 2GL/10PO/10EO-H |
| 2 | 4-Cl | H | CH₃ | H | H | 4GL/10PO/10EO-H |
| 3 | 5,6-di-Cl | H | C₂H₅ | H | H | 3GL/10PO/10EO-H |
| 4 | 6-CH₃ | H | CH₃ | H | H | 5GL/5PO/5EO-H |
| 5 | 6-OCH₃H | CH₃ | CH₃ | H | CH₃ | 3GL/15BO/6EO-H |
| 6 | 6-CN | 7-CH₃ | CH₃ | H | H | 4GL/20PO/10EO-H |
| 7 | 6-CO₂CH₃ | 7-CH₃ | CH₃ | H | H | 2GL/20BO/10EO-H |
| 8 | 6-SO₂CH₃ | 7-CH₃ | CH₃ | CH₃ | CH₃ | 2GL/10PO/5EO-H |
| 9 | 4-CF₃ | 5-CH₃,8-OCH₃ | CH₃ | H | H | 3GL/20PO/5EO-H |
| 10 | 6-SO₂C₆H₅ | 5-CH₃,8-OCH₃ | CH₃ | CH₃ | CH₃ | 2GL/10BO/5EO-H |
| 11 | 6-COC₆H₅ | 8-OCH₃ | CH₃ | H | H | 2GL/5BO/2EO-H |
| 12 | 6-COCH₃ | 8-OCH₃ | CH₃ | CH₃ | CH₃ | 4GL/30PO/10EO-H |
| 13 | 6-CON(CH₃)₂ | 5,8-di-OCH₃ | CH₃ | H | H | 3GL/40PO/10EO-H |
| 14 | 6-SO₂N(C₂H₅)₂ | 5,8-di-OCH₃ | CH₃ | H | H | 4GL/8PO/8EO-H |
| 15 | 6-SCN | 7-Cl | CH₃ | H | H | 6GL/5PO/10EO-H |
| 16 | 6-SCH₃ | 7-OCH₃ | CH₃ | H | H | 6GL/15PO/5EO-H |
| 17 | 6-SC₂H₄CN | 7-OC₂H₅ | CH₃ | H | H | 4GL/40PO/40EO-H |
| 18 | 6-SO₂C₂H₄CN | 7-CF₃ | CH₃ | H | H | 3GL/50PO/60EO-H |
| 19 | 6-NHCOCH₃ | 7-CH₃ | CH₃ | H | H | C₂H₄SO₂NHC₆H₄-O-3GL/10PO/5EO-H |
| 20 | 6-N=N—C₆H₅ | 7-CH₃ | CH₃ | H | H | CH₂C₆H₄SO₂C₆H₄-O-4GL/15PO/4EO-H |

TABLE 24

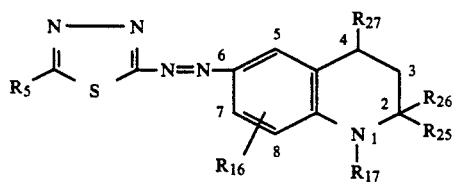

| Entry | R5 | R16 | R25 | R26 | R27 | R17 |
|---|---|---|---|---|---|---|
| 1 | H | H | H | H | H | 2GL/10PO/10EO-H |
| 2 | CH3 | H | CH3 | H | H | 4GL/10PO/10EO-H |
| 3 | C6H5 | H | C2H5 | H | H | 3GL/10PO/10EO-H |
| 4 | C2H5 | H | CH3 | H | H | 5GL/5PO/5EO-H |
| 5 | NCCH2S | CH3 | CH3 | H | CH3 | 3GL/15BO/6EO-H |
| 6 | C2H5SO2 | 7-CH3 | CH3 | H | H | 4GL/20PO/10EO-H |
| 7 | C6H5 | 7-CH3 | CH3 | H | H | 2GL/20BO/10EO-H |
| 8 | CH2=CHCH2S | 7-CH3 | CH3 | CH3 | CH3 | 2GL/10PO/5EO-H |
| 9 | C6H5O | 5-CH3,8-OCH3 | CH3 | H | H | 3GL/20PO/5EO-H |
| 10 | Cl | 5-CH3,8-OCH3 | CH3 | CH3 | CH3 | 2GL/10BO/5EO-H |
| 11 | NCS | 8-OCH3 | CH3 | H | H | 2GL/5BO/2EO-H |
| 12 | SO2N(C2H5)2 | 8-OCH3 | CH3 | CH3 | CH3 | 4GL/30PO/10EO-H |
| 13 | CH3CONH | 5,8-di-OCH3 | CH3 | H | H | 3GL/40PO/10EO-H |
| 14 | C6H11 | 5,8-di-OCH3 | CH3 | H | H | 4GL/8PO/8EO-H |
| 15 | C6H4-4-CO2CH3 | 7-Cl | CH3 | H | H | 6GL/5PO/10EO-H |
| 16 | SO2NH2 | 7-OCH3 | CH3 | H | H | 6GL/15PO/5EO-H |
| 17 | CO2C4H9-n | 7-OC2H5 | CH3 | H | H | 4GL/40PO/40EO-H |
| 18 | Br | 7-CF3 | CH3 | H | H | 3GL/50PO/60EO-H |
| 19 | S-3GL/15PO/10EO-H | 7-CH3 | CH3 | H | H | C2H4SO2NHC6H4-O-3GL/10PO/5EO-H |
| 20 | SC2H4-5GL/20BO/10EO-H | 7-CH3 | CH3 | H | H | CH2C6H4SO2C6H4-O-4GL/15PO/4EO-H |

TABLE 25

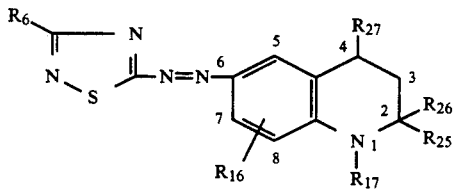

| Entry | R6 | R16 | R25 | R26 | R27 | R17 |
|---|---|---|---|---|---|---|
| 1 | H | H | H | H | H | 2GL/10PO/10EO-H |
| 2 | CH3 | H | CH3 | H | H | 4GL/10PO/10EO-H |
| 3 | C6H5 | H | C2H5 | H | H | 3GL/10PO/10EO-H |
| 4 | CH3S | H | CH3 | H | H | 5GL/5PO/5EO-H |
| 5 | Cl | CH3 | CH3 | H | CH3 | 3GL/15BO/6EO-H |
| 6 | C6H4-2-CN | 7-CH3 | CH3 | H | H | 4GL/20PO/10EO-H |
| 7 | C3H5SO2 | 7-CH3 | CH3 | H | H | 2GL/20BO/10EO-H |
| 8 | NC | 7-CH3 | CH3 | CH3 | CH3 | 2GL/10PO/5EO-H |
| 9 | CH3O2C2H4S | 5-CH3,8-OCH3 | CH3 | H | H | 3GL/20PO/5EO-H |
| 10 | C6H5CH2S | 5-CH3,8-OCH3 | CH3 | CH3 | CH3 | 2GL/10BO/5EO-H |
| 11 | C2H5SO2 | 8-OCH3 | CH3 | H | H | 2GL/5BO/2EO-H |
| 12 | H | 8-OCH3 | CH3 | CH3 | CH3 | 4GL/30PO/10EO-H |
| 13 | C2H5 | 5,8-di-OCH3 | CH3 | H | H | 3GL/40PO/10EO-H |
| 14 | C6H5CH2S | 5,8-di-OCH3 | CH3 | H | H | 4GL/8PO/8EO-H |
| 15 | C2H5S | 7-Cl | CH3 | H | H | 6GL/5PO/10EO-H |
| 16 | Br | 7-OCH3 | CH3 | H | H | 6GL/15PO/5EO-H |
| 17 | H | 7-OC2H5 | CH3 | H | H | 4GL/40PO/40EO-H |
| 18 | H | 7-CF3 | CH3 | H | H | 3GL/50PO/60EO-H |
| 19 | CH3 | 7-CH3 | CH3 | H | H | C2H4SO2NHC6H4-O-3GL/10PO/5EO-H |
| 20 | C6H5 | 7-CH3 | CH3 | H | H | CH2C6H4SO2C6H4-O-4GL/15PO/4EO-H |

TABLE 26

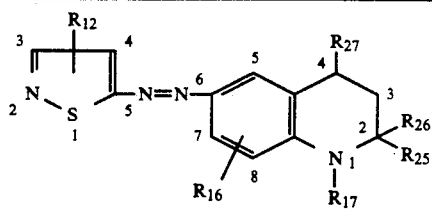

| Entry | R7 | R16 | R25 | R26 | R27 | R17 |
|---|---|---|---|---|---|---|
| 1 | H | H | H | H | H | 2GL/10PO/10EO-H |
| 2 | 3-CH3 | H | CH3 | H | H | 4GL/10PO/10EO-H |
| 3 | 3-C6H5 | H | C2H5 | H | H | 3GL/10PO/10EO-H |
| 4 | 3-CH3,4-Cl | H | CH3 | H | H | 5GL/5PO/5EO-H |
| 5 | 3-CH3,4-CN | CH3 | CH3 | H | CH3 | 3GL/15BO/6EO-H |
| 6 | 3-CH3,4-SO2CH3 | 7-CH3 | CH3 | H | H | 4GL/20PO/10EO-H |
| 7 | 3-CH3,4-SC2H5 | 7-CH3 | CH3 | H | H | 2GL/20BO/10EO-H |
| 8 | 3-CH3,4-SO2C6H5 | 7-CH3 | CH3 | CH3 | CH3 | 2GL/10PO/5EO-H |
| 9 | 3-CH3,4-Br | 5-CH3,8-OCH3 | CH3 | H | H | 3GL/20PO/5EO-H |
| 10 | 3-CH3,4-NO2 | 5-CH3,8-OCH3 | CH3 | CH3 | CH3 | 2GL/10BO/5EO-H |
| 11 | 3-CH3,4-CO2C2H5 | 8-OCH3 | CH3 | H | H | 2GL/5BO/2EO-H |
| 12 | 3-CH3,4-C2H4OH | 8-OCH3 | CH3 | CH3 | CH3 | 4GL/30PO/10EO-H |
| 13 | 3-CH3,4-SC6H5 | 5,8-di-OCH3 | CH3 | H | H | 3GL/40PO/10EO-H |
| 14 | 3-Cl,4-CN | 5,8-di-OCH3 | CH3 | H | H | 4GL/8PO/8EO-H |
| 15 | 3-CH3,4-CONHCH3 | 7-Cl | CH3 | H | H | 6GL/5PO/10EO-H |
| 16 | 3-CH3,4-OC6H5 | 7-OCH3 | CH3 | H | H | 6GL/15PO/5EO-H |
| 17 | 3-CH3,4-OCH3 | 7-OC2H5 | CH3 | H | H | 4GL/40PO/40EO-H |
| 18 | 3-C2H5 | 7-CF3 | CH3 | H | H | 3GL/50PO/60EO-H |
| 19 | 3-CH3,4-SCN | 7-CH3 | CH3 | H | H | C2H4SO2NHC6H4-O-3GL/10PO/5EO-H |
| 20 | 3-CH3,4-SCH3 | 7-CH3 | CH3 | H | H | CH2C6H4SO2C6H4-O-4GL/15PO/4EO-H |

TABLE 27

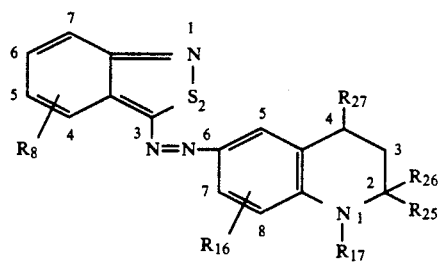

| Entry | R8 | R16 | R25 | R26 | R27 | R17 |
|---|---|---|---|---|---|---|
| 1 | H | H | H | H | H | 2GL/10PO/10EO-H |
| 2 | 5-Cl | H | CH3 | H | H | 4GL/10PO/10EO-H |
| 3 | 5-Br | H | C2H5 | H | H | 3GL/10PO/10EO-H |
| 4 | 5-CH3 | H | CH3 | H | H | 5GL/5PO/5EO-H |
| 5 | 5-CH3 | CH3 | CH3 | H | CH3 | 3GL/15BO/6EO-H |
| 6 | 6-Cl | 7-CH3 | CH3 | H | H | 4GL/20PO/10EO-H |
| 7 | 6-Cl | 7-CH3 | CH3 | H | H | 2GL/20BO/10EO-H |
| 8 | 5-NO2 | 7-CH3 | CH3 | CH3 | CH3 | 2GL/10PO/5EO-H |
| 9 | 5-OCH3 | 5-CH3,8-OCH3 | CH3 | H | H | 3GL/20PO/5EO-H |
| 10 | 5-SO2CH3 | 5-CH3,8-OCH3 | CH3 | CH3 | CH3 | 2GL/10BO/5EO-H |
| 11 | 5-Cl,7-SO2N(CH3)2 | 8-OCH3 | CH3 | H | H | 2GL/5BO/2EO-H |
| 12 | 5-Br,7-SO2NH2 | 8-OCH3 | CH3 | CH3 | CH3 | 4GL/30PO/10EO-H |
| 13 | 5-CF3 | 5,8-di-OCH3 | CH3 | H | H | 3GL/40PO/10EO-H |
| 14 | 5-CO2CH3 | 5,8-di-OCH3 | CH3 | H | H | 4GL/8PO/8EO-H |
| 15 | 5-COCH3 | 7-Cl | CH3 | H | H | 6GL/5PO/10EO-H |
| 16 | 5-CONH2 | 7-OCH3 | CH3 | H | H | 6GL/15PO/5EO-H |
| 17 | 4,5-di-Cl | 7-OC2H5 | CH3 | H | H | 4GL/40PO/40EO-H |
| 18 | 5-SO2C6H5 | 7-CF3 | CH3 | H | H | 3GL/50PO/60EO-H |
| 19 | 5-SO2NHC2H5 | 7-CH3 | CH3 | H | H | C2H4NHC6H4-O-3GL/10PO/5EO-H |
| 20 | 5-Cl | 7-CH3 | CH3 | H | H | CH2C6H4SO2C6H4-O-4GL/15PO/4EO-H |

TABLE 28

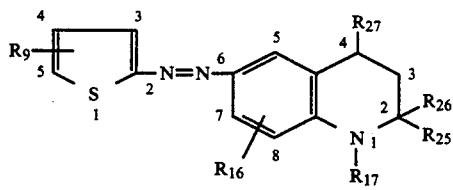

| Entry | R9 | R16 | R25 | R26 | R27 | R17 |
|---|---|---|---|---|---|---|
| 1 | 3-CO2CH3,5-COCH3 | H | H | H | H | 2GL/10PO/10EO-H |
| 2 | 3,5-di-CO2CH3,4-CH3 | H | CH3 | H | H | 4GL/10PO/10EO-H |
| 3 | 3,5-di-CN,4-CH3 | H | C2H5 | H | H | 3GL/10PO/10EO-H |
| 4 | 3-COCH3,5-COC6H5 | H | CH3 | H | H | 5GL/5PO/5EO-H |
| 5 | 3-CN,5-CHO | CH3 | CH3 | H | CH3 | 3GL/15BO/6EO-H |
| 6 | 3-CN,5-N=N—C6H5 | 7-CH3 | CH3 | H | H | 4GL/20PO/10EO-H |
| 7 | 3-CONHC2H4OH,5-COCH3 | 7-CH3 | CH3 | H | H | 2GL/20BO/10EO-H |
| 8 | 3,5-di-SO2CH3 | 7-CH3 | CH3 | CH3 | CH3 | 2GL/10PO/5EO-H |
| 9 | 3-SO2C6H5,5-CH3 | 5-CH3,8-OCH3 | CH3 | H | H | 3GL/20PO/5EO-H |
| 10 | 3-SO2CH3,5-SCN | 5-CH3,8-OCH3 | CH3 | CH3 | CH3 | 2GL/10BO/5EO-H |
| 11 | 3-CN,4-CH3,5-CO2C2H5 | 8-OCH3 | CH3 | H | H | 2GL/5BO/2EO-H |
| 12 | 3-CO2CH3,4-CH3,5-CN | 8-OCH3 | CH3 | CH3 | CH3 | 4GL/30PO/10EO-H |
| 13 | 3-CN,5-NO2 | 5,8-di-OCH3 | CH3 | H | H | 3GL/40PO/10EO-H |
| 14 | 3-NO2,5-CN | 5,8-di-OCH3 | CH3 | H | H | 4GL/8PO/8EO-H |
| 15 | 3-CO2CH3,4-C6H5,5-CONH2 | 7-Cl | CH3 | H | H | 6GL/5PO/10EO-H |
| 16 | 3-SO2C6H5,5-CH3 | 7-OCH3 | CH3 | H | H | 6GL/15PO/5EO-H |
| 17 | 3-CO2C2H5,5-SCN | 7-OC2H5 | CH3 | H | H | 4GL/40PO/40EO-H |
| 18 | 3-CO2C2H5,5-SO2CH3 | 7-CF3 | CH3 | H | H | 3GL/50PO/60EO-H |
| 19 | 3-CO2CH3,5-SCH3 | 7-CH3 | CH3 | H | H | C2H4SO2NHC6H4-O-3GL/10PO/5EO-H |
| 20 | 3,5-di-NO2 | 7-CH3 | CH3 | H | H | CH2C6H4SO2C6H4-O-4GL/15PO/4EO-H |

TABLE 29

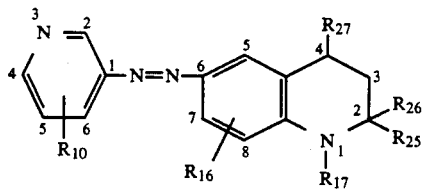

| Entry | R10 | R16 | R25 | R26 | R27 | R17 |
|---|---|---|---|---|---|---|
| 1 | H | H | H | H | H | 2GL/10PO/10EO-H |
| 2 | 2-Cl | H | CH3 | H | H | 4GL/10PO/10EO-H |
| 3 | 2-CN | H | C2H5 | H | H | 3GL/10PO/10EO-H |
| 4 | 2,4-di-Br | H | CH3 | H | H | 5GL/5PO/5EO-H |
| 5 | 2,4-di-CN | CH3 | CH3 | H | CH3 | 3GL/15BO/6EO-H |
| 6 | 2,4-di-SO2CH3 | 7-CH3 | CH3 | H | H | 4GL/20PO/10EO-H |
| 7 | 2,4-di-SO2C6H5 | 7-CH3 | CH3 | H | H | 2GL/20BO/10EO-H |
| 8 | 2-S-CH3 | 7-CH3 | CH3 | CH3 | CH3 | 2GL/10PO/5EO-H |
| 9 | 2-CO2CH3,4-OC2H5 | 5-CH3,8-OCH3 | CH3 | H | H | 3GL/20PO/5EO-H |
| 10 | 2-CH3,6-NO2 | 5-CH3,8-OCH3 | CH3 | CH3 | CH3 | 2GL/10BO/5EO-H |
| 11 | 2-SO2C6H3(3,4-di-Cl) | 8-OCH3 | CH3 | H | H | 2GL/5BO/2EO-H |
| 12 | 2-SC4H9-n | 8-OCH3 | CH3 | CH3 | CH3 | 4GL/30PO/10EO-H |
| 13 | S-benzothiazol-2-yl | 5,8-di-OCH3 | CH3 | H | H | 3GL/40PO/10EO-H |
| 14 | S-benzoxazol-2-yl | 5,8-di-OCH3 | CH3 | H | H | 4GL/8PO/8EO-H |
| 15 | S-triazol-3-yl | 7-Cl | CH3 | H | H | 6GL/5PO/10EO-H |
| 16 | 2-CON(CH3)2,4,6-di-CN | 7-CH3 | CH3 | H | H | 6GL/15PO/5EO-H |
| 17 | 2-SO2NH2,2,4-di-SO2CH3 | 7-CH3 | CH3 | H | H | 4GL/40PO/40EO-H |
| 18 | 2-C6H5,6-SC6H5 | 7-CF3 | CH3 | H | H | 3GL/50PO/60EO-H |
| 19 | 2-CHO,5-CN,6-CO2CH3 | 7-CH3 | CH3 | H | H | C2H4SO2NHC6H4-O-3GL/10PO/5EO-H |
| 20 | 2-SC2H4OH | 7-CH3 | CH3 | H | H | CH2C6H4SO2C6H4-O-4GL/15PO/4EO-H |

TABLE 30

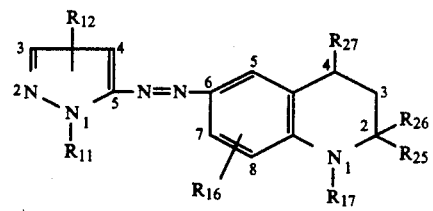

| Entry | R₁₁ | R₁₂ | R₁₆ | R₂₅ | R₂₆ | R₂₇ | R₁₇ |
|---|---|---|---|---|---|---|---|
| 1 | H | 4-CN | H | H | H | H | 2GL/10PO/10EO-H |
| 2 | CH₃ | 4-CN | H | C₂H₅ | H | H | 4GL/10PO/10EO-H |
| 3 | C₆H₅ | 4-CN | 7-CH₃ | CH₃ | H | H | 3GL/10PO/10EO-H |
| 4 | CH₃ | 4-CO₂C₂H₅ | 7-CH₃ | CH₃ | H | H | 5GL/5PO/5EO-H |
| 5 | CH₃ | 4-CO₂CH₃ | 7-CH₃ | CH₃ | H | CH₃ | 3GL/15BO/6EO-H |
| 6 | SO₂CH₃ | 4-CN | 7-CH₃ | CH₃ | H | H | 4GL/20PO/10EO-H |
| 7 | SO₂C₂H₅ | 4-CN | 7-CH₃ | CH₃ | H | H | 2GL/20BO/10EO-H |
| 8 | SO₂C₆H₅ | 4-CN | 7-CH₃ | CH₃ | CH₃ | H | 2GL/10PO/5EO-H |
| 9 | SO₂CH₃ | 4-SO₂CH₃ | 5-CH₃,8-OCH₃ | CH₃ | H | H | 3GL/20PO/5EO-H |
| 10 | CH₃ | 3-CH₂CN,4-CN | 5-CH₃,8-OCH₃ | CH₃ | CH₃ | H | 2GL/10BO/5EO-H |
| 11 | C₆H₄-4-Cl | 4-CONHC₂H₄OH | 8-OCH₃ | CH₃ | H | H | 2GL/5BO/2EO-H |
| 12 | C₆H₅ | 4-CONH₂ | 8-OCH₃ | CH₃ | CH₃ | H | 4GL/30PO/10EO-H |
| 13 | CH₂C₆H₅ | 3-S-C₆H₅,4-CO₂CH₃ | 5,8-di-OCH₃ | CH₃ | H | H | 3GL/40PO/10EO-H |
| 14 | CH₂C₆H₅ | 4-CONH₂ | 5,8-di-OCH₃ | CH₃ | H | H | 4GL/8PO/8EO-H |
| 15 | CH₃ | 3-S-C₆H₅,4-CO₂C₂H₅ | 7-Cl | CH₃ | H | H | 6GL/5PO/10EO-H |
| 16 | C₂H₅ | 3-S-CH₃,4-CO₂CH₃ | 7-OCH₃ | CH₃ | H | H | 6GL/15PO/5EO-H |
| 17 | CH₃ | 4-CONH₂ | 7-OC₂H₅ | CH₃ | H | H | 4GL/40PO/40EO-H |
| 18 | C₆H₅ | 4-CONH₂ | 7-CF₃ | CH₃ | H | H | 3GL/50PO/60EO-H |
| 19 | C₆H₅ | 4-CONHC₂H₄OH | 7-CH₃ | CH₃ | H | H | C₂H₄SO₂NHC₆H₄-O-3GL/10PO/5EO-H |
| 20 | C₆H₅ | 4-CON(C₂H₅)₂ | 7-CH₃ | CH₃ | H | H | CH₂C₆H₄SO₂C₆H₄-O-4GL/15PO/4EO-H |

TABLE 31

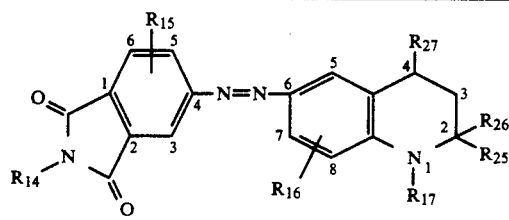

| Entry | R₁₄ | R₁₅ | R₁₆ | R₂₅ | R₂₆ | R₂₇ | R₁₇ |
|---|---|---|---|---|---|---|---|
| 1 | H | H | H | H | H | H | 2GL/10PO/10EO-H |
| 2 | C₂H₅ | H | H | C₂H₅ | H | H | 4GL/10PO/10EO-H |
| 3 | C₆H₁₁ | H | 7-CH₃ | CH₃ | H | H | 3GL/10PO/10EO-H |
| 4 | C₆H₅ | H | 7-CH₃ | CH₃ | H | H | 5GL/5PO/5EO-H |
| 5 | C₄H₉-n | 5-Br | 7-CH₃ | CH₃ | H | CH₃ | 3GL/15BO/6EO-H |
| 6 | C₂H₄OH | 5-Cl | 7-CH₃ | CH₃ | H | H | 4GL/20PO/10EO-H |
| 7 | C₃H₆OCH₃ | 3,5-di-Br | 7-CH₃ | CH₃ | H | H | 2GL/20BO/10EO-H |
| 8 | CH₂C₆H₅ | 3,5-diSO₂CH₃ | 7-CH₃ | CH₃ | CH₃ | H | 2GL/10PO/5EO-H |
| 9 | CH₂C₆H₁₁ | 5-SO₂C₂H₅ | 5-CH₃,8-OCH₃ | CH₃ | H | H | 3GL/20PO/5EO-H |
| 10 | C₂H₄C₆H₅ | 3,5-di-CN | 5-CH₃,8-OCH₃ | CH₃ | CH₃ | H | 2GL/10BO/5EO-H |
| 11 | C₂H₄CN | 5-NO₂ | 8-OCH₃ | CH₃ | H | H | 2GL/5BO/2EO-H |
| 12 | C₂H₄Cl | 5-OC₆H₅ | 8-OCH₃ | CH₃ | CH₃ | H | 4GL/30PO/10EO-H |
| 13 | C₂H₄OCOCH₃ | 3,5-di-CN | 5,8-di-OCH₃ | CH₃ | H | H | 3GL/40PO/10EO-H |
| 14 | 3GL/10PO/10EO-H | H | 5,8-di-OCH₃ | CH₃ | H | H | 4GL/8PO/8EO-H |
| 15 | C₂H₄O-4GL/10PO/5EO-H | 2-Br | 7-Cl | CH₃ | H | H | 6GL/5PO/10EO-H |
| 16 | C₆H₄-4-CH₃ | 5-OCH₃ | 7-OCH₃ | CH₃ | H | H | 6GL/15PO/5EO-H |
| 17 | C₂H₅ | 5-SC₂H₅ | 7-OC₂H₅ | CH₃ | H | H | 4GL/40PO/40EO-H |
| 18 | n-C₄H₉ | 5-SCH₃ | 7-CF₃ | CH₃ | H | H | 3GL/50PO/60EO-H |
| 19 | CH₃ | 3-CN,5-CH₃ | 7-CH₃ | CH₃ | H | H | C₂H₄SO₂NHC₆H₄-O-3GL/10PO/5EO-H |
| 20 | C₂H₅ | 3-Br,5-CH₃ | 7-CH₃ | CH₃ | H | H | CH₂C₆H₄SO₂C₆H₄-O-4GL/15PO/4EO-H |

TABLE 32

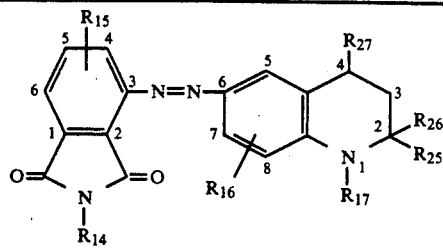

| Entry | R14 | R15 | R16 | R25 | R26 | R27 | R17 |
|---|---|---|---|---|---|---|---|
| 1 | H | H | H | H | H | H | 2GL/10PO/10EO-H |
| 2 | $C_2H_5$ | H | H | $C_2H_5$ | H | H | 4GL/10PO/10EO-H |
| 3 | $C_6H_{11}$ | H | 7-$CH_3$ | $CH_3$ | H | H | 3GL/10PO/10EO-H |
| 4 | $C_6H_5$ | H | 7-$CH_3$ | $CH_3$ | H | H | 5GL/5PO/5EO-H |
| 5 | $C_4H_9$-n | 4,6-di-Br | 7-$CH_3$ | $CH_3$ | H | $CH_3$ | 3GL/15BO/6EO-H |
| 6 | $C_2H_4OH$ | 4-CN,6-Br | 7-$CH_3$ | $CH_3$ | H | H | 4GL/20PO/10EO-H |
| 7 | $C_3H_6OCH_3$ | 4-$SO_2CH_3$,6-Br | 7-$CH_3$ | $CH_3$ | H | H | 2GL/20BO/10EO-H |
| 8 | $CH_2C_6H_5$ | 6-$NO_2$ | 7-$CH_3$ | $CH_3$ | $CH_3$ | H | 2GL/10PO/5EO-H |
| 9 | $CH_2C_6H_{11}$ | H | 7-$CH_3$ | $CH_3$ | $CH_3$ | H | 3GL/20PO/5EO-H |
| 10 | $C_2H_4C_6H_5$ | H | 5-$CH_3$,8-$OCH_3$ | $CH_3$ | $CH_3$ | H | 2GL/10BO/5EO-H |
| 11 | $C_2H_4CN$ | 4-Br,6-$NO_2$ | 8-$OCH_3$ | $CH_3$ | H | H | 2GL/5BO/2EO-H |
| 12 | $C_2H_4Cl$ | 4,6-di-Br | 8-$OCH_3$ | $CH_3$ | $CH_3$ | H | 4GL/30PO/10EO-H |
| 13 | $C_2H_4OCOCH_3$ | H | 5,8-di-$OCH_3$ | $CH_3$ | H | H | 3GL/40PO/10EO-H |
| 14 | 3GL/10PO/10EO-H | H | 5,8-di-$OCH_3$ | $CH_3$ | H | H | 4GL/8PO/8EO-H |
| 15 | $C_2H_4O$-4GL/10PO/5EO-H | H | 7-Cl | $CH_3$ | H | H | 6GL/5PO/10EO-H |
| 16 | $C_6H_4$-4-$CH_3$ | H | 7-$OCH_3$ | $CH_3$ | H | H | 6GL/15PO/5EO-H |
| 17 | $C_2H_5$ | H | 7-$OC_2H_5$ | $CH_3$ | H | H | 4GL/40PO/40EO-H |
| 18 | n-$C_4H_9$ | H | 7-$CF_3$ | $CH_3$ | H | H | 3GL/50PO/60EO-H |
| 19 | $CH_3$ | H | 7-$CH_3$ | $CH_3$ | H | H | $C_2H_4SO_2NHC_6H_4$-O-3GL/10PO/5EO-H |
| 20 | $C_2H_5$ | H | 7-$CH_3$ | $CH_3$ | H | H | $CH_2C_6H_4SO_2C_6H_4$-O-4GL/15PO/4EO-H |

TABLE 33

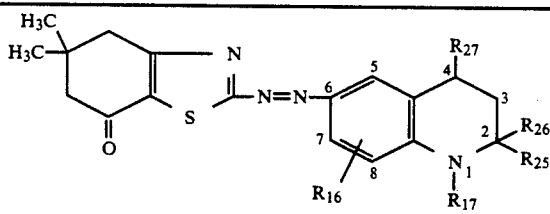

| Entry | R16 | R25 | R26 | R27 | R17 |
|---|---|---|---|---|---|
| 1 | H | H | H | H | 2GL/10PO/10EO-H |
| 2 | H | $CH_3$ | $CH_3$ | H | 4GL/10PO/10EO-H |
| 3 | H | $C_2H_5$ | H | H | 3GL/10PO/10EO-H |
| 4 | H | $CH_3$ | H | H | 5GL/5PO/5EO-H |
| 5 | H | $CH_3$ | $CH_3$ | $CH_3$ | 3GL/15BO/6EO-H |
| 6 | 7-$CH_3$ | $CH_3$ | H | H | 4GL/20PO/10EO-H |
| 7 | 7-$CH_3$ | $CH_3$ | H | H | 2GL/20BO/10EO-H |
| 8 | 7-$CH_3$ | $CH_3$ | $CH_3$ | $CH_3$ | 2GL/10PO/5EO-H |
| 9 | 5-$CH_3$,8-$OCH_3$ | $CH_3$ | H | H | 3GL/20PO/5EO-H |
| 10 | 5-$CH_3$,8-$OCH_3$ | $CH_3$ | $CH_3$ | $CH_3$ | 2GL/10BO/5EO-H |
| 11 | 8-$OCH_3$ | $CH_3$ | H | H | 2GL/5BO/2EO-H |
| 12 | 8-$OCH_3$ | $CH_3$ | $CH_3$ | $CH_3$ | 4GL/30PO/10EO-H |
| 13 | 5,8-di-$OCH_3$ | $CH_3$ | H | H | 3GL/40PO/10EO-H |
| 14 | 5,8-di-$OCH_3$ | $CH_3$ | H | H | 4GL/8PO/8EO-H |
| 15 | 7-Cl | $CH_3$ | H | H | 6GL/5PO/10EO-H |
| 16 | 7-$CH_3$ | 7-$OCH_3$ | $CH_3$ | H | 6GL/15BO/5EO-H |
| 17 | 7-$OC_2H_5$ | $CH_3$ | H | H | 4GL/40PO/40EO-H |
| 18 | 7-$CF_3$ | $CH_3$ | H | H | 3GL/50PO/60EO-H |
| 19 | 7-$CH_3$ | $CH_3$ | H | H | $C_2H_4SO_2NHC_6H_4$-O-3GL/10PO/5EO-H |
| 20 | 7-$CH_3$ | $CH_3$ | H | H | $CH_2C_6H_4SO_2C_6H_4$-O-4GL/15PO/4EO-H |

TABLE 34

![structure: Q-N=N-C6H3(R16)-N(R17)(R18)]

| Entry | Q | R16 | R17 | R18 |
|---|---|---|---|---|
| 1 | (4-methylphenyl)-N=N-phenyl | 3-CH₃ | CH₃ | 6GL/10PO/10EO-H |
| 2 | 3-bromo-5-methyl-isothiazole-N=N- (4-methylphenyl) | 3-CH₃ | 4-(O-2GL/5PO/5EO-H)phenyl | 2GL/5PO/5EO-H |
| 3 | 3-cyano-5-methyl-isothiazole-N=N-(4-methylphenyl) | 3-OC₂H₅ | CH(CH₃)C₂H₅ | 4GL/30PO/35EO-H |
| 4 | 3-(methylthio)-1,2,4-thiadiazole-N=N-(4-methylphenyl) | 3-C₂H₅ | 4-(CO₂C₂H₅)benzyl | 4GL/10PO/15EO-H |
| 5 | 3-(methylthio)-5-cyano-isothiazole-N=N-(4-methylphenyl) | H | 3-chlorobenzyl | 3GL/10BO/20EO-H |
| 6 | 2-acetyl-3-(methoxycarbonyl)-thiophene-N=N-(4-methylphenyl) | H | 4-chlorobenzyl | 6GL/20PO/20EO-H |

TABLE 34-continued $Q-N=N-\underset{R_{16}}{\underset{|}{\text{C}_6\text{H}_3}}-N(R_{17})(R_{18})$

| Entry | Q | $R_{16}$ | $R_{17}$ | $R_{18}$ |
|---|---|---|---|---|
| 7 | 4-(benzoyl)phenyl | 3-CH$_2$-O-3GL/10PO/11EO-H | C$_2$H$_5$ | C$_2$H$_5$ |
| 8 | 4-Cl-3-CH$_3$-(5-(CH$_3$)$_2$NSO$_2$)phenyl | 3-O-C$_2$H$_4$-O-3GL/15BO/18EO-H | C$_2$H$_5$ | C$_2$H$_5$ |
| 9 | 4-CH$_3$-3-(2-CH$_3$-phenylazo)phenyl with 3-CH$_3$ | 3-CH$_3$ | —C$_2$H$_4$—O—C(O)—C$_6$H$_5$ | —CH$_2$—C$_6$H$_5$ |
| 10 | 4-CH$_3$-3-OCH$_3$-(2-OCH$_3$-phenylazo)phenyl | 3-CH$_3$ | —CH$_2$CH(Cl)CH$_2$Cl | 5GL/30PO/70EO-H |
| 11 | 3-Br-4-CH$_3$-5-NO$_2$-phenyl | H | —CH$_2$CH$_2$-(N-succinimido) | 3GL/22PO/44EO-H |
|   |   |   |   | 3GL/20BO/30EO-H |

TABLE 34-continued
| Entry | Q | R16 | R17 | R18 |
|---|---|---|---|---|
| 12 | 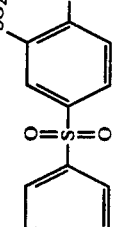 | H | 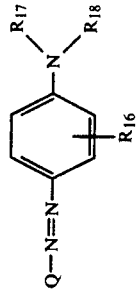 | 4GL/10PO/15EO-H |
| 13 | 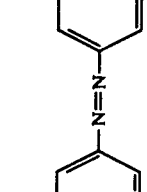 | H | 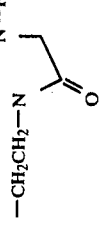 | 3GL/10BO/20EO-H |
| 14 | 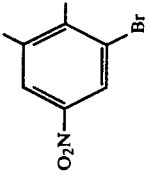 | H | 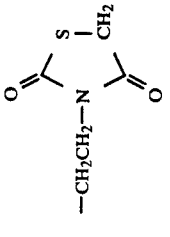 | 6GL/20PO/20EO-H |
| 15 | 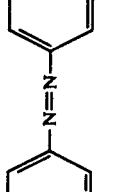 | 3-CH$_3$ | 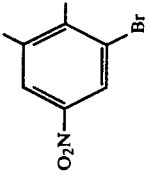 | 5GL/10PO/20EO-H |
| 16 |  | 3-CH$_3$ | 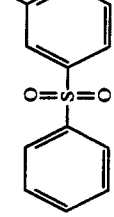 | 3GL/15PO/15EO-H |

TABLE 34-continued
| Entry | Q | $R_{16}$ | $R_{17}$ | $R_{18}$ |
|---|---|---|---|---|
| 17 |  | 3-$CH_3$ |  | 2.5GL/20PO/20EO-H |
| 18 |  | 3-$CH_3$ | 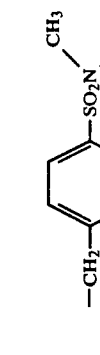 | 3GL/40PO/20EO-H |
| 19 |  | 3-$CH_3$ | —$C_2H_4$—N(COCH$_3$)SO$_2$CH$_3$ | 3GL/20PO/25EO-H |
| 20 | 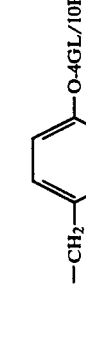 | H |  3GL/10PO/11EO-H | $C_2H_5$ |
| 21 |  | H |  O-4GL/10PO/11EO-H | $CH_3$ |

TABLE 34-continued

Q—N=N—⟨phenyl(R16)⟩—N(R17)(R18)

| Entry | Q | R16 | R17 | R18 |
|---|---|---|---|---|
| 22 | 4-methylphenyl-N=N-(2-chlorophenyl) | H | —CH$_2$C$_5$H$_4$SO$_2$NHC$_5$H$_4$-3(O-3GL/10PO/10EO-H) | C$_5$H$_{11}$ |
| 23 | 2,6-dicyano-4-cyano-3-methylphenyl | H | 4-(O-5GL/15PO/15EO-H)phenyl | CH$_3$ |
| 24 | 2,6-bis(SO$_2$CH$_3$)-4-(SO$_2$CH$_3$)-3-methylphenyl | H | 4-(O—C$_2$H$_4$—O-3GL/15PO/15EO-H)phenyl | CH$_3$ |
| 25 | 2,6-bis(CF$_3$)-4-nitro-3-methylphenyl | H | —C$_2$H$_4$—(4-(S-6GL/10PO/10EO-H)SO$_2$-phenyl) | CH$_3$ |
| 26 | 2-SO$_2$CH$_3$-6-CN-4-nitro-3-methylphenyl | H | —C$_2$H$_4$—N(SO$_2$CH$_3$)-3GL/10PO/15EO-H | CH$_3$ |

TABLE 34-continued

Structure: Q—N=N—[benzene with R16]—N(R17)(R18)

| Entry | Q | R16 | R17 | R18 |
|---|---|---|---|---|
| 27 | 3,5-bis(SO2CH3 / SO2N(C2H5)2)-4-O2N-phenyl... (SO2CH3, SO2N(C2H5)2, O2N substituents) | 3-CH3 | —C2H4SO2—N(CH3)-3GL/10PO/15EO-H | CH3 |
| 28 | 3-CN, 5-CF3, 4-O2N phenyl | H | —CH2CH2—S—C(=N-phenyl) (benzothiazole-type) | 4GL/15PO/20EO-H |
| 29 | 4-[H-15/EO/15PO/3GL-O]-phenyl-N=N-phenyl- | H | —CH2CH2—O-3GL/15PO/15EO-H | C2H5 |
| 30 | 4-[H-20/EO/15PO/3GL-O]-phenyl-SO2—NH-phenyl- | H | —CH2—C6H5 (benzyl) | —CH2CH2—OH |
| 31 | 4-[H-10/EO/10PO/4GL-S(O2)]-phenyl-SO2- | 3-Cl | —CH2—C6H5 (benzyl) | —CH2CH2—OH |
| 32 | 3-Br-4-(phenyl-C(=O)-)-phenyl | 3-CH3 | —C3H6SO2C2H4—S—CH3 | 4GL/15PO/20EO-H |

TABLE 34-continued

| Entry | Q | R16 | R17 | R18 |
|---|---|---|---|---|
| 33 | 3-OCH3, 4-CH3, 5-CF3, (O2N-) | H | —CH2CH2—S-(2-pyridyl) | 3GL/10PO/15EO-H |
| 34 | 3-SCH3, 4-CH3, 5-CN, (O2N-) | H | —CH2CH2SO2CH2CH2—S—C(=O)—N(H)—(2-phenyl-O) | 4GL/15PO/40EO-H |
| 35 | 3-CO2C2H5, 4-CH3, 5-NO2, (O2N-) | H | —CH2CH2—S-(2-(N—NH)-imidazoline) | 5GL/10BO/11EO-H |
| 36 | 3-SO2C6H5, 4-CH3, 5-CN, (O2N-) | H | —CH2CH2—S-(2-pyrimidyl) | 1GL/15PO/20EO-H |

TABLE 34-continued
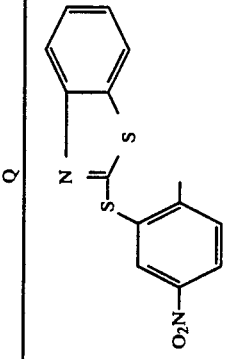
| Entry | Q | R16 | R17 | R18 |
|---|---|---|---|---|
| 37 |  | H |  | 8GL/10PO/12EO-H |
| 38 | 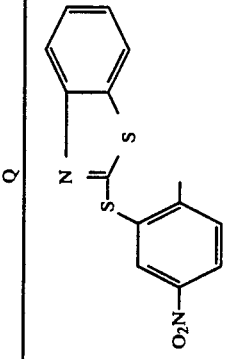 | H | —CH(CH$_3$)C$_4$H$_9$-n | 10GL/20PO/40EO-H |
| 39 | 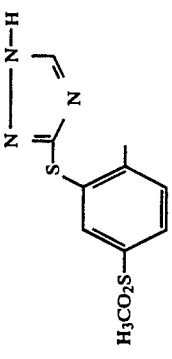 | H | —CH$_2$CH(CH$_3$)$_2$ | 4GL/10BO/12EO-H |

TABLE 35

Q—N=N—Ar—(Z)

| Entry | Q | Ar | Z |
|-------|---|----|----|
| 1 | (4-phenyl-thiazol-2-yl) | (6,7-dimethyl-3-methyl-2H-1,4-benzoxazin-4-yl with CH3) | 3GL/10PO/10EO-H |
| 2 | (4-methyl-5-methoxycarbonyl-thiazol-2-yl) | (4-phenyl-5-methyl-N-ethyl-N-methyl-thiazol-2-yl) | 4GL/10PO/15EO-H |
| 3 | (4-cyanomethyl-thiazol-2-yl) | (5,6-dimethyl-2-methyl-indolin-1-yl) | 3GL/12PO/15EO-H |
| 4 | (4-chloro-benzothiazol-2-yl) | (3-methyl-carbazol-9-yl) | 4GL/10PO/10EO-H |
| 5 | (5-methylsulfonyl-benzothiazol-2-yl) | (phenoxazin-10-yl, methyl) | 3GL/10PO/10EO-H |
| 6 | (5-cyano-benzothiazol-2-yl) | (phenothiazin-10-yl, methyl) | 3GL/10PO/10EO-H |
| 7 | (5-ethylthio-1,3,4-thiadiazol-2-yl) | (4-methyl-N-ethyl-N-methyl-naphthalen-1-yl) | 3GL/10PO/10EO-H |
| 8 | (5-ethylsulfonyl-1,3,4-thiadiazol-2-yl) | (4,5-dimethyl-N-(2-alkoxyethyl)-N-isopropyl-benzoxazin) | 5GL/10PO/10EO-H |
| 9 | (4-phenyl-1,2,3-thiadiazol-5-yl) | (5-methyl-2-methyl-1-(2-alkoxyethyl)-indolin) | 3GL/10PO/15EO-H |

TABLE 35-continued
Q—N=N—Ar—(Z)
| Entry | Q | Ar | Z |
|---|---|---|---|
| 10 | 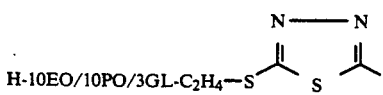 | 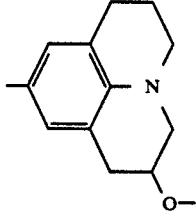 | 3GL/10PO/10EO-H |
| 11 | 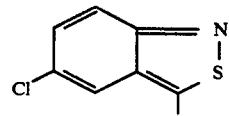 | 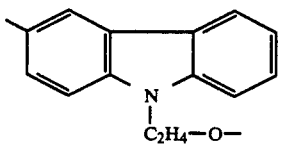 | 3GL/20PO/20EO-H |
| 12 | 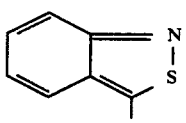 | 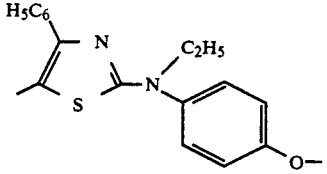 | 3GL/10PO/15EO-H |
| 13 | 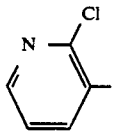 | 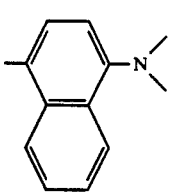 | (2GL/5PO/5EO-H)$_2$ |
| 14 | 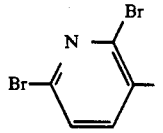 | 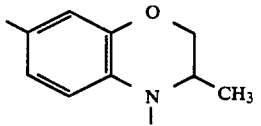 | 4GL/10PO/10EO-H |
| 15 | 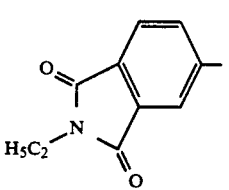 | 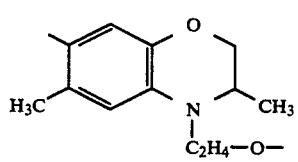 | 5GL/12PO/14EO-H |
| 16 | 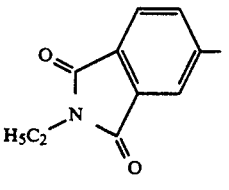 |  | 3GL/10PO/20EO-H |
| 17 | 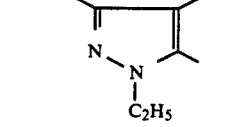 | 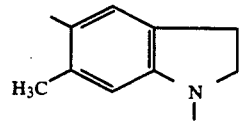 | 6GL/10PO/10EO-H |

TABLE 35-continued

Q—N=N—Ar—(Z)

| Entry | Q | Ar | Z |
|---|---|---|---|
| 18 | pyrazole with CN, CH3, N-C6H5 | 3-methylcarbazole-N-C2H4—O— | 7GL/10PO/12EO-H |
| 19 | N-ethyl phthalimide | 4,5-dimethyl-benzoxazine with CH3 | 3GL/20PO/20EO-H |
| 20 | 5,5-dimethyl-cyclohexenone-thiazoline | methyl-benzoxazine with CH3 | 3GL/10PO/20EO-H |
| 21 | 3-methyl-2,4-dicyanothiophene with CH3 | 4,5-dimethyl-benzoxazine with CH3 | 2GL/5PO/5EO-H |
| 22 | 3-methyl-5-methyl-isothiazole | 4,6,7-trimethyl-2,2-dimethyl-tetrahydroquinoline | 3GL/10BO/10EO-H |
| 23 | 3-methyl-4-chloro-5-methyl-isothiazole | 4,6-dimethyl-2,2-dimethyl-tetrahydroquinoline | 4GL/10PO/10EO-H |
| 24 | phenyl-azo-p-tolyl | 4,6,7-trimethyl-2,2-dimethyl-tetrahydroquinoline | 3GL/10PO/20EO-H |

TABLE 36

M=CH—⟨C₆H₃(R₁₆)⟩—N(R₁₇)(R₁₈)

| Entry | M | $R_{16}$ | $R_{17}$ | $R_{18}$ |
|---|---|---|---|---|
| 1 | (NC)(NC)C= | H | $C_2H_5$ | 3GL/10PO/10EO-H |
| 2 | (NC)($H_3CO_2C$)C= | H | $C_5H_{11}$ | 3GL/10PO/10EO-H |
| 3 | (NC)($H_3CO_2S$)C= | 3-$CH_3$ | $CH(CH_3)C_2H_5$ | 4GL/30PO/35EO-H |
| 4 | (NC)($H_2NOC$)C= | 3-$CH_3$ | $CH_2CH=CH_2$ | 4GL/10PO/15EP-H |
| 5 | (NC)($H_5C_6OC$)C= | 3-$CH_3$ | —$CH_2$-(3-Cl-$C_6H_4$) | 3GL/10BO/20EO-H |
| 6 | (NC)($H_5C_6O_2C$)C= | H | —$CH_2$-(4-Cl-$C_6H_4$) | 6GL/20PO/20EO-H |
| 7 | (NC)($H_{11}C_6O_2C$)C= | 3-Cl | $C_2H_5$ | 3GL/10PO/10EO-H |
| 8 | (NC)(($C_2H_5$)$_2NOC$)C= | 3-O—$C_2H_4$—O-3GL/15BO/18EO-H | $C_2H_5$ | —$CH_2$-$C_6H_5$ |
| 9 | (NC)$_2$C=C($C_6H_6$)—CH= (H) | 3-$CH_3$ | —$C_2H_4$-O-CO-$C_6H_5$ | 5GL/30PO/70EO-H |
| 10 | 4-methyl-3-cyano-1-($C_2H_4$-OH)-2,6-dioxo-pyridin-5-ylidene | 3-$OCH_3$ | —$CH_2CH(Cl)CH_2Cl$ | 6GL/10PO/15EO-H |
| 11 | 3-cyano-4-phenyl-2-oxo-furan-5-ylidene | H | 3GL/20BO/30EO-H | 3GL/20BO/30EO-H |

TABLE 36-continued $$M=CH-\underset{R_{16}}{\underset{|}{C_6H_4}}-N(R_{17})(R_{18})$$

| Entry | M | $R_{16}$ | $R_{17}$ | $R_{18}$ |
|---|---|---|---|---|
| 12 | 3-(methoxycarbonyl)-4-phenyl-5-methylene-furan-2(5H)-one | 3-CH$_3$ | -CH$_2$CH$_2$-N(C(=O))CH$_2$N(H)C(=O)- (hydantoinyl-ethyl) | 4GL/10PO/15EO-H |
| 13 | 3-cyano-4-methyl-5-methylene-furan-2(5H)-one | H | C$_6$H$_5$ | 3GL/10BO/20EO-H |
| 14 | 3-cyano-4-(2-thienyl)-5-methylene-furan-2(5H)-one | H | CH$_3$ | 6GL/20PO/20EO-H |
| 15 | 3-carbamoyl-4-(4-methoxyphenyl)-5-methylene-furan-2(5H)-one | 3-CH$_3$ | 5GL/10PO/20EO-H | 5GL/10PO/20EO-H |
| 16 | 3-(N-ethylcarbamoyl)-4-(4-methylphenyl)-5-methylene-furan-2(5H)-one | H | CH$_2$CH$_2$Cl | 3GL/15PO/15EO-H |
| 17 | 3-methyl-5-methylene-2,5-dihydro-pyrazol-6(1H)-one | H | 2GL/5PO/5EO-H | 2GL/5PO/5EO-H |
| 18 | 1-phenyl-3-methyl-5-methylene-2,5-dihydro-pyrazol-6(1H)-one | 3-CH$_3$ | 2GL/5PO/5EO-H | 2GL/5PO/5EO-H |
| 19 | 1-(2-hydroxyethyl)-3-methyl-5-methylene-2,5-dihydro-pyrazol-6(1H)-one | H | 3GL/20BO/30EO-H | 3GL/20BO/30EO-H |

TABLE 36-continued
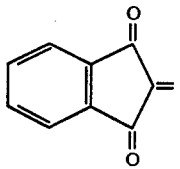
| Entry | M | $R_{16}$ | $R_{17}$ | $R_{18}$ |
|---|---|---|---|---|
| 20 | 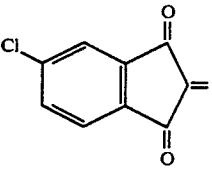 | 3-CH₃ | CH₂CH₂COC₆H₅ | 4GL/10PO/15EO-H |
| 21 | 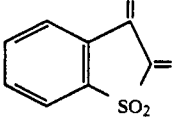 | 3-Cl | CH₂C₆H₅ | 8GL/20PO/25EO-H |
| 22 | 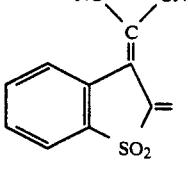 | H | 6GL/20PO/20EO-H | 6GL/20PO/20EO-H |
| 23 | 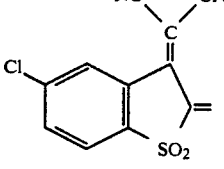 | 3-CH₃ | 5GL/10PO/20EO-H | 5GL/10PO/20EO-H |
| 24 | 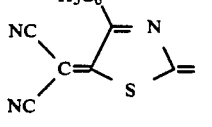 | H | CH₂CH₂SO₂C₆H₅ | 3GL/15PO/15EO-H |
| 25 | 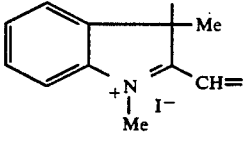 | 3-CH₃ | CH₂CH₂SO₂CH=CH₂ | 3GL/10PO/10EO-H |
| 26 | 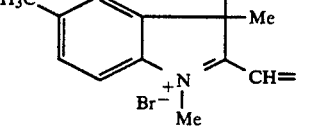 | 3-CH₃ | CH₂CH₂SO₂CH₂SCH₃ | 6GL/15BO/15EO-H |
| 27 |  | 3-CH₃ | CH₂CH(CH₃)₂ | 4GL/10PO/15EO-H |

TABLE 36-continued

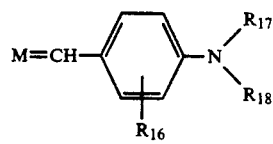

| Entry | M | $R_{16}$ | $R_{17}$ | $R_{18}$ |
|---|---|---|---|---|
| 28 | $\frac{ZnCl_4^{-2}}{2}$ indolinium with Me, Me, N-Me, CH= | 3-$CH_3$ | $CH_2CH_2OH$ | 4GL/10PO/15EO-H |
| 29 | benzothiazolium N-$CH_3$, $Cl^-$, CH= | 3-Cl | 2GL/5PO/5EO-H | 2GL/5PO/5EO-H |
| 30 | benzothiazolium N-$CH_2C_6H_5$, $Cl^-$, $H_3CO$-, CH= | H | $C_2H_4$—O-2GL/5PO/5EO-H | 2GL/5PO/5EO-H |
| 31 | benzoxazolium N-$C_2H_4CO_2^-Na^+$, $Cl^-$, CH= | 3-$CH_3$ | $CH_2CH(OCH_3)CH_2OCH_3$ | 5GL/10PO/20EO-H |
| 32 | benzoxazolium N-$C_2H_4SO_3^-K^+$, $Cl^-$, CH= | H | $CH_2CH_2OC_6H_5$ | 3GL/15PO/15EO-H |
| 33 | $CH_3COO^-$ indolinium Me, Me, N-Me, CH= | 3-$CH_3$ | $C_2H_5$ | 3GL/10PO/10EO-H |
| 34 | Cl-indolinium Me, Me, N-Me, $I^-$, CH= | 3-$CH_3$ | 2GL/4PO/4EO-H | 2GL/4PO/4EO-H |
| 35 | Br-indolinium Me, Me, N-Me, $Br^-$, CH= | 3-$CH_3$ | 4GL/10PO/15EO-H | 4GL/10PO/15EO-H |
| 36 | $\frac{ZnCl_4^{-2}}{2}$ indolinium Me, Me, N-Me, CH= | H | $C_6H_5$ | 4GL/10PO/15EO-H |
| 37 | benzothiazolium N-$CH_3$, $I^-$, CH= | H | 2GL/5PO/5EO-H | 2GL/5PO/5EO-H |

TABLE 36-continued
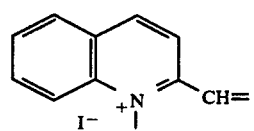
| Entry | M | $R_{16}$ | $R_{17}$ | $R_{18}$ |
|---|---|---|---|---|
| 38 | 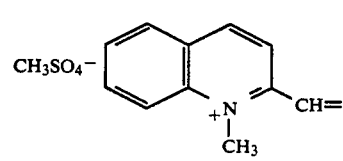 | H | 2GL/5PO/5EO-H | 2GL/5PO/5EO-H |
| 39 | 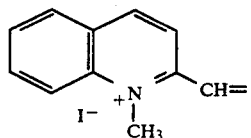 | H | $CH_2C_6H_5$ | 5GL/10PO/20EO-H |
| 40 | 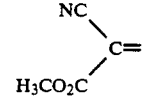 | H | 3GL/15PO/15EO-H | 3GL/15PO/15EO-H |
TABLE 37
M=C—Ar—(Z)
| Entry | M | Ar | Z |
|---|---|---|---|
| 1 | 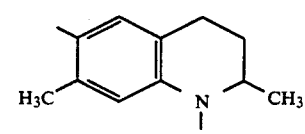 |  | 3GL/10PO/10EO-H |
| 2 | 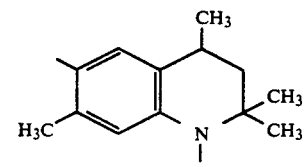 | 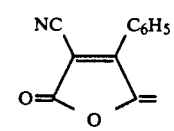 | 3GL/10PO/10EO-H |
| 3 | 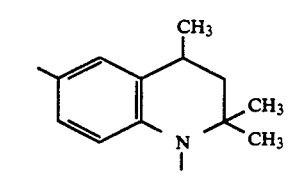 | 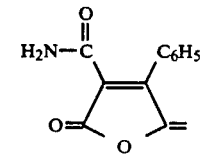 | 4GL/5PO/10EO-H |
| 4 | 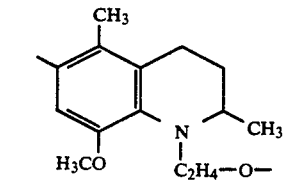 | | 4GL/20PO/20EO-H |

TABLE 37-continued

| Entry | M | Ar | Z |
|---|---|---|---|
| 5 | NC, H₃COC₂H₄O₂C–C=C= (with naphthyl N(CH₃)(C₂H₅)) | 4-methyl-1-(N-methyl-N-ethylamino)naphthyl | 3GL/8PO/8EO-H |
| 6 | H₅C₂O–C(=O)–C(=C(C₆H₅))–C(=O)–O (butenolide) | 2,3-dihydro-4-methyl-3-methyl-benzoxazine | 3GL/10PO/10EO-H |
| 7 | 2,3-dihydro-indane-1,3-dione-2-ylidene | N-(2-hydroxyethyl)-6,7-dimethyl-3-methyl-benzoxazine | 3GL/10PO/10EO-H |
| 8 | (NC)₂C=C(benzothiophene-SO₂) | 6,7-dimethyl-3-methyl-benzoxazine | 5GL/10PO/10EO-H |
| 9 | NC, H₅C₂O₂C–C= | 3-methyl-N-methyl-carbazole | 4GL/15PO/15EO-H |
| 10 | NC–C(=C–thienyl)–C(=O)–O (butenolide with thiophene) | 3-methyl-N-(2-hydroxyethyl)-carbazole | 5GL/10PO/10EO-H |
| 11 | (NC)₂C=C(C₆H₅)–CH= | 4-methyl-phenoxazine | 3GL/10PO/10EO-H |
| 12 | (NC)₂C=C(S)–C(=N-)(=C(C₆H₅)) (thiazoline) | 4-methyl-N-(2-hydroxyethyl)-phenoxazine | 3GL/10PO/10EO-H |
| 13 | 2,3-dihydro-benzo[b]thiophene-3-one-1,1-dioxide-2-ylidene | 5-methyl-2-methyl-indoline | 3GL/20PO/25EO-H |

TABLE 37-continued

| Entry | M | Ar | Z |
|---|---|---|---|
| | | M=C—Ar—(Z) | |
| 14 | (methyl, CN-substituted pyridinedione with N-C4H9-n) | 5,6-dimethyl-2-methyl-1-(C2H4O—)-indoline | 4GL/10BO/20EO-H |
| 15 | 3,3-dimethyl-1-methyl-indolinium, I−, CH= | 4-methyl-10-methyl-phenothiazine | 3GL/10PO/10EO-H |
| 16 | 1-phenyl-pyrazolone with =CH-CH3 | 6,7-dimethyl-4-methyl-3-methyl-benzoxazine | 4GL/15PO/15EO-H |
| 17 | (NC)2C= | 6,7-dimethyl-4-methyl-3-methyl-benzoxazine | 3GL/10PO/10EO-H |
| 18 | NC, H11C6O2C, C= | 6,7-dimethyl-2,2,4-trimethyl-1-methyl-tetrahydroquinoline | 3GL/10PO/10EO-H |
| 19 | phenylsulfonyl, NC, C= | H5C6, CH3, S, N=C(N(CH3)2) | 5GL/10BO/10EO-H |
| 20 | benzothiazolinium N+CH3, CH3SO4−, CH= | 2,3,5-trimethyl-1-ethyl-N-methyl-thiophene | 4GL/20PO/20EO-H |
| 21 | benzoxazolinium N+C2H5, C2H5SO4−, CH= | julolidine derivative | 3GL/8PO/8EO-H |
| 22 | quinolinium, I−, N+CH3, CH= | 5-methyl-4-methyl-3-methyl-benzoxazine | 3GL/10PO/10EO-H |

TABLE 37-continued

M=C—Ar—(Z)

| Entry | M | Ar | Z |
|---|---|---|---|
| 23 | NC, CN dicyanomethylene-indanone | 2,2,6-trimethyl-1,4-dihydroquinoline with N-CH₃ and 4-CH₃ | 8GL/15BO/15EO-H |
| 24 | NC, C=, HOCH₂CH₂HNOC | 3,4-dimethyl-benzoxazine with N-CH₃ and CH₃ | 5GL/10PO/10EO-H |

TABLE 38

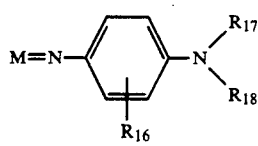

| Entry | M | $R_{16}$ | $R_{17}$ | $R_{18}$ |
|---|---|---|---|---|
| 1 | NC–C(=)–CN (dicyanomethylene) | 3-CH₃ | —C₂H₄—O—C(=O)—C₆H₅ | 5GL/30PO/70EO-H |
| 2 | NC, H₃CO₂C C= | 3-OCH₃ | —CH₂CH(Cl)CH₂Cl | 6GL/10PO/15EO-H |
| 3 | methyl-cyano-pyridinedione with N-C₂H₄—OH | H | 3GL/20BO/30EO-H | 3GL/20BO/30EO-H |
| 4 | NC, C₆H₅ furanone | 3-CH₃ | —CH₂CH₂—N(hydantoin) | 4GL/10PO/15EO-H |
| 5 | H₅C₆–N–N=, CH₃ pyrazolone | H | C₆H₅ | 3GL/10BO/20EO-H |
| 6 | indanedione | H | CH₃ | 6GL/20PO/20EO-H |

TABLE 38-continued

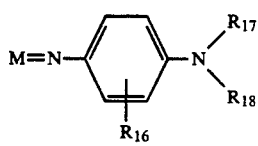

| Entry | M | $R_{16}$ | $R_{17}$ | $R_{18}$ |
|---|---|---|---|---|
| 7 | (benzofuran-3(2H)-one-2-ylidene with SO$_2$) | 3-CH$_3$ | 5GL/10PO/20EO-H | 5GL/10PO/20EO-H |
| 8 | (H$_5$C$_6$, NC, NC, C=, N, S ylidene) | H | CH$_2$CH$_2$Cl | 3GL/15PO/15EO-H |

EXAMPLE 123

This example demonstrates the improved reactivity of the primary hydroxyl enriched colorants of the invention over conventional colorants by measuring the amount of colorant that migrates from a colored polyurethane foam to a reference foam upon heating for a given time period.

The colorant samples from Examples 19 and 20 are formulated into a polyether based urethane molded foam and tested according to the following procedure:

| Ingredient | Amount |
|---|---|
| Colorant | 0.3 g |
| Polyol (Renesol RU6744B)* | 30.0 g |
| Isocyanate (Renesol RU6744A)* | 10.8 g |

*Renesol Corporation

The mold employed is approximately 5 cm in diameter and 1 cm in depth. The above ingredients are mixed under high shear, poured into the mold, cured 15–20 minutes at room temperature and oven cured at 50° C. for one hour.

2) A reference polyurethane molded foam is prepared as in (1) using the following formulation:

| Ingredient | Amount |
|---|---|
| Polyol (Renesol RU6744B) | 30.0 g |
| Isocyanate (Renesol RU6744A) | 10.8 g |

3) The colored foam from (1) and uncolored reference foam from (2) are then clamped tightly together and placed in a 50° C. oven for 24 hours. At the end of this period, the molded foams are separated.

4) The amount of color which migrates to the uncolored reference foam is measured via CIELAB readings from an ACS Color Computer. This migration is represented as Delta values that are obtained on an ACS Spectro-Sensor. The color difference (Delta E) between the sample colored foams and reference foams is summarized in the table below.

| Colorant | DELTA E* |
|---|---|
| Example 19 | 1.29 |
| Example 20 | 17.5 |

*CIELAB Coordinates

These results clearly show that the primary hydroxyl enriched colorants of the invention (Example 19) have far superior utility compared to the conventional polymeric colorants (Example 20).

This test indicates that a large amount of color migrates from the sample foam (prepared from Example 20) into the uncolored reference foam, because of its poor reactivity. A production run using conventional polymeric colorants (such as Example 20) gives unacceptable color bleeding.

In contrast, a very low level of migration is observed for the enriched primary hydroxyl colorants of the invention (Example 19) making their use highly preferable in the production of colored polyurethane foams.

EXAMPLE 124

This example demonstrates the increased reactivity of primary hydroxyl enriched colorants of the invention over that of conventional colorants by measuring the amount of unreacted colorant that extracts with acetone.

The colorant samples from Examples 75B and 76 are formulated with scrap polyurethane foam chips which are glued together to make carpet padding of which the glue is also a polyurethane resin.

In preparing this padding, the colorant is first mixed into the glue employed for binding together the colored or uncolored scrap polyurethane foam. The glue itself is a type of polyurethane resin, and binds together the chips forming a pad that is economical and firm.

The colored scrap polyurethane foam pad is prepared and tested according to the following procedure:

1) A colored scrap polyurethane foam is prepared using the following recipe:

| Ingredient | Amount |
|---|---|
| Colorant (Example 75B) | 10.5 g |
| Propylene Carbonate (Diluent) | 15.0 g |
| Coscat 83 (Catalyst) | 0.8 g |

| Ingredient | Amount |
| --- | --- |
| Scrap polyurethane foam chips | 1875.0 g |
| Niax* 16-86 (3000 mw polyol) | 275.0 g |
| Toluene Diisocyanate | 100.0 g |

*Union Carbide

The colorant from Example 76 is formulated exactly as above except that 10.0 grams of this colorant are used so that in this comparison the colorants are calibrated at equivalent color strengths based on their average molecular weights.

The ingredients are mixed thoroughly and placed in a forming pan. 2) After all the ingredients are mixed, steam is applied for five minutes.

3) The carpet underlay is removed and air dried.

4) A 10 gram piece of the colored carpet padding is extracted with 300 grams of acetone for 4 hours.

5) The amount of color that is extracted from the carpet padding is determined by measuring the absorbance of the extracting solution on a Beckman DU-7 Spectrophotometer. The extraction results are summarized in the table below:

| Colorant | Absorbance |
| --- | --- |
| Example 76 | 0.4787 |
| Example 75B | 0.0680 |

These results clearly show that the primary hydroxyl enriched colorants of the invention (Example 75B) have far superior utility compared to the conventional polymeric colorants (Example 76).

The deeply colored extract from the carpet foam (prepared from Example 76) indicates that a large loss of color from the substrate has occurred due to poor reactivity of the colorant itself. Use of these conventional polymeric colorants is unacceptable in carpet applications due to color bleeding when exposed to strong solvents.

In contrast, a practically colorless extract is observed for the primary hydroxyl enriched colorants of the invention (Example 75B) making their use preferable in the production and use of colored polyurethane foams for carpet underlay.

EXAMPLE 125

This example illustrates the use of primary hydroxyl enriched colorants of the invention in polyolefin systems. The following formulations are preblended using a paddle type mixer and the colorant of Example 80:

| *INGREDIENT | |
| --- | --- |
| | Formulation 1 |
| 4MF Polypropylene resin (Exxon 9142G) | 99.47% |
| Irganox 1010 (Ciba-Geigy) | 800 ppm |
| Millad 3940 | 2500 ppm |
| Calcium stearate 1000 ppm | |
| Colorant (Example 80) | 1000 ppm |
| | Formulation 2 |
| 4MF Polypropylene resin (Exxon 9142G) | 99.62% |
| Irganox 1010 (Ciba-Geigy) | 800 ppm |
| TiO$_2$ | 1000 ppm |
| Calcium stearate | 1000 ppm |
| Colorant (Example 80) | 1000 ppm |

*Calcium stearate functions as a stabilizer; Irganox 1010 is a registered trademark of Ciba-Geigy Corporation for a hindered phenol stabilizer; Millad 3940 is a clarifier for polyolefins; TiO$_2$ is a white pigment which serves as an opacifier; 4MF Polypropylene resin (Exxon 9142G) is a random copolymer of propylene and ethylene.

After mixing, the formulations shown above are melt compounded on a Brabender Twin Screw Mixer with a stock temperature of 245°–250° C. The compounded samples are then injection molded on a small toggle clamp machine into two-step plaques with thicknesses of 50 and 85 mils.

Formulation #1 has good clarity and is a bright red shade. Formulation #2 has opaque and has a medium red shade. Both formulations process well in addition to having properties such as good to excellent heat stability, non-nucleation, non-migration and ease of resin clean up.

This invention has been described in detail with particular reference to preferred embodiments thereof, but it will be understood that variations and modifications can be effected within the spirit and scope of this invention.

We claim:

1. A primary hydroxyl enhanced colorant of the formula:

$$C-(Z)_{1-4}$$

wherein C is an azo chromogen, and Z is a poly(oxyalkylene) moiety comprising the residue of at least two moles of glycidol reacted with an amino group of said chromogen, the residue of at least one mole of a secondary hydroxyl forming alkylene oxide selected from propylene oxide and butylene oxide reacted with each primary hydroxyl site of said glycidol residues, and at least one mole of ethylene oxide reacted with each secondary hydroxyl site present on said glycidol residues and said secondary hydroxyl forming alkylene oxide, provided that the total number of residues of said secondary hydroxyl forming alkylene oxides and said ethylene oxide does not exceed 200.

2. The colorant of claim 1 wherein a total number of secondary hydroxyl forming alkylene oxides and said ethylene oxide reacted to a particular hydroxyl site of said glycidol residues does not exceed 42.

3. The colorant of claim 2 wherein said glycidol residues comprise from 5 to 50 mole percent of the total of glycidol residues, secondary hydroxyl forming alkylene oxide residues and ethylene oxide residues.

4. A primary hydroxyl enhanced colorant of the formula $$C-(Z)_{1-4}$$

wherein C is an azo chromogen having the formula $$Q-N=N-Ar$$

wherein Q is the residue of a carbocyclic or heterocyclic aromatic, diazotizable amine reactant, and Ar is the residue of carbocyclic or heterocyclic coupling component and wherein at least one —Z moiety is present on either Q— or —Ar; and Z is a poly(oxyalkylene) moiety comprised of (1) at least two (A) units independently selected from those of the formulae —CH₂CH(O—T)CH₂O— or
—CH₂CH(O—T)CH₂O—T and (2) from none to about 200 (B) units of the formula (—RO—) wherein R is straight or branched chain hydrocarbon of 2–4 carbons, T is a moiety of the formula

—CH₂CH(R₁)—O—(RO)₀₋₄₀—CH₂CH₂OH and wherein R₁ is selected from unsubstituted or substituted alkyl, aryl, alkenyloxyalkyl, alkoxyalkyl or aryloxyalkyl and said A units comprise at least 0.5 percent of the total A+B units.

5. A primary hydroxyl enhanced colorant of the formula

C—(Z)₁₋₄ wherein C is an azo chromogen having the formula

D—N=N—Ar wherein D is an aromatic heterocyclic radical which contains a quaternary nitrogen atom, said radical being selected from unsubstituted or substituted: thiazol-2-yl; benzothiazol-2-yl; 1,3,4-thiadiazol-2-yl; 1,2,4-thiadizol-5-yl; isothiazol-5-yl; 2,1-benzisothiazol-3-yl; pyrazol-5-yl; 1,3,4-triazol-2-yl; 3- or 4-pyridyl; or 4,5-(3,3-dimethyl-1-oxotetramethylene)-thiazol-2-yl; wherein Ar is an aromatic amine residue selected from substituted or unsubstituted: anilines; naphthylamines; 1,2,3,4-tetrahydroquinolines; 3,4-dihydro-2H-1,4-benzoxazines; 2-aminothiazoles; 2,3-dihydroindoles; carbazoles; phenoxazines; phenothiazines; 2-aminothiophenes or julolidines; and wherein said compound contains at least one —Z moiety; and Z is a poly(oxyalkylene) moiety comprised of (1) at least two (A) units independently selected from those of the formulae —CH₂CH(O—T)CH₂O— or
—CH₂CH(O—T)CH₂O—T and (2) from none to about 200 (B) units of the formula (—RO—) wherein R is straight or branched chain hydrocarbon of 2–4 carbons, T is a moiety of the formula

—CH₂CH(R₁)—O—(RO)₀₋₄₀—CH₂CH₂OH and wherein R₁ is selected from unsubstituted or substituted alkyl, aryl, alkenyloxyalkyl, alkoxyalkyl or aryloxyalkyl and said A units comprise at least 0.5 percent of the total A+B units.

6. The azo compound according to claim 4 wherein Q is selected from unsubstituted or substituted: phenyl; naphthyl; thiazol-2-yl; benzothiazol-2-yl; 1,3,4-thiadiazol-2-yl; 1,2,4-thiadiazol-5-yl; isothiazol-5-yl; isoxazol-5-yl; 2,1-benzisothiazol-3-yl; 2-thienyl; 3- and 4-pyridyl; pyrazol-5-yl; 3- and 4-phthalimidyl; 1,2,4-triazol-3-yl; or 4,5 (3,3-dimethyl-1-oxotetramethylene)thiazol-2-yl; and wherein Ar is the residue of a reactant selected from substituted or unsubstituted: anilines; naphthylamines; 1,2,3,4-tetrahydroquinolines; 3,4-dihydro-2H-1,4-benzoxazines; 2-aminothiazoles; 2,3-dihydroindoles; carbazoles; phenoxazines; phenothiazines; 2-aminothiophenes; aminopyridines or julolidines.

7. The azo compound according to claim 4 wherein Q is selected from the radicals:

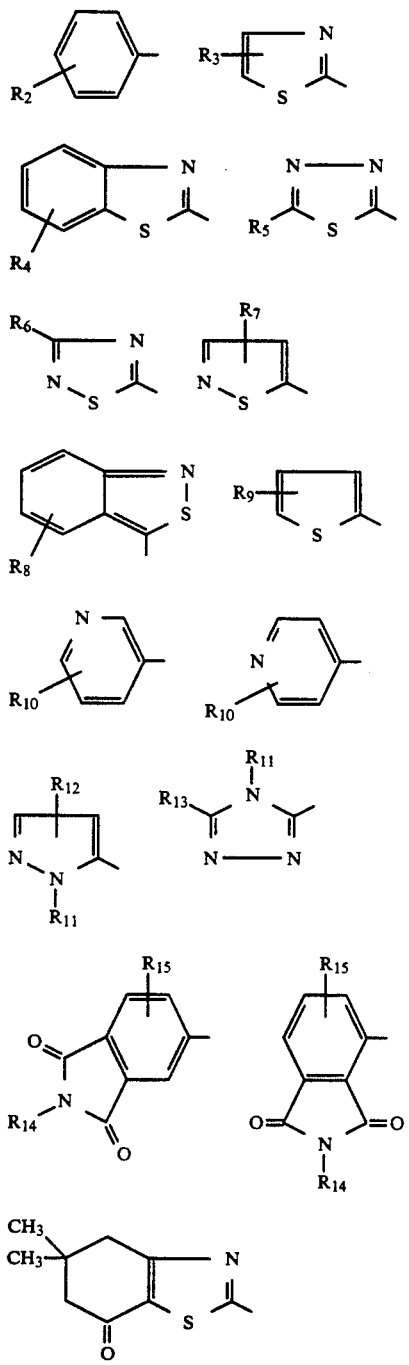

wherein:

R₂ is hydrogen or 1–3 substituents selected from lower alkyl, lower alkoxy, halogen, cyano, nitro, formyl, alkanoyl, aroyl, thiocyano, lower alkylthio, arylthio, lower alkylsulfonyl, arylsulfonyl, carbalkoxy, unsubstituted or substituted sulfamoyl, unsubstituted or substituted carbamoyl, nitro, trifluoromethyl or arylazo;

R₃ is hydrogen or 1–2 substituents selected from lower alkyl, aryl, halogen, cyano, formyl, carbalkoxy, nitro, arylazo, thiocyano, lower alkylsulfonyl, arylsulfonyl, trifluoromethyl, alkanoyl, aroyl, unsubstituted or substituted sulfamoyl or unsubstituted or substituted carbamoyl;

R₄ is hydrogen or 1-3 substituents selected from lower alkyl, lower alkoxy, halogen, cyano, carbalkoxy, alkanoyl, aroyl, arylazo, —SO₃-aryl, alkylsulfonyl, arylsulfonyl, unsubstituted or substituted carbamoyl, unsubstituted or substituted sulfamoyl, alkylthio, thiocyano, 2-cyanoethylthio, 2-cyanoethylsulfonyl, or alkanoylamino;

R₅ is hydrogen or a group selected from lower alkyl, cycloalkyl, aryl, alkylthio, arylthio, cyanomethylthio, halogen, alkylsulfonyl, arylsulfonyl, lower alkoxy, benzylthio, allylthio, unsubstituted or substituted sulfamoyl, thiocyano or alkanoylamino;

R₆ is hydrogen or a group selected from lower alkyl, aryl, alkylthio, alkylsulfonyl, halogen, cyano, 2-carbalkoxyethylthio or benzylthio;

R₇ is hydrogen or 1-2 substituents selected from lower alkyl, halogen, nitro, cyano, alkylthio, 2-hydroxyethylthio, arylthio, alkylsulfonyl or arylsulfonyl;

R₈ is hydrogen or a group selected from lower alkyl, lower alkoxy, nitro, halogen or unsubstituted or substituted sulfamoyl;

R₉ is 1-3 substituents selected from lower alkyl, aryl, cyano, lower carbalkoxy, alkanoyl, aroyl, halogen, formyl, unsubstituted or substituted carbamoyl, thiocyano, alkylsulfonyl, arylsulfonyl, unsubstituted or substituted sulfamoyl, nitro, arylazo or cinnamoyl;

R₁₀ is hydrogen or 1-3 substituents selected from lower alkyl, halogen, lower alkoxy, lower alkylsulfonyl, arylsulfonyl, carbalkoxy, aryl, unsubstituted or substituted carbamoyl; unsubstituted or substituted sulfamoyl, formyl, or thiocyano;

R₁₁ is hydrogen, lower alkyl, aryl, alkylsulfonyl, or arylsulfonyl;

R₁₂ is hydrogen or 1-2 substituents selected from lower alkyl, aryl, unsubstituted or substituted carbamoyl, arylthio, lower alkylthio, cyanomethyl, cyano, nitro, carbalkoxy;

R₁₃ is hydrogen, lower alkyl, lower thioalkyl, arylthio, carbalkoxy, halogen, lower alkylsulfonyl, or arylsulfonyl;

R₁₄ is selected from hydrogen, unsubstituted or substituted alkyl, aryl, cycloalkyl, or allyl; and R₁₅ is hydrogen or 1-2 substituents selected from lower alkyl, lower alkoxy, halogen, nitro, cyano, alkylthio, arylthio, alkylsulfonyl, arylsulfonyl or aryloxy; and Ar is selected from the radicals:

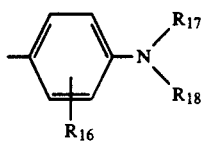 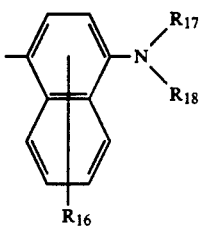

-continued

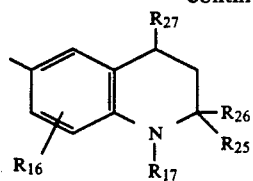

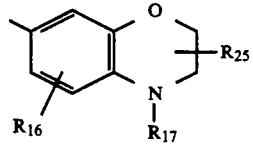

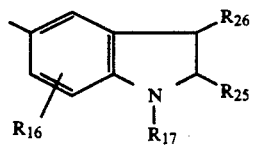

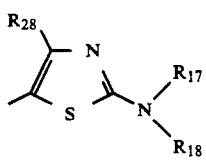

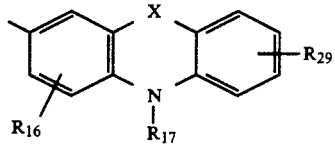

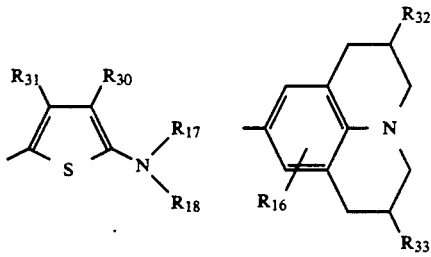

wherein:

R₁₆ is hydrogen or 1-2 substituents selected from lower alkyl, trifluoromethyl, lower alkoxy, arylthio, aryloxy, halogen, —CH₂—O—Z or —O-alkylene-O—Z;

R₁₇ and R₁₈ are each independently selected from —Z, straight or branched lower alkenyl; cycloalkyl; cycloalkyl substituted with hydroxy, alkoxy, alkyl, halogen or alkanoyloxy; phenyl; phenyl substituted with one or more groups selected from lower alkyl, lower alkoxy, cyano, alkanoyloxy or —L—Z; straight or branched chain alkyl of 1-12 carbons and such alkyl substituted with one or more of

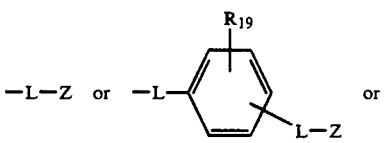

-continued

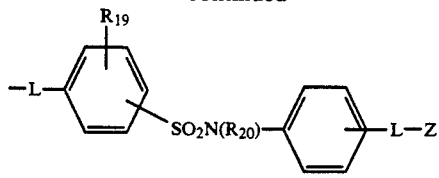

cyano, halogen, 2-pyrrolidino, phthalimidino, vinylsulfonyl, acrylamido, o-benzoic sulfonimido, a group of the formula

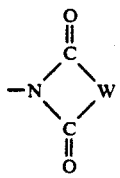

phenyl, and phenyl substituted with lower alkyl, lower alkoxy, halogen, carbalkoxy, cyano, carboxy or acyloxy;

$R_{19}$ is selected from hydrogen, lower alkyl, or lower alkanoylamino, lower alkoxy, halogen;

$R_{20}$ is selected from hydrogen; lower alkyl; lower alkyl substituted with hydroxy, acyloxy, phenyl, cycloalkyl, halogen or alkoxy; cycloalkyl; phenyl; phenyl substituted with lower alkyl, lower alkoxy, halogen, hydroxy, alkanoylamino, carbalkoxy, carboxy, cyano, or alkanoyloxy;

wherein the alkyl group represented by $R_{17}$ and $R_{18}$ can be further substituted with a group selected from those of the formulae: —O—$R_{21}$; —SO$_2$—$R_{22}$; —CON($R_{21}$)$R_{23}$; —SO$_2$N($R_{21}$)$R_{23}$; —N($R_{21}$)SO$_2$$R_{22}$; —OCO—$R_{23}$; —OCO$_2$$R_{23}$; —OCON($R_{21}$)$R_{23}$; —SR$_{24}$ or —SO$_2$CH$_2$CH$_2$SR$_{24}$;

wherein $R_{21}$ and $R_{23}$ are selected from hydrogen; lower alkyl; lower alkyl substituted with hydroxy, aryloxy, halogen, cycloalkyl or phenyl; cycloalkyl; phenyl; phenyl substituted with lower alkyl, lower alkoxy, halogen, hydroxy, alkanoylamino, carbalkoxy, carboxy, cyano or alkanoyloxy;

$R_{22}$ represents the same substituents listed for $R_{21}$ and $R_{23}$ excepting hydrogen;

$R_{24}$ is selected from a group listed above for $R_{21}$ and $R_{23}$ plus benzothiazol-2-yl, benoxazol-2-yl, benzimidazol-2-yl, pyridyl, pyrimidinyl, 1,3,4-thiadiazolyl, 1,3,4-oxadiazolyl, naphthyl or triazolyl;

W is selected from: lower alkylene of 1-3 carbons; lower alkylene substituted with hydroxy, halogen, alkoxy or acyloxy; vinyl; 1,2-phenylene; 1,2-phenylene substituted with lower alkyl, lower alkoxy halogen, carboxy or carbalkoxy; 1,2-cyclohexylene; —O—CH$_2$—; —CH$_2$OCH$_2$—; —SCH$_2$—; —N($R_{21}$)CH$_2$—; —N($R_{21}$)CH$_2$CH$_2$—; or —CH$_2$N($R_{21}$)CH$_2$—;

L is selected from a covalent bond, oxygen, sulfur, —SO$_2$—, —SO$_2$N($R_{21}$)—, —N(SO$_2$R$_{22}$)—, —N($R_{21}$)—, —COO—, or —CON($R_{21}$)—;

$R_{25}$, $R_{26}$, and $R_{27}$ are independently selected from hydrogen or lower alkyl;

$R_{28}$ is hydrogen, cycloalkyl, alkyl, 2-thienyl, phenyl, phenyl substituted with halogen, lower alkyl, or lower alkoxy;

$R_{29}$ is hydrogen or 1-2 substituents selected from lower alkyl, lower alkoxy or halogen;

$R_{30}$ is selected from cyano, carbalkoxy, alkylsulfonyl, arylsulfonyl or unsubstituted or substituted carbamoyl;

$R_{31}$ is hydrogen, lower alkyl or aryl;

$R_{32}$ and $R_{33}$ are independently selected from hydrogen, lower alkyl, lower alkoxy, halogen or —Z;

wherein X is a covalent bond, oxygen, or sulfur; and with the proviso that the compound contain at least one —Z moiety.

8. The azo compound according to claim 5 having a structure selected from the following:

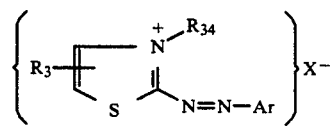

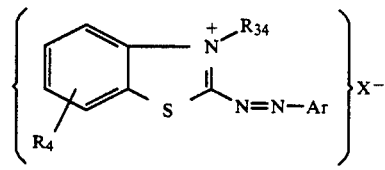

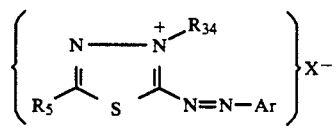

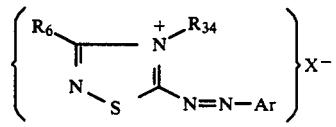

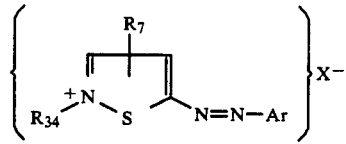

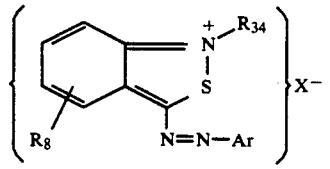

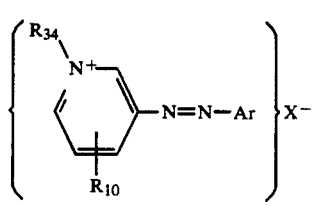

-continued

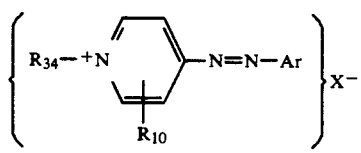

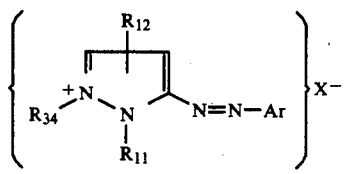

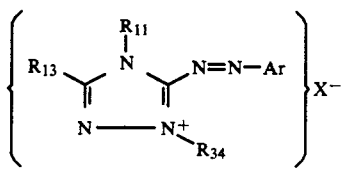

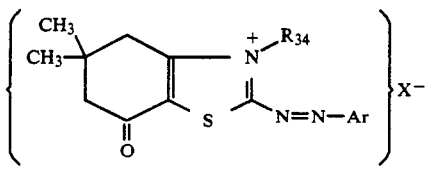

wherein:

R$_3$ is hydrogen or 1-2 substituents selected from lower alkyl, aryl, halogen, cyano, formyl, carbalkoxy, nitro, thiocyano, lower alkylsulfonyl, arylsulfonyl, trifluoromethyl, alkanoyl, aroyl, unsubstituted or substituted sulfamoyl or unsubstituted or substituted carbamoyl;

R$_4$ is hydrogen or 1-3 substituents selected from lower alkyl, lower alkoxy, halogen, cyano, carbalkoxy, alkanoyl, aroyl, arylazo, —SO$_3$-aryl, alkylsulfonyl, arylsulfonyl, unsubstituted or substituted carbamoyl, unsubstituted or substituted sulfamoyl, alkylthio, thiocyano, 2-cyanoethylthio, 2-cyanoethylsulfonyl, or alkanoylamino;

R$_5$ is hydrogen or a group selected from lower alkyl, cycloalkyl, aryl, alkylthio, arylthio, cyanomethylthio, halogen, alkysulfonyl, arylsulfonyl, lower alkoxy, benzylthio, allylthio, unsubstituted or substituted sulfamoyl, thiocyano or alkanoylamino;

R$_6$ is hydrogen or a group selected from lower alkyl, aryl, alkylthio, alkylsulfonyl, halogen, cyano, 2-carbalkoxyethylthio or benzylthio;

R$_7$ is hydrogen or 1-2 substituents selected from lower alkyl, halogen, nitro, cyano, alkylthio, 2-hydroxyethylthio, arylthio, alkylsulfonyl or arylsulfonyl;

R$_8$ is hydrogen or a group selected from lower alkyl, lower alkoxy, nitro, halogen or unsubstituted or substituted sulfamoyl;

R$_{10}$ is hydrogen or 1-3 substituents selected from lower alkyl, halogen, lower alkoxy, lower alkylsulfonyl, arylsulfonyl, carbalkoxy, aryl, unsubstituted or substituted carbamoyl; unsubstituted or substituted sulfamoyl, formyl, or thiocyano;

R$_{11}$ is hydrogen, lower alkyl, aryl, alkylsulfonyl, or arylsulfonyl;

R$_{12}$ is hydrogen or 1-2 substituents selected from lower alkyl, aryl, cyano, nitro, lower alkylthio, cyanomethyl, unsubstituted or substituted carbamoyl;

R$_{13}$ is hydrogen, lower alkyl, lower thioalkyl, arylthio, carbalkoxy, halogen, lower alkylsulfonyl, or arylsulfonyl;

R$_{34}$ is selected from lower alkenyl, lower alkyl, optionally substituted benzyl, hydroxyalkyl, carbamoylalkyl, -alkylene-CO$_2$-M$^+$ or -alkylene-SO$_3$-M$^+$; wherein M$^+$ is H$^+$, Na$^+$, K$^+$, Li$^+$ or NH$_4$$^+$; and wherein X$^-$ is a counter anion selected from Cl$^-$, Br$^-$, CH$_3$SO$_4$$^-$, C$_2$H$_5$SO$_4$$^-$, ZnCl$_4$$^{-2}$/2.

9. A colorant according to claim 7 selected from those of the formulae:

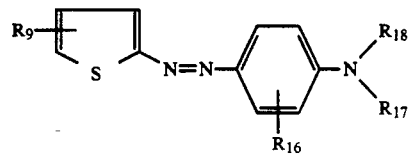

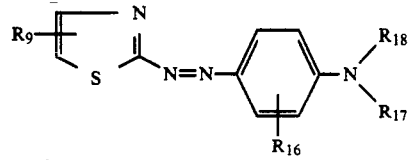

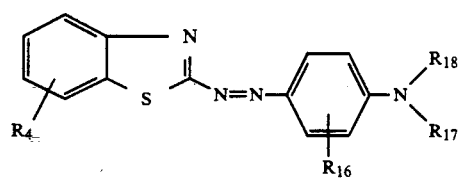

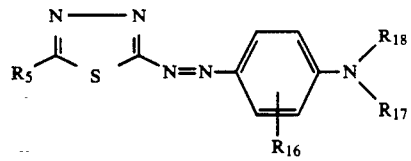

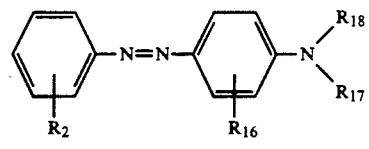

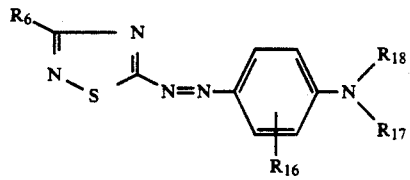

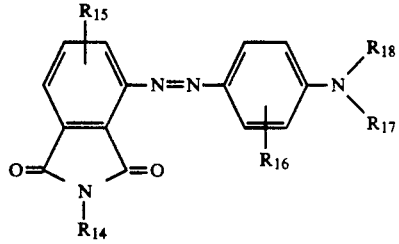

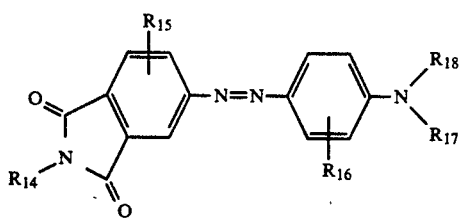

wherein:

R$_2$ is hydrogen or 1-3 groups independently selected from halogen, lower alkylsulfonyl, arylsulfonyl, unsubstituted and substituted sulfamoyl, arylazo, cyano, carbalkoxy, or unsubstituted and substituted carbamoyl;

R$_3$ is hydrogen or 1-2 groups selected from lower alkyl, aryl, cyano, formyl, halogen, or carbalkoxy;

R$_4$ is hydrogen or 1-3 groups selected from lower alkyl, lower alkoxy, halogen, lower alkylsulfonyl, cyano, carbalkoxy, thiocyano, trifluoromethyl, —SO$_3$-aryl, unsubstituted and substituted sulfamoyl;

R$_5$ is hydrogen, lower alkyl, aryl, alkoxy, alkylthio, cyanomethylthio, halogen, or alkylsulfonyl;

R$_6$ is lower alkyl, aryl, alkylthio, alkylsulfonyl, or halogen;

R$_9$ is 1-3 substituents selected from lower alkyl, aryl, cyano, carbalkoxy, alkanoyl, aroyl, formyl, unsubstituted and substituted carbamoyl, alkylsulfonyl or arylazo;

R$_{14}$ is selected from hydrogen, unsubstituted or substituted alkyl, hydroxyalkyl, aryl, cycloalkyl, or allyl;

R$_{15}$ is hydrogen or 1-2 substituents selected from halogen, alkyl, cyano, alkylsulfonyl, or arylsulfonyl;

R$_{16}$ is hydrogen or 1-2 groups selected from hydrogen, lower alkyl, lower alkoxy, halogen or trifluoromethyl; and R$_{17}$ and R$_{18}$ are independently selected from lower alkyl, cycloalkyl, alkenyl, or aryl; wherein at least one of R$_{17}$ or R$_{18}$ is —Z.

10. A colorant according to claim 9 wherein:

R$_{16}$ is hydrogen or 1-2 groups selected from methyl, methoxy, trifluoromethyl, or chloro; and R$_{17}$ and R$_{18}$ are both —Z; wherein the sum of A+B is from about 3 to about 200.

11. A colorant according to claim 8 selected from those of the formulae:

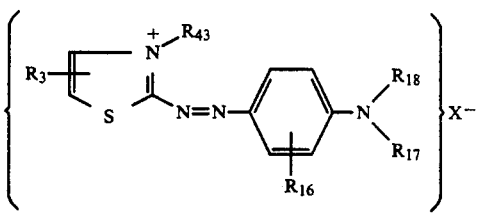

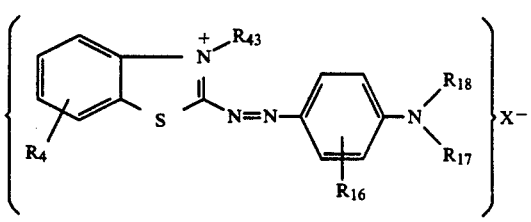

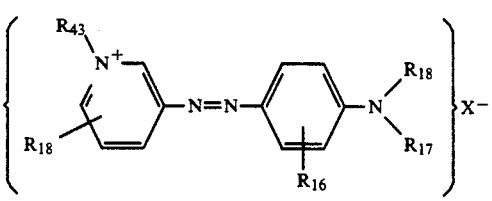

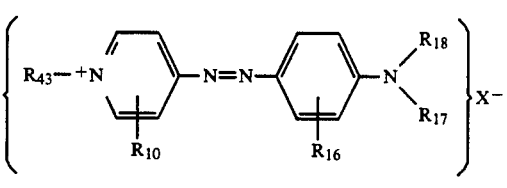

wherein:

R$_3$ is hydrogen or 1-2 groups selected from lower alkyl, aryl, cyano, formyl, halogen, or carbalkoxy;

R$_4$ is hydrogen or 1-3 groups selected from lower alkyl, lower alkoxy, halogen, lower alkylsulfonyl, cyano, carbalkoxy, thiocyano, trifluoromethyl, —SO$_3$-aryl, unsubstituted and substituted sulfamoyl;

R$_{43}$ is lower alkyl, benzyl, -alkylene-CO$_2^-$M$^+$ or -alkylene-SO$_3^-$M$^+$, wherein M$^+$ is hydrogen, sodium, potassium, or lithium;

R$_{16}$ is selected from hydrogen or 1-2 groups selected from lower alkyl, lower alkoxy, halogen or trifluoromethyl; and R$_{17}$ and R$_{18}$ are independently selected from lower alkyl, cycloalkyl, alkenyl, or aryl wherein at least one R$_{17}$ or R$_{18}$ is —Z.

12. A colorant according to claim 11 wherein:

R$_{17}$ and R$_{18}$ are both —Z; wherein the sum of A+B is from about 3 to about 200.

* * * * *